US007233577B2

(12) United States Patent
Choi et al.

(10) Patent No.: US 7,233,577 B2
(45) Date of Patent: Jun. 19, 2007

(54) METHOD FOR MEASURING CONFUSION RATE OF A COMMON PACKET CHANNEL IN A CDMA COMMUNICATION SYSTEM

(75) Inventors: Sung-Ho Choi, Songnam-shi (KR); Seong-Ill Park, Kunpo-shi (KR); Ho-Kyu Choi, Seoul (KR); Hyun-Woo Lee, Sowon-shi (KR); Ki-Ho Jung, Shiheung-shi (KR)

(73) Assignee: Samsung Electronics Co., Ltd. (KR)

( * ) Notice: Subject to any disclaimer, the term of this patent is extended or adjusted under 35 U.S.C. 154(b) by 686 days.

(21) Appl. No.: 09/832,237

(22) Filed: Apr. 10, 2001

(65) Prior Publication Data

US 2003/0103476 A1    Jun. 5, 2003

(30) Foreign Application Priority Data

| Apr. 10, 2000 | (KR) | ................ 2000-18752 |
| Apr. 25, 2000 | (KR) | ................ 2000-22027 |
| May 23, 2000 | (KR) | ................ 2000-28773 |

(51) Int. Cl.
    *H04Q 7/00* (2006.01)
(52) U.S. Cl. ................ 370/252; 370/329; 370/346
(58) Field of Classification Search ......... 370/329, 370/337, 348, 448, 229, 349, 231, 470, 471, 370/498; 455/452.2, 512, 527, 453
    See application file for complete search history.

(56) References Cited

U.S. PATENT DOCUMENTS

| 5,436,905 | A | * | 7/1995 | Li et al. ............... 370/346 |
| 5,583,866 | A | * | 12/1996 | Vook et al. ........... 370/312 |
| 5,729,542 | A | * | 3/1998 | Dupont ............... 370/346 |
| 5,752,193 | A | * | 5/1998 | Scholefield et al. ... 455/452.2 |
| 6,118,997 | A | * | 9/2000 | Kim et al. ............ 455/424 |
| 6,195,338 | B1 | * | 2/2001 | Decker ............... 370/252 |
| 6,356,767 | B2 | * | 3/2002 | Froula ............... 455/512 |
| 6,374,099 | B1 | * | 4/2002 | Bi et al. ............. 455/404.1 |
| 6,535,523 | B1 | * | 3/2003 | Karmi et al. ........ 370/468 |
| 6,643,318 | B1 | * | 11/2003 | Parsa et al. ......... 375/141 |

(Continued)

FOREIGN PATENT DOCUMENTS

WO    WO 97/19525    5/1997

OTHER PUBLICATIONS

Universal Mobile Telecommunications System (UMTS); MAC protocol specification (3G TS 25.321 version 3.2.0 Release 1999), pub. Feb. 1, 2000., ETSI/3GPP, entire document.*

(Continued)

*Primary Examiner*—Doris H. To
*Assistant Examiner*—Ian N. Moore
(74) *Attorney, Agent, or Firm*—The Farrell Law Firm

(57) ABSTRACT

A method is disclosed for determining by a UTRAN a persistence value having a value between 0 and 1 for adjusting a number of access preambles from a plurality of UEs requiring assignment of a common packet channel (CPCH). The method includes the steps of counting a number of the access preambles detected in an access preamble period having a predetermined period; and determining the persistence value based on the number of counted access preambles. The persistence value is determined in a unit of transport format (TF), physical common packet channel (PCPCH), or CPCH set.

11 Claims, 52 Drawing Sheets

U.S. PATENT DOCUMENTS 6,665,272 B1 * 12/2003 Pankaj et al. ............... 370/252
2001/0043576 A1 * 11/2001 Terry ........................... 370/328
2004/0081115 A1 * 4/2004 Parsa et al. .................. 370/320

OTHER PUBLICATIONS

TS 25.302, 3rd Generation Partnership Project (3GPP) Technical Specification Group (TSG) RAN; Working group 2 (WG2); Services provided by the physical Layer; Oct. 1999; 3GPP, V3.1.0-entire document.*

European Search Report dated Oct. 16, 2003 issued in a counterpart application, namely, Appln. No. 01 922 112.6.

Universal Mobile Telecommunications System (UMTS); MAC protocol specification; (3G TS 25.321 version 3.3.0 Release 1999).

Supplementary European Search Report dated Oct. 23, 2002 issued in a counterpart application, namely, EP Appln. No. 01922112.6.

Kim K. et al., "An Access Attempt Overload Control Method in CDMA System", IEICE Transactions on Communications, Institute of Electronics Information and Comm. Eng. Tokyo, JP, vol. E82-B, No. 8, Aug. 1999, pp. 1343-1352.

Universal Mobile Telecommunications System (UMTS): Physical Channels and Mapping of Transport Channels onto Physical Channels (FDD), Jan. 2, 2000, pp. 1-38.

* cited by examiner

FIG. 8A (Prior Art)

| AP_SCRAMBLING CODE #A | CDP_SCRAM-BLING CODE #A | PCP_SCRAMBLING CODE #B | MESSAGE_SCRAMBLING CODE #B |
|---|---|---|---|

801, 803, 805, 807

0   4095 4096   8191 0   20479   ← 38400 CHIPS →

FIG. 8B

| AP_SCRAMBLING CODE #A | CDP_SCRAM-BLING CODE #A | PCP_SCRAMBLING CODE #F | MESSAGE_SCRAMBLING CODE #G |
|---|---|---|---|

811, 813, 815, 817

0   4095 4096   8191 0   20479 0   38399

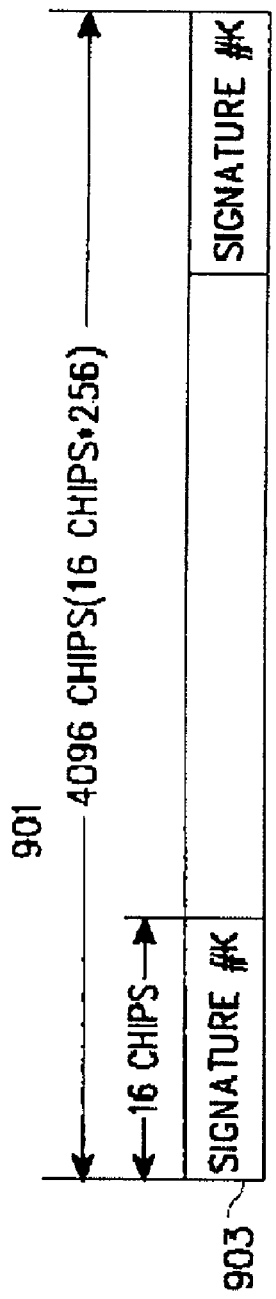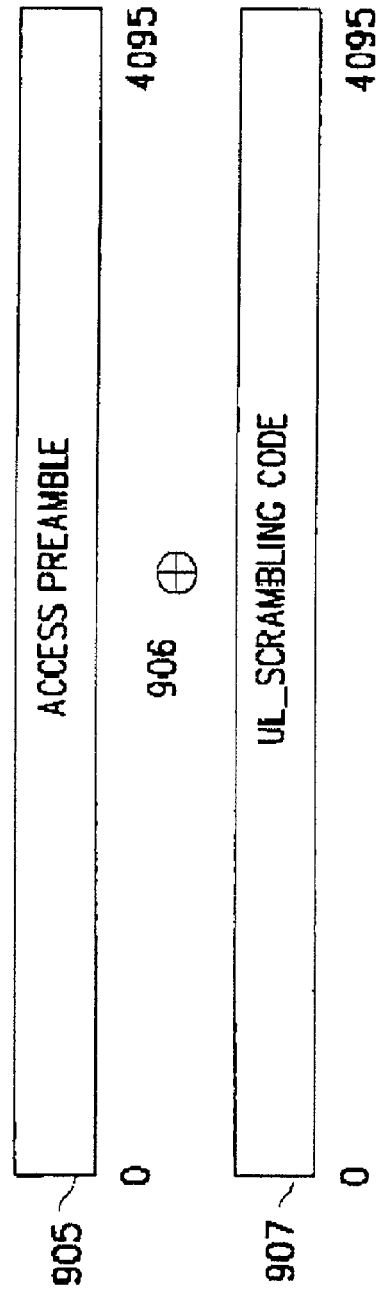
FIG. 9A
FIG. 9B

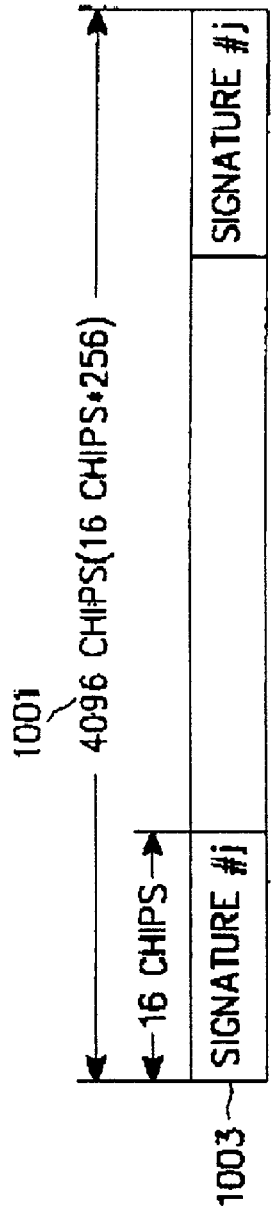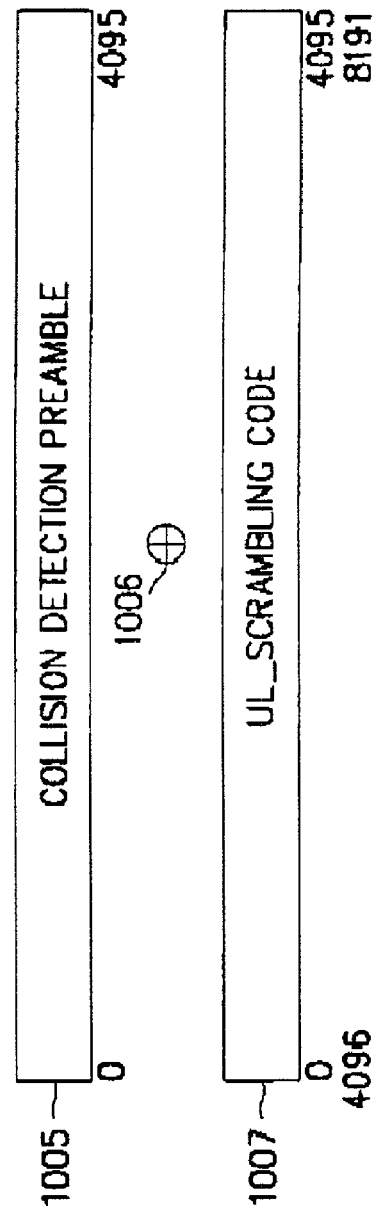

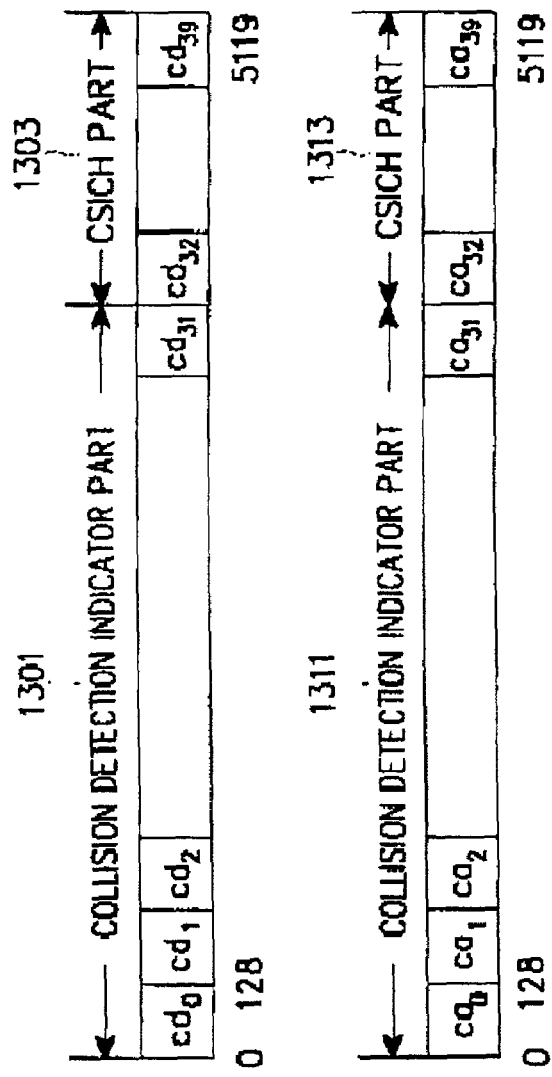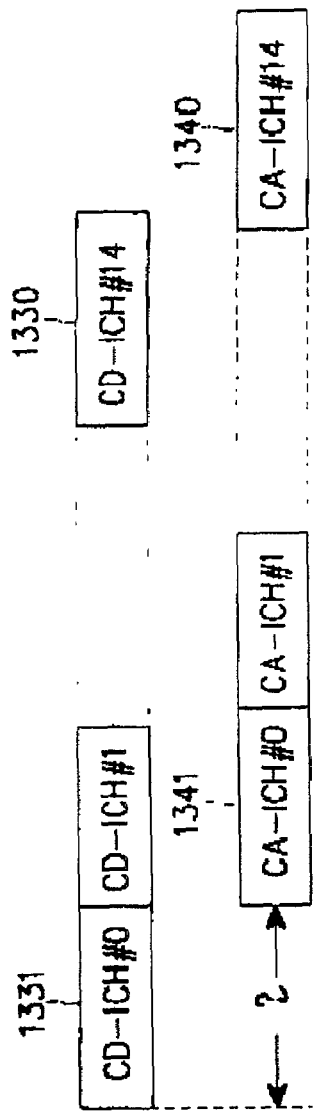

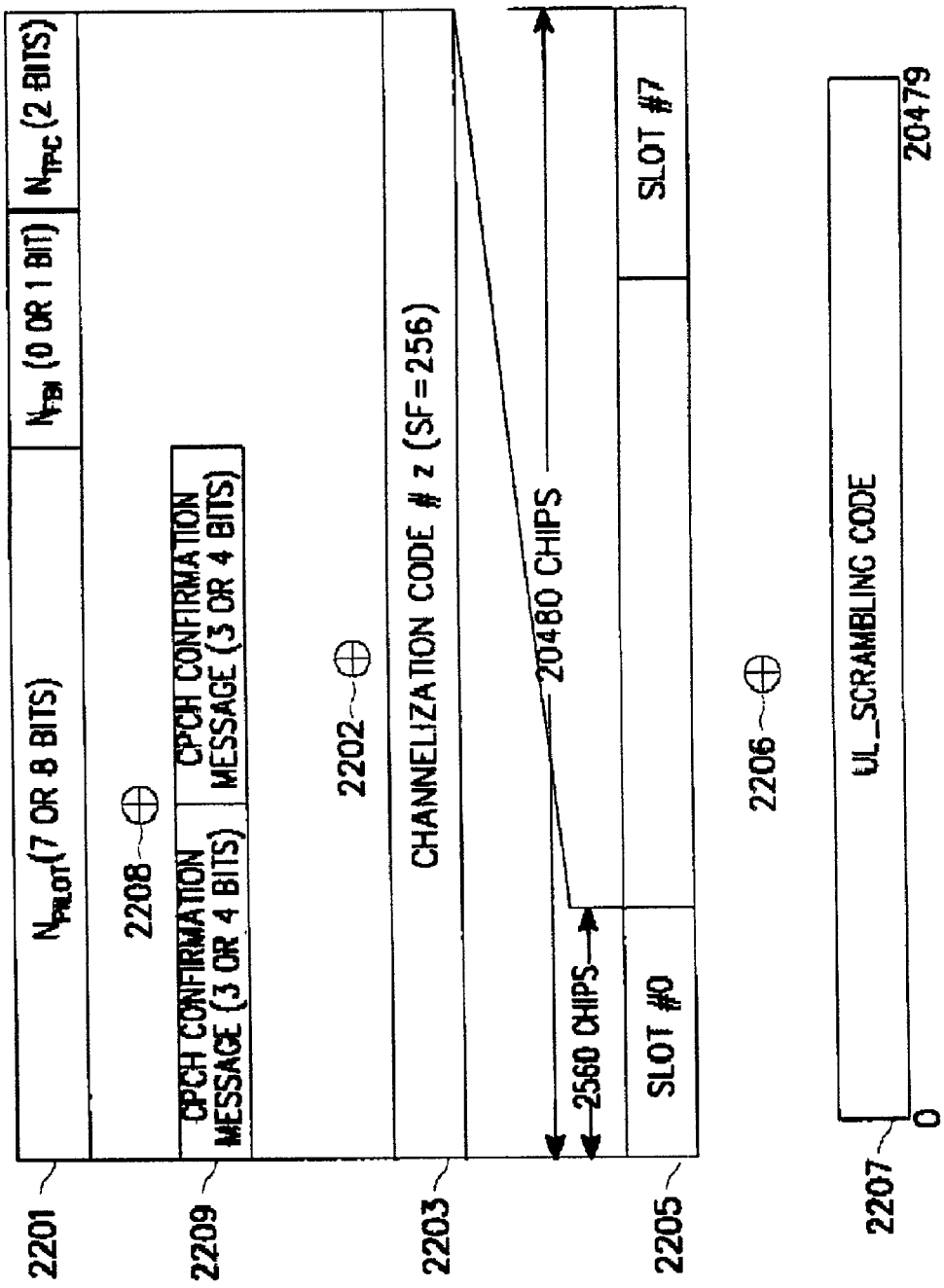

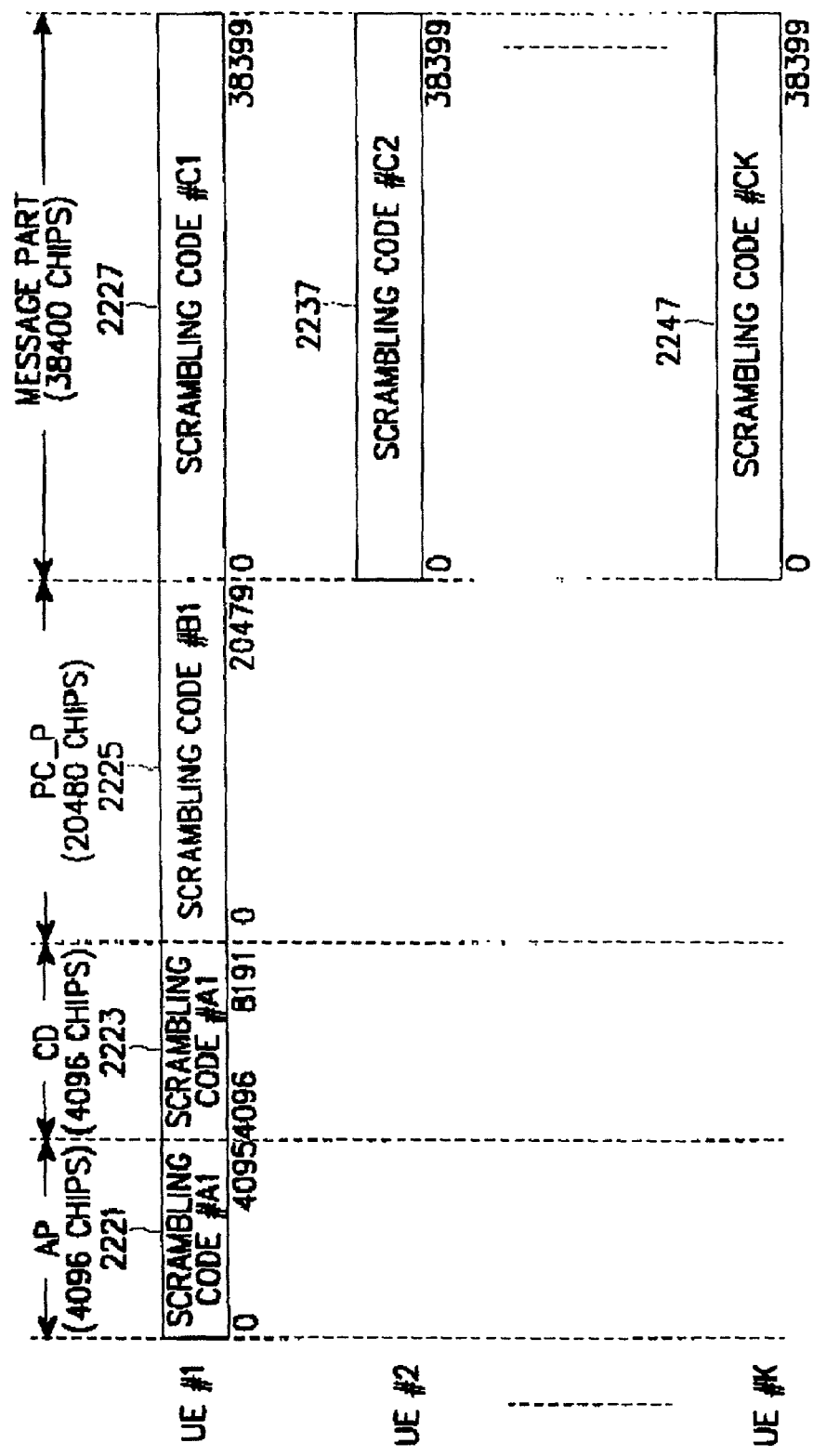

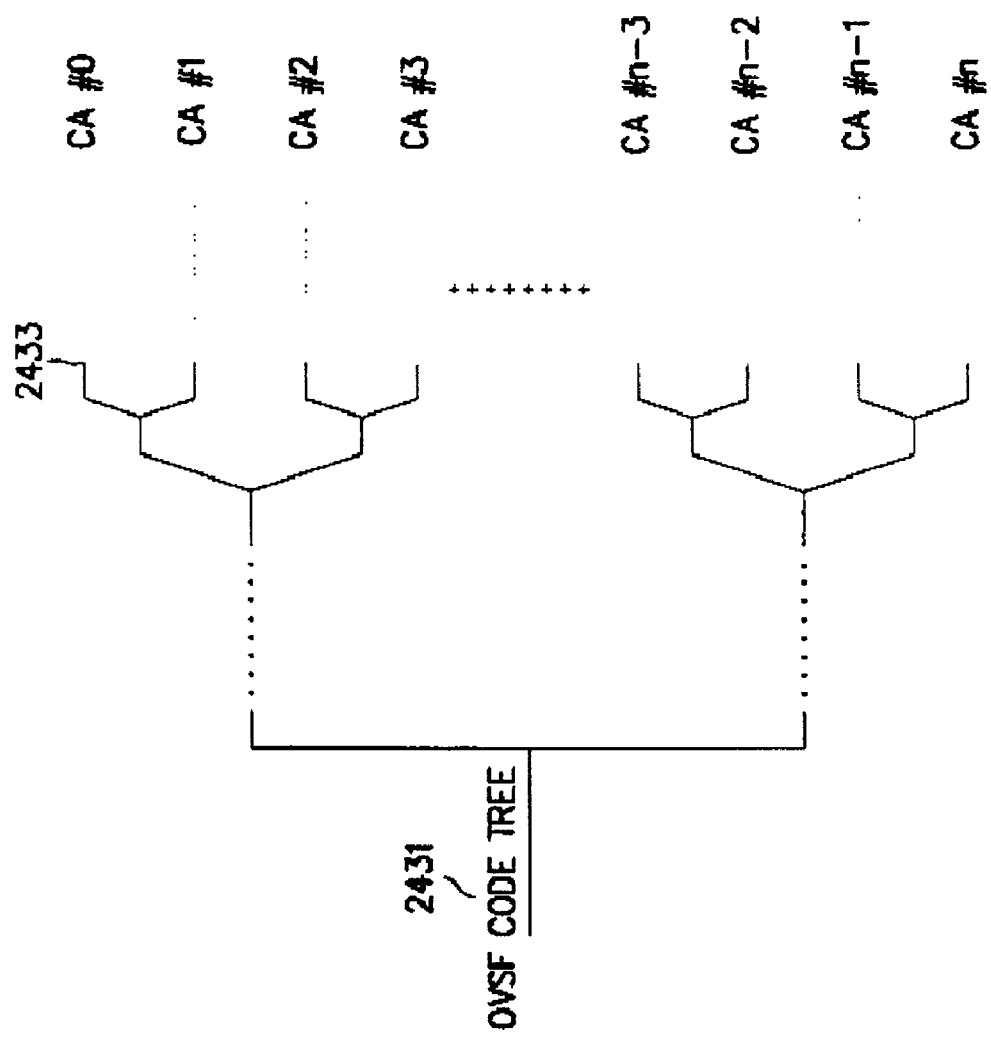

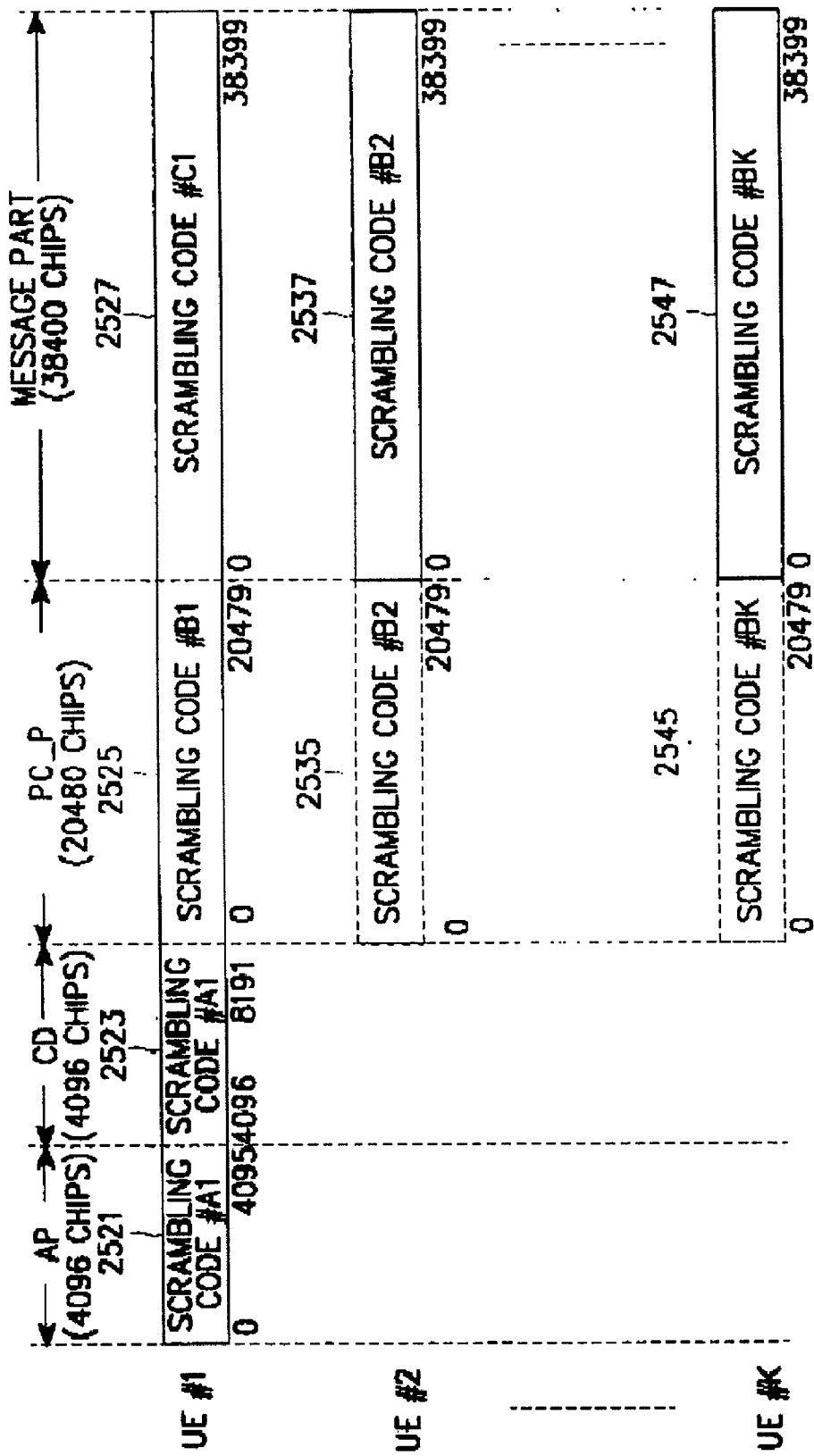

METHOD FOR MEASURING CONFUSION RATE OF A COMMON PACKET CHANNEL IN A CDMA COMMUNICATION SYSTEM

PRIORITY

This application claims priority to an application entitled "Method, for Measuring Confusion Rate of a Common Packet Channel in a CDMA Communication System" filed in the Korean Industrial Property Office on Apr. 10, 2000 and allocated Serial No. 2000-18752; an application entitled "Method for Measuring Confusion Rate of a Common Packet Channel in a CDMA Communication System" filed in the Korean Industrial Property Office on Apr. 25, 2000 and allocated Serial No. 2000-22027; and an application entitled "Method for Measuring Confusion Rate of a Common Packet Channel in a CDMA Communication System" filed in the Korean Industrial Property Office on May 23, 2000 and allocated Serial No. 2000-28773; the contents of all three applications are hereby incorporated by reference.

BACKGROUND OF THE INVENTION

1. Field of the Invention

The present invention relates generally to a common channel communication apparatus and method for a CDMA (Code Division Multiple Access) communication system, and in particular, to a method for measuring a, confusion rate of a common packet channel in use in an asynchronous CDMA communication system.

2. Description of the Related Art

An asynchronous CDMA communication system, such as the UMTS (Universal Mobile Telecommunications System) W-CDMA (Wideband Code Division Multiple Access) communication system, uses a random access channel (RACH) and a common packet channel (CPCH) for an uplink (or reverse) common channel.

FIG. 1 is a diagram for explaining how to transmit and receive a traffic signal over the RACH, which is one of the conventional asynchronous uplink common channels. In FIG. 1, reference numeral 151 indicates a signal transmission procedure of an uplink channel, which can be the RACH. Further, reference numeral 111 indicates an access preamble-acquisition indicator channel (AICH), which is a downlink (or forward) channel. The AICH is a channel over which a UTRAN (UMTS Terrestrial Radio Access Network) receives a signal transmitted from the RACH and responds to the received signal. The signal transmitted by the RACH is called an "access preamble" (AP), which is created by randomly selecting a signature for the RACH.

The RACH selects an access service class (ASC) according to the type of transmission data, and acquires from the UTRAN the right to use a channel using a RACH subchannel group and an AP defined in the ASC.

Referring to FIG. 1, a user equipment (UE; or a mobile station in CDMA-2000 system) transmits an AP 162 of specific length using the RACH and then awaits a response from the UTRAN (or a base station in the CDMA-2000 system). If there is no response from the UTRAN for a predetermined time, the UE increases transmission power by a specific level as represented by reference numeral 164 and retransmits the AP at the increased transmission power. Upon detecting the AP transmitted over the RACH, the UTRAN transmits a signature 122 of the detected AP over the downlink AICH. After transmitting the AP, the UE determines whether the transmitted signature is detected from the AICH signal that the UTRAN has transmitted in response to the AP. In this case, if the signature used for the AP transmitted over the RACH is detected, the UE determines that the UTRAN has detected the AP and transmits a message over the uplink access channel.

Otherwise, upon failure to detect the transmitted signature from the AICH signal that the UTRAN has transmitted within a set time $T_{p\text{-}AI}$ after transmission of the AP 162, the UE judges that the UTRAN has failed to detect the preamble, and retransmits the AP after a lapse of a preset time. As represented by reference numeral 164, the AP is retransmitted at transmission power increased by $\Delta P(dB)$ from the transmission power at which the AP was previously transmitted. The signature used to create the AP is randomly selected from the signatures defined in the ASC selected by the UE. Upon failure to receive the AICH signal using the transmitted signature from the UTRAN after, transmission of the AP, the UE changes, after a lapse of a set time, the transmission power and signature of the AP and repeatedly performs the above operation. In the process of transmitting the AP and receiving the AICH signal, if the signature transmitted by the UE itself is received, the UE spreads, after a lapse of a preset time, a RACH message 170 with a scrambling code for the signature, and transmits the spread RACH message using a predetermined channelization code at a transmission power level corresponding to the preamble to which the UTRAN has responded with the AICH signal (i.e., at initial power for an uplink common channel message).

As described above, by transmitting the AP using the RACH, it is possible for the UTRAN to efficiently detect the AP and to readily set the initial power of an uplink common channel message. However, since the RACH is not power controlled, it is difficult to transmit packet data, which has a long transmission time because the UE has a high data rate or has a large amount of transmission data. In addition, since the channel is allocated through one AP_AICH (Access Preamble-Acquisition Indicator Channel), the UEs that have transmitted the AP using the same signature will use the same channel. In this case, the data transmitted by the different UEs collide with one another, so that the UTRAN cannot receive the data.

To solve this problem, a method for suppressing a collision between the UEs while power controlling the uplink common channel has been proposed for the W-CDMA system. This method is applied to a common packet channel (CPCH). The CPCH enables power control of the uplink common channel, and shows a higher reliability as compared with the RACH in allocating the channel to different UEs. Thus, the CPCH enables the UE to transmit a data channel of a high rate for a predetermined time (from several tens to several hundreds of ms). Further, the CPCH enables the UE to rapidly transmit an uplink transmission message, which is smaller in size than a specific value, to the UTRAN without using a dedicated channel.

In order to establish the dedicated channel, many related control messages are exchanged between the UE and the UTRAN, and a long time is required in transmitting and receiving the control messages. Therefore, exchanging many control messages during the transmission of data of a comparatively small size (several tens to several hundreds of ms) creates a situation where valuable channel resources are allocated to control messages rather than data. The control messages are referred to as overhead. Thus, it is more effective to use the CPCH when transmitting data of a small size.

However, since several UEs transmit preambles using several signatures in order to acquire the right to use the CPCH, there may occur a collision between the CPCH signals from the UEs. To avoid this phenomenon, a method is needed for allocating to the UEs the right to use the CPCH.

The asynchronous mobile communication system uses a downlink scrambling code to distinguish the UTRANs, and uses an uplink scrambling code to distinguish the UEs. Further, the channels transmitted from the UTRAN are distinguished using an orthogonal variable spreading factor (OVSF) code, and the channels transmitted by the UE are also distinguished using the OVSF code.

Therefore, the information required by the UE to use the CPCH, includes a scrambling code used for a message part of the uplink CPCH channel; an OVSF code used for the message part (UL_DPCCH) of the uplink CPCH; an OYSF code used for a data part (UL_DPDCH) of the uplink CPCH; a maximum data rate of the uplink CPCH; and a channelization code for a downlink dedicated channel (DL_DPCCH) used for power control of the CPCH. The above information is typically required when establishing a dedicated channel between the UTRAN and the UE. Further, the above information (overhead) is transmitted to the UE through transmission of signaling signals before establishment of the dedicated channel. However, since the CPCH is a common channel rather than a dedicated channel, the above information is conventionally represented by a combination of the signatures used in the AP and the CPCH sub-channels to which the sub-channel concept used in the RACH is introduced, in order to allocate the information to the UE.

FIG. 2 shows a prior art signal transmission procedure of the downlink and uplink channel signals. In FIG. 2, in addition to the method used for the RACH for transmitting the AP, a collision detection preamble (CD_P) 217 is used to prevent a collision between CPCH signals from the different UEs.

In FIG. 2, reference numeral 211 indicates an operating procedure of an uplink channel performed when the UE requests allocation of the CPCH, and reference numeral 201 indicates an operating procedure of the UTRAN to allocate the CPCH to the UE. In FIG. 2, the UE transmits an AP 213. For a signature constituting the AP 213, it is possible to use a selected one of the signatures used in the RACH or to use the same signature, and the signature can be distinguished using the different scrambling codes.

The signature constituting the AP is selected by the UE based on the above-stated information, as opposed to the method where the RACH randomly selects the signature. That is, to each signature are mapped an OVSF code to be used for the UL_DPCCH; an OVSF code to be used for the UL_DPDCH; an OVSF code to be used for the UL_Scrambling code and DL_DPCCH; the maximum frame number; and a data rate. Therefore, in the UE, selecting one signature is equivalent to selecting four kinds of the information mapped to the corresponding signature.

In addition, the UE examines a status of the CPCH channel which can be presently used in the UTRAN to which the UE belongs, through a CPCH status indicator channel (CSICH) transmitted using an ending part of the AP_AICH before transmitting the AP. Thereafter, the UE transmits the AP over the CSICH after selecting the signatures for the channel to be used out of the CPCHs which can be presently used. The AP 213 is transmitted to the UTRAN at initial transmission power set by the UE.

In FIG. 2, if there is no response from the UTRAN within a time 212, the UE retransmits the AP represented by AP 215, the higher power level transmission. The number of retransmissions of the AP and the waiting time 212 are set before a process for acquiring the CPCH channel is started, and the UE stops the CPCH channel acquisition process when the retransmission number exceeds a set value.

Upon receipt of the AP 215, the UTRAN compares the received AP with the APs received from other UEs. Upon selecting the AP 215, the UTRAN transmits AP_AICH 203 as ACK after a lapse of a time 202. There are several criteria on which the UTRAN bases its comparison of the received APs to select the AP 215. For example, the criteria may correspond to a case where the CPCH, for which the UE has requested the UTRAN through the AP, is available, or a case where the receiving power of the AP received by the UTRAN satisfies the minimum receiving power requested by the UTRAN. The AP_AICH 203 includes a value of the signature constituting the AP 215 selected by the UTRAN. If the signature transmitted by the UE itself is included in the AP_AICH 203 received after transmitting the AP 215, the UE transmits a collision detection preamble (CD_P) 217 after a lapse of a time 214, a time beginning at the time when AP 215 was originally transmitted.

A reason for transmitting the CD_P 217 is to prevent a collision between transmission channels from the various UEs. That is, many UEs belonging to the UTRAN may request the right to use the same CPCH by simultaneously transmitting the same AP to the UTRAN, and as a result, the UEs receiving the same AP_AICH may try to use the same CPCH, thereby causing a collision. Each of the UEs which have simultaneously transmitted the same AP, selects the signature to be used for the CD_P and transmits the CD_P. Upon receipt of the CD_Ps, the UTRAN can select one of the received CD_Ps and respond to the selected CD_P. For example, a criterion for selecting the CD_P can be a receiving power level of the CD_P received from the UTRAN. For the signature constituting the CD_P 217, one of the signatures for the AP can be used, and it can be selected in the same manner as in the RACH. That is, it is possible to randomly select one of the signatures used for the CD_P and transmit the selected signature.

Alternatively, only one signature can be used for the CD_P. When there is only one signature used for the CD_P, the UE selects a randomized time point in a specific time period to transmit the CD_P at the selected time point.

Upon receipt of the CD_P 217, the UTRAN compares the received CD_P with the CD_Ps received from other UEs. Upon selecting the CD_P 217, the UTRAN transmits a collision detection indicator channel (CD_ICH) 205 to the UEs after a lapse of a time 206. Upon receipt of the CD_ICH 205 transmitted from the UTRAN, the UEs check whether a value of the signature used for the CD_P transmitted to the UTRAN is included in the CD_ICH 205, and the UE, for which the signature used for the CD_P is included in the CD_ICH 205, transmits a power control preamble (PC_P) 219 after a lapse of a time 216.

The PC_P 219 uses an uplink scrambling code determined while the UE determines a signature to be used for the AP, and the same channelization code (OVSF) as a control part (UL_DPCCH) 221 during transmission of the CPCH. The PC_P 219 is comprised of pilot bits, power control command bits, and feedback information bits. The PC_P 219 has a length of 0 or 8 slots. The slot is a basic transmission unit used when the UMTS system transmits over a physical channel, and has a length of 2560 chips when the UMTS system uses a chip rate of 3.84 Mcps (chips per second). When the length of the PC_P 219 is 0 slots, the present radio environment between the UTRAN and the UE is good, so that the CPCH message part can be transmitted at the transmission power at which the CD_P was transmitted, without separate power control. When the PC_P 219 has a length of 8 slots, it is necessary to control transmission power of the CPCH message part.

The AP 215 and the CD_P 217 may use the scrambling codes which have the same initial value but have different start points. For example, the AP can use $0^{th}$ to $4095^{th}$ scrambling codes of length 4096, and the CD_P can use $4096^{st}$ to $8191^{st}$ scrambling codes of length 4096. The AP and CD_P can use the same part of the scrambling code having the same initial value, and such a method is available when the W-CDMA system separates the signatures used for the uplink common channel into the signatures for the RACH and the signatures for the CPCH. For the scrambling code, the PC_P 219 uses the $0^{th}$ to $21429^{th}$ values of the scrambling code having the same initial value as the scrambling code used for, AP 215 and CD_P 217. Alternatively, for the scrambling code for the PC_P 219, a different scrambling code can also be used which is mapped one-to-one with the scrambling code used for AP 215 and CD_P 217.

Reference numerals 207 and 209 denote a pilot field and a power control command field of a dedicated physical control channel (DL_DPCCH) out of a downlink dedicated physical channels (DL_DPCHs), respectively. The DL_DPCCH can use either a primary downlink scrambling code for distinguishing the UTRANs or a secondary scrambling code for expanding the capacity of the UTRAN. For a channelization code OVSF to be used for the DL_DPCCH, a channelization code which is determined when the UE selects the signature for the AP is used. The DL_DPCCH is used when the UTRAN performs power control on the PC_P or CPCH message transmitted from the UE. The UTRAN measures receiving power of a pilot field of the PC_P 219 upon receipt of the PC_P 219, and controls transmission power of the uplink transmission channel transmitted by the UE, using the power control command 209. The UE measures power of a DL_DPCCH signal received from the UTRAN to apply a power control command to the power control field of the PC_P 219, and transmits the PC_P to the UTRAN to control transmission power of a downlink channel incoming from the UTRAN.

Reference numerals 221 and 223 denote a control part UL_DPCCH and a data part UL_DPDCH of the CPCH message, respectively. For a scrambling code for spreading the CPCH message of FIG. 2, a scrambling code is used which is identical to the scrambling code used for the PC_P 219. For the used scrambling code, the $0^{th}$ to $38399^{th}$ scrambling codes of length 38400 in a unit of 10 ms are used. The scrambling code used for the message of FIG. 2 can be either a scrambling code used for the AP 215 and the CD_P 217, or another scrambling code that is mapped on a one-to-one basis.

The channelization code OVSF used for the data part 223 of the CPCH message is determined according to a method previously appointed between the UTRAN and the UE. That is, since the signature to be used for the AP and the OVSF code to be used for the UL_DPDCH are mapped, the OVSF code to be used for the UL_DPDCH is determined by determining the AP signature to be used. For the channelization code used by the control part (UL_DPCCH) 221, a channelization code is used which is identical to the OVSF code used by the PC_P. When the OVSF code to be used for the UL_DPDCH is determined, the channelization code used by the control part (UL_DPCCH) 221 is determined according to an OVSF code tree structure.

With continued reference to FIG. 2, the prior art enables power control of the channels in order to increase efficiency of the CPCH, which is the uplink common channel, and decreases the chance of a collision between uplink signals from the different UEs, by using the CD_P and the CD_ICH. However, in the prior art, the UE selects all the information for using the CPCH and transmits the selected information to the UTRAN. This selecting method can be performed by combining a signature of the AP, a signature of the CD_P and the CPCH sub-channel transmitted from the UE. In the prior art, even though the UE requests allocation of the CPCH channel required by the UTRAN by analyzing a status of the CPCH, which is presently used in the UTRAN, by using the CSICH, the fact that the UE previously determines all the information required for transmitting the CPCH and transmits the determined information will result in a limitation of the allocation of resources of the CPCH channel and a delay in acquiring the channel.

The limitations on allocation of the CPCH channel are as follows. Although there exist several available CPCHs in the UTRAN, if the UEs in the UTRAN require the same CPCH, the same AP will be selected. Although the same AP_AICH is received and the CD_P is transmitted again, the UEs which transmitted the non-selected CD_P should start the process for allocating the CPCH from the beginning. In addition, although the CD_P selecting process is performed, many UEs still receive the same CD_ICH, increasing a probability that a collision will occur during uplink transmission of the CPCH. Further, although the CSICH is checked and the UE requests the right to use the CPCH, all of the UEs in the UTRAN which desire to use the CPCH receive the CSICH. Therefore, even though an available channel is required out of the CPCHs, there is a case where several UEs simultaneously request channel allocation. In this case, the UTRAN cannot but allocate the CPCH requested by one of the UEs, even though there are other CPCHs which can be allocated.

With regard to the delay in acquiring the channel, when the case occurs which has been described with reference to the limitations on allocation of the CPCH channel, the UE should repeatedly perform the CPCH allocation request to allocate the desired CPCH channel. When there is used a method for transmitting the CD_P at a given time for a predetermined time using only one signature for the CD_P introduced to reduce the complexity of the system, it is not possible to process the CD_ICH of other UEs while transmitting and processing the CD_ICH of one UE.

In addition, the prior art uses one uplink scrambling code in association with one signature used for the AP. Thus, whenever the CPCH used in the to UTRAN increases in number, the uplink scrambling code also increases in number, causing a waste of resources.

In the RACH, a control radio network controller (CRNC) controls transmission of an AP used for channel acquisition by UEs using a persistence value. The CRNC is included in the UTRAN which manages a Node B. The Node B corresponds to a base station in an asynchronous mobile communication system.

The persistence value is a number between '0' and '1', and is periodically transmitted to the UEs by the CRNC. The UEs then determine transmission of the AP based on the received persistence value. That is, the UEs select a random number before transmission of the AP. If the selected random number is smaller than the persistence value, the UEs transmit the AP. Otherwise, if the selected random number is larger than the persistence value, the UEs temporarily stop transmission of the AP and after a lapse of a predetermined delay time, restart transmission of the AP.

The CRNC indispensably needs a measurement value provided from the Node B in order to determine the persistence value. A process in which the Node B provides the measurement value to the CRNC is called a "common measurement procedure".

The common measurement procedure is used for common transport channels. An acknowledged RA tries value is a typical example of a measurement value for the RACH, transmitted using the common measurement procedure. The acknowledged RA tries value represents the number of acknowledged physical layer AP tries per transmission time interval (TTI). This value indicates a frequency of using the RACH channel, and is used when the CRNC determines the persistence value.

Each RACH is given one persistence value. Alternatively, the RACH is given the persistence value according to ASC.

On the other hand, the CPCH is given one persistence value per (or in a unit of) transport format (TF). The TF is filled with information related to an amount of transmission data and a data rate. Therefore, in order to determine such persistence values, the CRNC must acquire corresponding information per TF. However, the Node B does not transmit such information to the CRNC. Therefore, the CRNC determines the persistence value by estimating the channel condition of each TF depending upon only an amount of the data transmitted over the transport channel without the information provided from the Node B, thus making it difficult to effectively control transmission of the AP.

SUMMARY OF THE INVENTION

It is, therefore, an object of the present invention to provide an apparatus and method for transmitting a message over a common channel in a CDMA communication system.

It is another object of the present invention to provide a downlink acquisition indicator channel (AICH) over which a mobile station receiver can receive an acquisition indicator channel with a low complexity.

It is further another object of the present invention to provide a method for enabling a mobile station to simply detect several signatures transmitted over the downlink acquisition indicator channel.

It is yet another object of the present invention to provide a channel allocation method for performing efficient power control on an uplink common channel for transmitting a message over a common channel in a CDMA communication system.

It is still another object of the present invention to provide a channel allocation method for rapidly allocating an uplink common channel for transmitting a message over a common channel in a CDMA communication system.

It is still another object of the present invention to provide a reliable channel allocation method for allocating an uplink common channel for transmitting a message over a common channel in a CDMA communication system.

It is still another object of the present invention to provide a method for correcting errors occurring in an uplink common channel communication method for transmitting a message over a common channel in a CDMA communication system.

It is still another object of the present invention to provide a method for detecting and managing a collision of an uplink between UEs in an uplink common channel communication method for transmitting a message over a common channel in a CDMA communication system.

It is still another object of the present invention to provide a device and method for allocating a channel so as to transmit a message over an uplink common channel in a W-CDMA communication system.

It is still another object of the present invention to provide a device and method which can detect an error which has occurred in a channel allocation message or a channel request message in an uplink common channel communication method for transmitting a message over a common channel in a CDMA communication system.

It is still another object of the present invention to provide a method for correcting an error that has occurred in a channel allocation message or a channel request message in an uplink common channel communication system for transmitting a message over a common channel in a CDMA communication system.

It is still another object of the present invention to provide a device and method which uses a power control preamble to detect an error which has occurred in a channel allocation message or a channel request message in an uplink common channel communication method for transmitting a message over a common channel in a CDMA communication system.

It is still another object of the present invention to provide an apparatus and method for transmitting a single combined code to detect a collision of an uplink common packet channel and to allocate the uplink common packet channel in a CDMA communication system.

It is still another object of the present invention to provide a method for dividing uplink common channels into a plurality of groups and efficiently managing each group.

It is still another object of the present invention to provide a method for dynamically managing radio resources allocated to the uplink common channels.

It is still another object of the present invention to provide a method for efficiently managing uplink scrambling codes allocated to the uplink common channels.

It is still another object of the present invention to provide a method in which the UTRAN informs the UE of the present status of the uplink common channel.

It is still another object of the present invention to provide a device and method for transmitting information, with increased reliability, used when the UTRAN informs the UE of the present status of the uplink common channel.

It is still another object of the present invention to provide an encoding/decoding apparatus and method for transmitting, with increased reliability, information used when the UTRAN informs the UE of the present status of the uplink common channel.

It is still another object of the present invention to provide a device and method for enabling the UE to rapidly determine the present status of the uplink common channel transmitted from the UTRAN.

It is still another object of the present invention to provide a method in which the UE determines whether to use the uplink common channel depending on the status information of the uplink common channel, transmitted from the UTRAN.

It is still another object of the present invention to provide an apparatus and method for allocating an uplink common channel using AP (Access Preamble) and CA (Channel Allocation) signals.

It is still another object of the present invention to provide a mapping method for allocating an uplink common channel using the AP and CA signals.

It is still another object of the present invention to provide a method for operating an upper layer of the UE to transmit data over an uplink common packet channel.

It is still another object of the present invention to provide a method for indicating a data rate of an uplink common channel in combination with an AP signature and an access slot.

It is still another object of the present invention to provide a method for indicating the number of transmission data frames of an uplink common channel in combination with the AP signature and the access slot.

It is still another object of the present invention to provide a method in which the UTRAN allocates an uplink common channel to the UE according to a group of the maximum data rates per CPCH set.

It is still another object of the present invention to provide an apparatus and method for simultaneously performing uplink common channel allocation and uplink outer-loop power control.

It is still another object of the present invention to provide an apparatus and method for transmitting the maximum data rate over a CPCH status indicator channel (CSICH).

It is still another object of the present invention to provide an apparatus and method for transmitting CPCH availability information through the CSICH.

It is still another object of the present invention to provide an apparatus and method for simultaneously transmitting the maximum data rate and the CPCH availability information through the CSICH.

It is still another object of the present invention to provide a method for measuring a confusion rate of a requested CPCH channel in a CDMA communication system.

It is still another object of the present invention to provide a method for measuring a confusion rate of a CPCH channel in use in a CDMA communication system.

To achieve the above and other objects, the present invention provides a method for determining by a UTRAN a persistence value having a value between 0 and 1 for adjusting a number of access preambles from a plurality of UEs requiring assignment of a common packet channel (CPCH). The method includes the steps of counting a number of the access preambles detected in an access preamble period having a predetermined period; and determining the persistence value based on the number of the counted access preambles. The persistence value is determined in a unit of transport format (TF), physical common packet channel (PCPCH), or CPCH set.

BRIEF DESCRIPTION OF THE DRAWINGS

The above and other objects, features and advantages of the present invention will become more apparent from the following detailed description when taken in conjunction with the accompanying drawings in which:

FIG. 8A is a diagram illustrating a structure of an uplink scrambling code according to the prior art;

FIG. 8B is a diagram illustrating a structure of an uplink scrambling code according to an embodiment of the present invention;

FIGS. 9A and 9B are diagrams illustrating a structure of an access preamble for a common packet channel according to an embodiment of the present invention, and a scheme for generating the same;

FIGS. 10A and 10B are diagrams illustrating a channel structure of a collision detection preamble according to an embodiment of the present invention, and a scheme for generating the same;

FIGS. 13A and 13B are diagrams illustrating a CA_ICH according to an embodiment of the present invention, and a scheme for generating the same;

FIG. 22A is a diagram illustrating a method for transmitting a channel allocation confirmation message or a channel request confirmation message from the UE to the UTRAN using the PC_P according to an embodiment of the present invention;

FIG. 22B is a diagram illustrating a structure of the uplink scrambling codes used in FIG. 22A.

FIG. 24B is a diagram illustrating a tree structure of PC_P channelization codes in one-to-one correspondence to the signature of the CA_ICH or the CPCH channel number according to an embodiment of the present invention;

FIG. 25B is a diagram illustrating structures of the uplink scrambling codes used for AP, CD_P, PC_P and CPCH message part by the UEs when transmitting the PC_P using the method of FIG. 25A;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In a CDMA communication system according to the preferred embodiments of the present invention, in order to transmit a message to the UTRAN over the uplink common channel, the UE checks a status of the uplink common channel through the uplink common channel and then transmits a desired access preamble (AP) to the UTRAN. Upon acquisition of the AP, the UTRAN transmits a response signal (or access preamble acquisition indicator signal) in acknowledgment of the AP over the access preamble acquisition indicator channel (AP_AICH). Upon receipt of the access preamble acquisition indicator signal, the UE transmits a collision detection preamble (CD_P) to the UTRAN, if the received access preamble acquisition indicator signal is an ACK signal.

Upon receipt of the collision detection preamble CD_P, the UTRAN transmits to the UE a response signal (or a collision detection indicator channel (CD_ICH) signal) for the received collision detection signal and a channel allocation (CA) signal for an uplink common channel. Upon receipt of the CD_ICH signal and the channel allocation signal from the UTRAN, the UE transmits an uplink common channel message over a channel allocated according to the channel allocation message, if the CD_ICH signal is an ACK signal. Before transmission of this message, it is possible to transmit a power control preamble (PC_P). In addition, the UTRAN transmits power control signals for the power control preamble and the uplink common channel message, and the UE controls transmission power of the power control preamble and the uplink common channel message according to the power control command received over the downlink channel.

In the above description, if the UE has several APs which can be transmitted, a preamble transmitted by the UE can be one of them, and the UTRAN generates AP_AICH in response to the AP and may transmit CA_ICH for allocating the above-stated channel after transmitting the AP_AICH.

Figure 1:
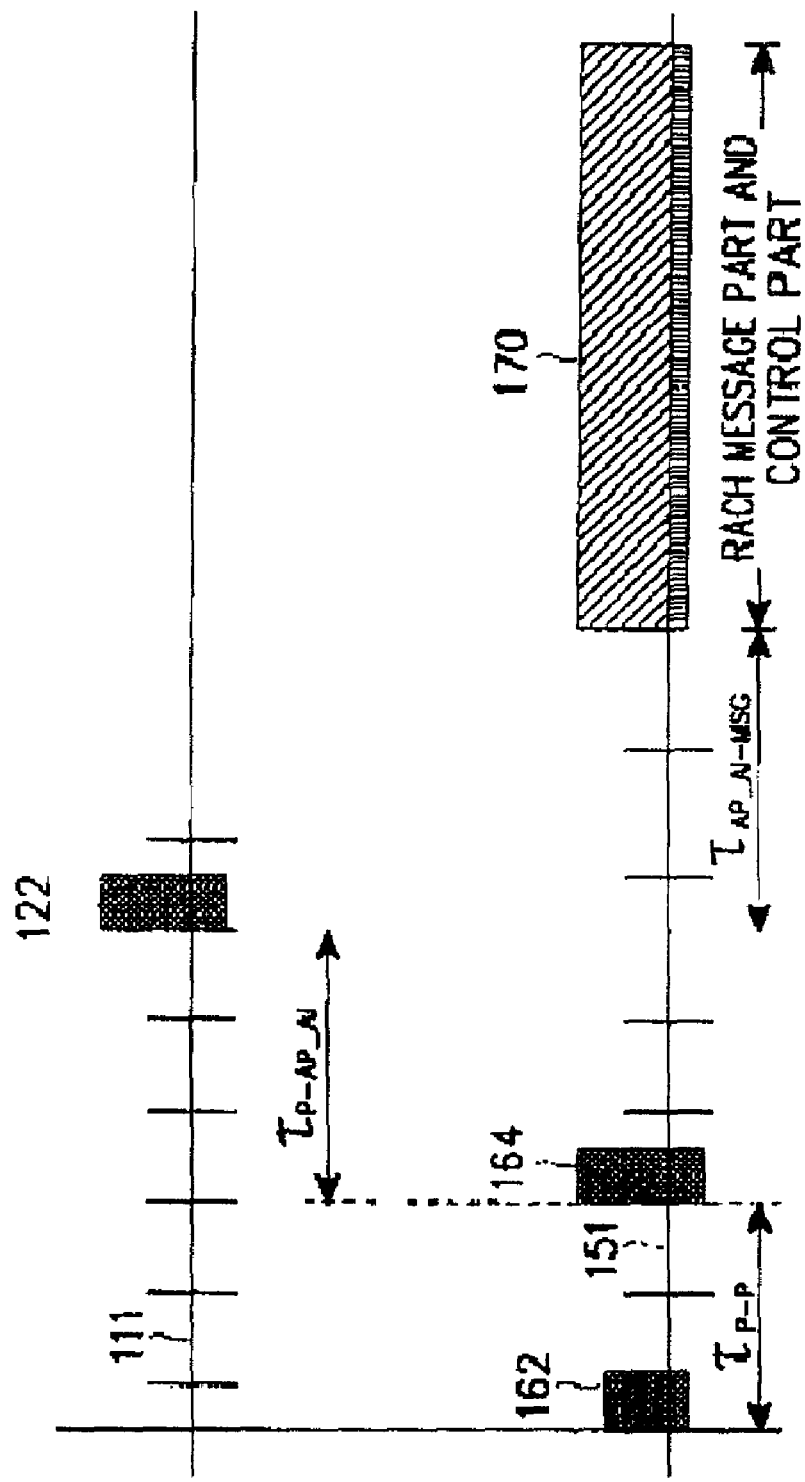
FIG. 1 is a diagram illustrating transmission and reception of a traffic signal over a RACH using conventional asynchronous uplink common channels.
Figure 2:
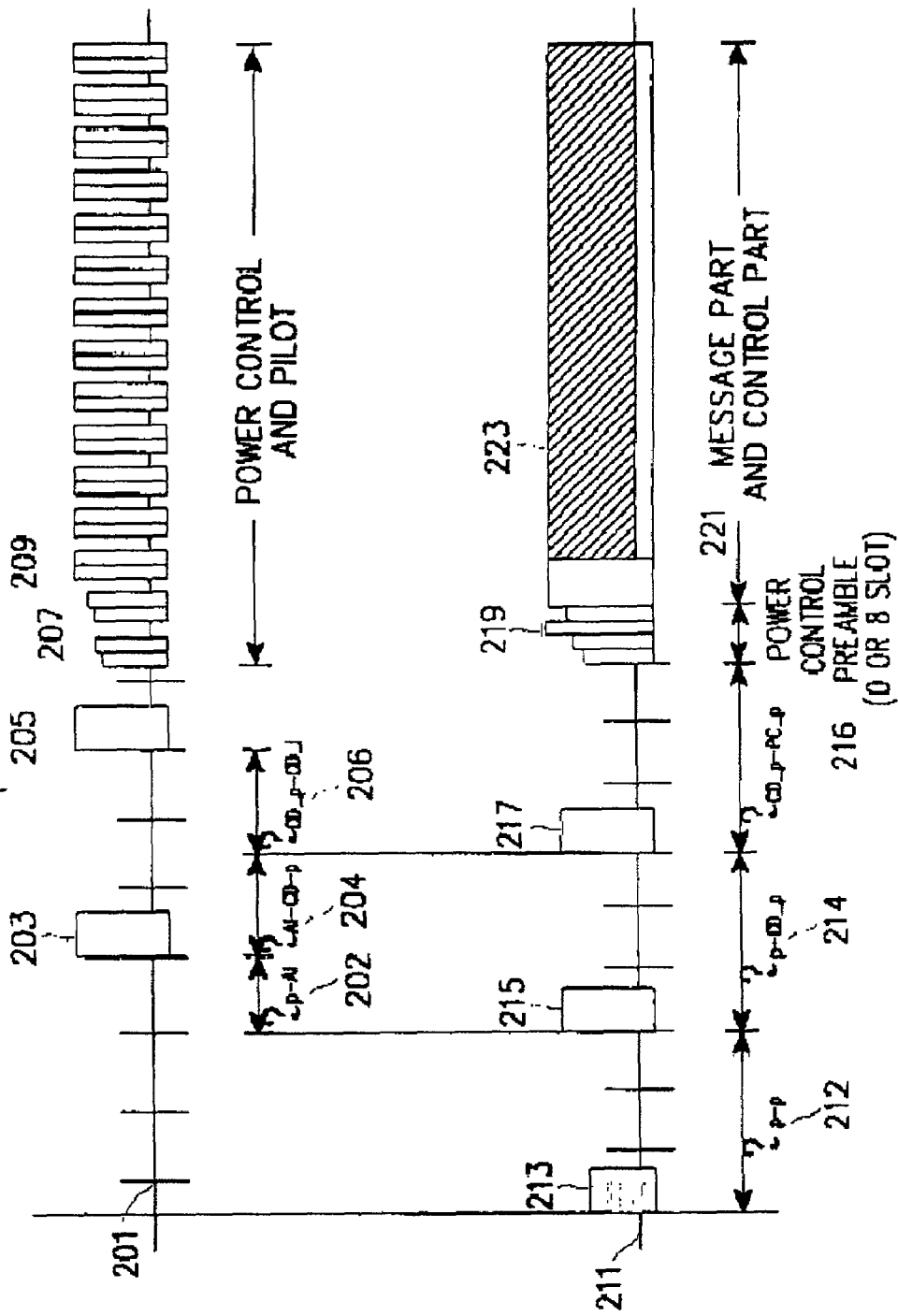
FIG. 2 is a diagram illustrating a signal transmission procedure of conventional downlink and uplink channels.
Figure 3:
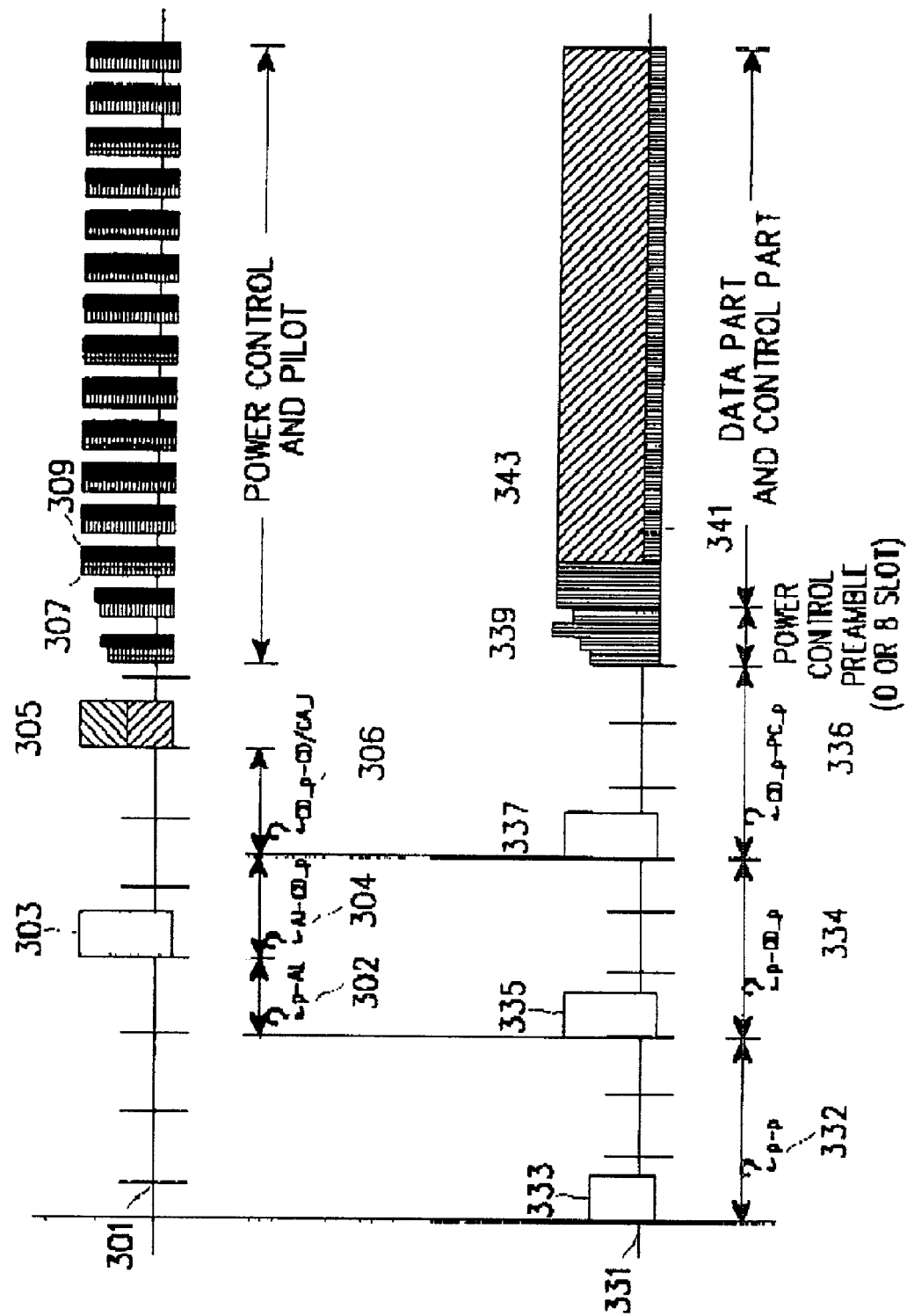
FIG. 3 is a diagram illustrating a signal flow between a UE and a UTRAN to establish an uplink common channel according to an embodiment of the present invention.

FIG. 3 is a diagram illustrating a signal flow between the UE and the UTRAN to establish an uplink common packet channel (CPCH) or an uplink common channel proposed in the preferred embodiments of the present invention. In the preferred embodiments of the present invention, it will be assumed that an uplink common packet channel is used for the uplink common channel. However, a different common channel other than the uplink common packet channel can also be used for the uplink common channel.

Referring to FIG. 3, the UE, after time synchronization with the downlink through a downlink broadcasting channel, acquires information related to the uplink common channel or the CPCH. The information related to the uplink common channel includes information about the number of scrambling codes and signatures used for the AP, and AICH timing of the downlink. Reference numeral 301 indicates a downlink signal transmitted from the UTRAN to the UE, and reference numeral 331 indicates an uplink signal transmitted from the UE to the UTRAN.

When the UE attempts to transmit a signal over the CPCH, the UE first receives information about a status of the CPCHs in the UTRAN over a CPCH status indicator channel (CSICH). Conventionally, the information about a status of the CPCHs refers to information about the CPCHs in the UTRAN, i.e., the number of CPCHs and availability of the CPCHs. However, in the preferred embodiments of the present invention, the information about a status of the CPCHs refers to information about the maximum data rate available for each CPCH, and how many multi-codes can be transmitted when the UE transmits multi-codes over one CPCH. Even when information about availability of each CPCH is transmitted as in the prior art, it is possible to use the channel allocation method according to the present invention. The above data rate is 15 Ksps (symbols per second) up to 960 Ksps in the W-CDMA asynchronous mobile communication system, and the number of multi-codes is 1 to 6.

CPCH Status Indicator Channel (CSICH)

A detailed description will now be made of a CPCH status indicator channel (CSICH) transmitted to the UE by the UTRAN to allocate the CPCH according to an embodiment of the present invention. The present invention proposes a method in which the UTRAN transmits use-status information of physical channels (hereinafter, referred to as common packet channel) and maximum data rate information to the UE over the CSICH, so as to be allocated a desired physical channel.

A description of the CSICH will be given in accordance with the present invention in the following order.

First, a structure of the CSICH for transmitting the use-status information of the CPCH and the maximum data rate information, and a scheme for generating the same will be described.

Second, a method for transmitting the use-status information of the CPCH and the maximum data rate using the CSICH will be described.

A detailed description will now be made regarding a structure of the CSICH for transmitting the use-status information of the CPCH and the maximum data rate, and a scheme for generating the same.

Figure 4:
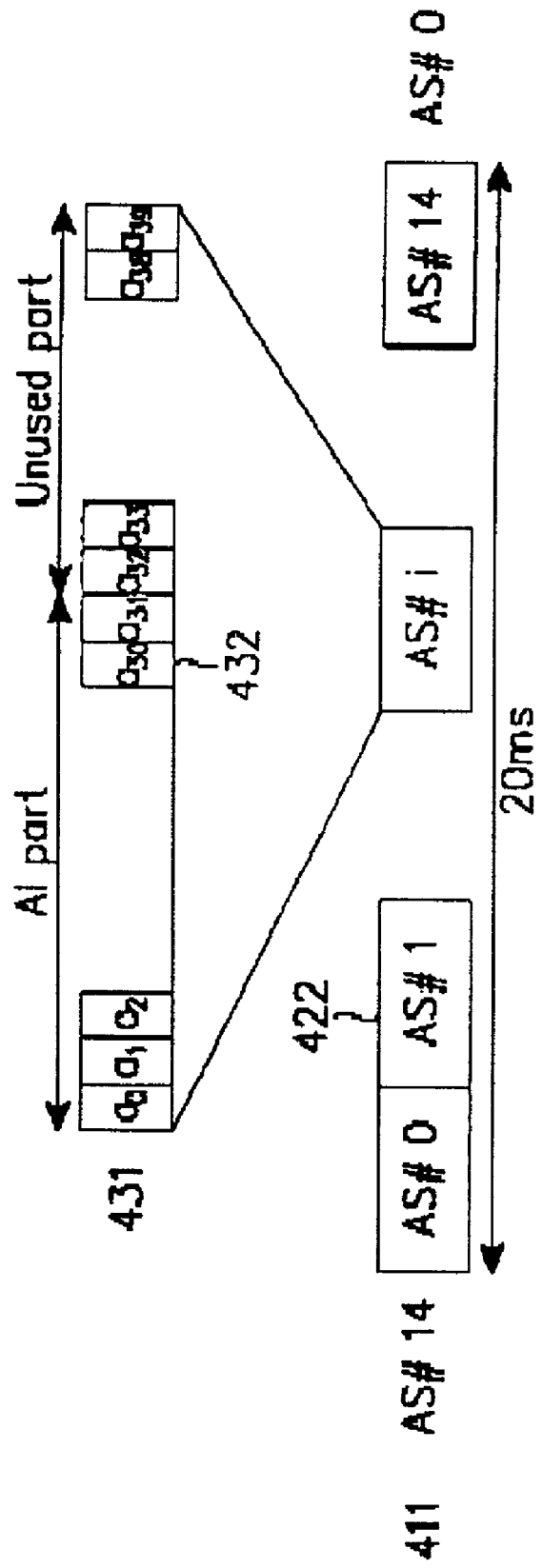
FIG. 4 is a diagram illustrating a structure of a CSICH channel according to an embodiment of the present invention.

FIG. 4 shows a structure of the CSICH according to an embodiment of the present invention. The CSICH shown in FIG. 4 is a channel for transmitting information about a status of the CPCHs within the UTRAN by using the last 8 unused bits out of the access preamble acquisition indicator channel (AICH). The AICH is a channel used by a W-CDMA UTRAN to receive an access preamble (AP) from the UE and send a response to the received AP. The response may be provided as ACK or NAK. The AP is a channel used by the UE to inform, when there exists data to be transmitted over the CPCH, the UTRAN of existence of the transmission data.

With continued reference to FIG. 4, reference numeral 431 indicates a structure where 32-bit AP_AICH part and 8-bit CSICH part are included in one access slot. The access slot is a reference slot for transmitting and receiving the AP and AP_AICH in the W-CDMA system, and 15 access slots are provided for a 20 ms frame as shown by reference numeral 411. Thus, one frame has a length of 20 ms and each access slot in the frame has a length of 5120 chips.

As stated above, reference numeral 431 indicates a structure where the AP_AICH and the CSICH are transmitted in one access slot. When the AP_AICH part has no data to transmit, the AP_AICH part is not transmitted. The AP_AICH and the CSICH are spread with a specific channelization code by a given multiplier. The specific channelization code is a channelization code designated by the UTRAN, and the AP_AICH and the CSICH use the same channelization code.

In this embodiment of the present invention, the spreading factor (SF) of the channelization code is assumed to be 256. The spreading factor means that the OVSF code having a length of spreading factor per symbol is multiplied by the AP_AICH and the CSICH. Meantime, it is possible to transmit different information over the AP_AICH and the CSICH at every access slot, and 120 bits of information (8 bits*15 slots/frame=120 bits/frame) on the CSICH are transmitted for every 20 ms frame. In the foregoing description, the last 8 unused bits of the AP_AICH are used when transmitting the CPCH channel status information over the CSICH. However, since the CD_ICH is identical to the AP_AICH in structure, it is also possible to transmit the CPCH channel status information to be transmitted over the CSICH through the CD_ICH.

As stated above, 120 bits are allocated to the CSICH according to an embodiment of the present invention in one frame, and the use-status information of the CPCH and the maximum data rate information are transmitted over the CSICH. That is, one frame includes 15 slots, and 8 bits are allocated for the CSICH in each slot.

A detailed description will now be made regarding a mapping scheme and method for transmitting, in the UTRAN, the use-status information of the CPCH and the maximum data information rate using the CSICH. That is, the present invention includes a method for mapping the use-status information of the CPCH and the maximum data rate information to 120 bits allocated to one frame.

Further, in this embodiment of the present invention, information transmitted over the CSICH by the UTRAN is, as stated above, includes the maximum data rate information of the CPCH and the use-status information of the respective PCPCHs used in the UTRAN. Meanwhile, the maximum data rate information of the CPCH may be transmitted with information about the number of multi-codes used when multi-code transmission is used in one CPCH.

First, a detailed description will be given regarding a method for transmitting the maximum data rate information of the CPCH in the UTRAN according to an embodiment of the present invention. Herein, the description will be made separately for one case wherein the multi-code transmission is used in one CPCH and another case wherein the multi-code transmission is not used in one CPCH.

Table 1 below shows an exemplary method for transmitting the information on the number of the multi-codes used when the multi-code transmission is used in one CPCH, together with the maximum data rate information of the CPCH out of the information transmitted over the SCICH. Table 1 shows 7 data rates of SF4, SF8, SF16, SF32, SF64, SF128 and SF256 for the maximum data rate of the CPCH, by way of example.

TABLE 1

| Information | Bit Expression |
|---|---|
| Data Rate 15Ksps (SF256) | 0000(000) |
| Data Rate 30Ksps (SF128) | 0001(001) |
| Data Rate 60Ksps (SF64) | 0010(010) |
| Data Rate 120Ksps (SF32) | 0011(011) |
| Data Rate 240Ksps (SF16) | 0100(100) |
| Data Rate 480Ksps (SF8) | 0101(101) |
| Data Rate 960Ksps (SF4) | 0110(110) |
| Number of Multi-codes = 2 | 0111 |

TABLE 1-continued

| Information | Bit Expression |
| --- | --- |
| Number of Multi-codes = 3 | 1000 |
| Number of Multi-codes = 4 | 1001 |
| Number of Multi-codes = 5 | 1010 |
| Number of Multi-codes = 6 | 1011 |

In Table 1, the multi-code has a spreading factor of 4, and it is specified in the W-CDMA system that only the spreading factor of 4 can be used for the channelization code of the UE, when the UE performs the multi-code transmission. As shown in Table 1, in this embodiment of the present invention, the maximum data rate information of the CPCH, transmitted over the CSICH, may be expressed with 4 bits. As a method for transmitting the 4 bits over the CSICH to the UE that desires to use the CPCH, it is possible to repeatedly transmit the 4 bits twice in one 8-bit access slot allocated to the CSICH or using a (8,4) coding method.

In the foregoing description given with reference to Table 1, 4 bits are transmitted including one bit for informing the UE of the number of the multi-codes according to the use of the multi-code. However, when the multi-code is not used, it is also possible to transmit only the 3 bits indicated in parentheses in Table 1. Here, the 3-bit information indicates the maximum data rate information of the CPCH. In this case, it is possible to transmit 8 symbols at one slot by (8,3) coding or to repeat the 3 bits twice, and repeat once more 1 symbol out of the 3 bits.

Next, a detailed description will be made regarding a method for transmitting the use-status information of the PCPCH in the UTRAN according to an embodiment of the present invention.

The PCPCH use-status information to be transmitted is information indicating whether the respective PCPCHs used in the UTRAN are used or not, and the number of the bits of the PCPCH use-status information is determined depending on the total number of the PCPCHs used in the UTRAN. The bits of the PCPCH use-status information can also be transmitted over the CSICH, and to this end, it is necessary to propose a method for mapping the bits of the PCPCH use-status information to a part allocated to the CSICH.

In the following description, the bits in the part allocated to the CSICH out of the bits in the frame will be referred to as CSICH information bits. This mapping method can be determined depending on the number of the CSICH information bits and the total number of the PCPCHs used in the UTRAN, i.e., the number of the bits of the PCPCH use-status information.

First, there is a case where the number of the bits of the PCPCH use-status information due to the total number of the PCPCHs used in the UTRAN is identical to the number of the CSICH information bits in one slot when transmitting the PCPCH use-status information out of the information which can be transmitted over the CSICH. For example, this corresponds to a case where the number of the CSICH information bits in one slot is 8 and the total number of the PCPCHs used in the UTRAN is 8. In this case, it is possible to repeatedly transmit the status information of every PCPCH used in the UTRAN 15 times for one frame by mapping one PCPCH use-status information bit to the one CSICH information bit.

Describing how to use the CSICH information bits in the foregoing case, the $3^{rd}$ CSICH information bit out of a plurality of the CSICH information bits is the use-status information indicating whether the $3^{rd}$ PCPCH out of a plurality of the PCPCHs used in the UTRAN is in use or not. Therefore, transmitting '0' as a value of the $3^{rd}$ CSICH information bit indicates that the $3^{rd}$ PCPCH is presently in use. Alternatively, transmitting '1' as a value of the $3^{rd}$ CSICH information bit indicates that the $3^{rd}$ PCPCH is presently not in use. The meaning of the values '0' and '1' of the CSICH information bit indicating whether the PCPCH is in use or not, may be interchanged.

Next, there is a case where the number of the PCPCH use-status information bits due to the total number of the PCPCHs used in the UTRAN is larger than the number of the CSICH information bits in one slot when transmitting the PCPCH use-status information out of the information which can be transmitted over the CSICH. In this case, it is possible to use a multi-CSICH method for transmitting the use-status information of the PCPCH over at least two CSICHs and another method for transmitting multiple slots or multiple frames over one channel.

In the first method for transmitting the PCPCH use-status information over at least two CSICHs, the PCPCH use-status information is transmitted through CSICH information bits of different channels in a unit of 8 bits. Here, the CSICH information bits of the different channels correspond to the last 8 unused bits out of the bits constituting one access slot of AP_AICH, RACH_IACH and CD/CA_ICH. For example, when the total number of the PCPCHs used in the UTRAN is 24, the 24 PCPCHs are divided in a unit of 8 PCPCHs and the status information of the first 8 PCPCHs is transmitted through the last 8 unused bits out of the bits constituting one access slot of the AP_AICH. The status information of the next 8 PCPCHs is transmitted through the last 8 unused bits out of the bits constituting one access slot of the RACH_AICH. The status information of the last 8 PCPCHs is transmitted through the last 8 unused bits out of the bits constituting one access slot of the CD/CA_ICH.

As stated above, when there are many PCPCH use-status information bits to transmit, it is possible to segment the PCPCH use-status information and transmit the segmented information using all or some of the proposed channels AP_AICH, RACH_AICH and CD/CA_ICH. Since the channels AP_AICH, RACH_AICH and CD/CA_ICH use unique downlink channelization codes, the UE can identify these channels during reception. That is, the UE can receive a multi-CSICH.

In addition, when there are many PCPCH use-status information bits, it is also possible to use a method for assigning a plurality of downlink channelization codes to a plurality of CSICHs and transmitting the CSICHs to the UE.

In the second method for transmitting the PCPCH use-status information over at least two CSICHs, the PCPCH use-status information is transmitted through plural slots or plural frames which are transmitted over one channel in a unit of 8 bits.

For example, if the number of the PCPCH use-status information bits to be transmitted is 60, the 60 bits can be repeatedly transmitted only twice to the CSICH information bits in one frame comprised of 120 bits. Repeating the 60 bits twice may decrease a reliability of the PCPCH use-status information. To solve this problem, it is possible to repeatedly transmit the 60-bit CSICH information over the next frame. It is also possible to divide the 60 bits into 30 bit segments, repeatedly transmit the first 30 bits 4 times to the CSICH information bits in one frame, and then, repeatedly transmit the remaining 40 bits 4 times to the CSICH information bit in the next CSICH frame.

Finally, there is a case where the number of the PCPCH use-status information bits due to the total number of the PCPCHs used in the UTRAN is smaller than the number of the CSICH information bits in one slot when transmitting the PCPCH use-status information out of the information which can be transmitted over the CSICH. In this case, it is possible to transmit the PCPCH use-status information by partially using the 120-bit CSICH information allocated in one frame. That is, the PCPCH use-status information is transmitted by reducing the number of CSICH information bits for transmitting the PCPCH use-status information.

For example, if the PCPCH use-status information to be transmitted is comprised of 4 bits, the PCPCH use-status information is transmitted in the first 4 bits out of the 8 CSICH information bits in the respective access slots constituting one frame and the PCPCH use-status information is not transmitted in the remaining 4 bits. It is possible to transmit null bits known by the UE to the CSICH information bits which do not transmit the PCPCH use-status information. As another example, it is possible to repeatedly transmit 2-bit PCPCH use-status information and 2 null bits in the 8-bit CSICH information in the respective access slots constituting one frame. Otherwise, it is also possible to repeatedly transmit 1-bit PCPCH use-status information and 1 null bit in the 8-bit CSICH information in the respective access slots constituting one frame.

In addition, it is possible to transmit the PCPCH use-status information in the entire 8-bit CSICH information in an initial access slot constituting one frame, and then, transmit null bits in the entire 8-bit CSICH information in the next access slot. That is, this is a method of alternately transmitting the PCPCH use-status information and the null bits at a period of one access slot. Therefore, the PCPCH use-status information is transmitted over the odd-numbered access slots in one frame and the null data is transmitted over the even-numbered access slots. Alternatively, the PCPCH use-status information can be transmitted over the even-numbered access slots and the null data can be transmitted over the odd-numbered access slots. The null bits can be replaced with discontinuous transmission (DTX), which means no data transmission.

In the foregoing case, the UE will receive the PCPCH use-status information and the null bits over one frame. If the UTRAN uses DTX instead of the null bits, the UE can use discontinuous reception (RDX), which means not receiving data in a non-data transmission period.

In the foregoing examples, the UTRAN transmits the PCPCH use-status information to the UEs, so as to enable each UE that desires to transmit data over the CPCH, to be able to monitor the use-status information of the present PCPCH. That is, upon receipt of the PCPCH use-status information transmitted over the CSICH, the UE desiring to use the CPCH can determine whether the PCPCHs available in the UTRAN are available or not. Therefore, the UE desiring to use the CPCH can request assignment of the PCPCH, use of which can be approved by the present UTRAN. The UE desiring to use the CPCH selects an AP signature for requesting assignment of a desired one of the PCPCHs, availabilities of which are confirmed from the PCPCH use-status information, and transmits the selected AP signature to the UTRAN.

Meanwhile, the UTRAN transmits ACK or NAK in response to the AP signature over the AP_AICH. Also, as stated above, the UTRAN transmits the PCPCH use-status information over the AP_AICH. Upon receipt of ACK from the UTRAN over the AP_AICH, the UE selects again a given CD signature and transmits CD_P. The UTRAN then transmits a CA signal together with ACK or NAK in response to the CD_P. Upon receipt of the ACK signal and the CA signal for the CD from the UTRAN, the UE compares the CPCH allocated to it with the result confirmed in the monitoring process. If it is determined that the allocated PCPCH is already in use, it means that the CA has an error. Therefore, the UE can transmit no signal over the allocated PCPCH.

As another method, after the UE has allocated the PCPCH in the foregoing procedure, if it is determined that the allocated PCPCH which was not in use in the previous monitoring process is indicated as being in use in the present monitoring process, it is noted that the CA is normally received. Otherwise, if the allocated PCPCH was already in use in the previous monitoring process or is not indicated as being in use in the present monitoring process, it is noted that the CA has an error. The latter monitoring process can be performed after transmission of the PCPCH or a message, and upon detecting the error, the UE stops signal transmission.

Heretofore, a description is made regarding one method in which the UTRAN transmits the maximum available data rate information to the UE, and another method in which the UTRAN transmits the use-status information of the PCPCH to the UE.

Finally, it is also possible to transmit the two kinds of information at the same time. Several embodiments of this method will be described below.

First Embodiment

In a first embodiment of the method for transmitting the two kinds of information at the same time, some of the slots constituting one frame of the CSICH are used to transmit the maximum data rate information and the remaining slots are used to transmit the use-status information of the PCPCH. One frame of the CSICH used in the present asynchronous standard may have the same length as one access frame. The frame length is 20 ms and includes 15 access slots. As an example of this method, it is assumed that the number of the information bits needed to transmit the maximum data rate used in the UTRAN is 3 and the number of the PCPCHs used in the UTRAN is 40.

In this case, the UTRAN can use 3 of the 15 slots constituting one CSICH frame in transmitting the maximum data rate information, and use the remaining 12 slots in transmitting the PCPCH use-status information. That is, the UTRAN can transmit 24-bit maximum data rate information and 96-bit PCPCH use-status information over one frame.

Therefore, if it is assumed that the same data is transmitted to the I channel and the Q channel in the CSICH, it is possible to repeatedly transmit 3-bit maximum data rate information 4 times in total. In addition, it is possible to transmit once the 40-bit use-status information indicating whether the individual PCPCHs used in the UTRAN are available or not, through the I channel and Q channel. On the contrary, if it is assumed that the different data is transmitted through the I channel and the Q channel, it is possible to transmit 3-bit maximum data rate information 8 times in total.

In addition, it is possible to repeatedly transmit twice the use-status information of the respective PCPCHs used in the UTRAN. In the first method stated above, the positions of a slot for transmitting the maximum data rate information and a slot for transmitting the use-status information of the PCPCHs used by the UTRAN may be arranged at random by the UTRAN or may be previously determined.

As one example of arranging the slot positions, the maximum data rate information can be transmitted through $0^{th}$, $5^{th}$ and $10^{th}$ lots out of the 15 access slots in one CSICH frame, and the PCPCH use-status information can be transmitted through the remaining slots. As another example, it is also possible to transmit the maximum data rate information through the $0^{th}$, $1^{st}$ and $2^{nd}$ slots and the use-status information of the PCPCHs used in the UTRAN through the $3^{rd}$ to $14^{th}$ slots. The above-stated several slots are allocated for the maximum data rate information, and how many remaining slots are to be allocated for the PCPCH use-status information is determined by considering the number of the PCPCHs used in the UTRAN and the repeating frequency of the maximum data rate.

In addition, it is also possible to transmit the maximum data rate information and the PCPCH use-status information by segmenting the information into several CSICH frames according to the amount of the information. Before transmission of the CSICH, an agreement is previously made with the UE on which information is to be transmitted in which slot.

Second Embodiment

In a second embodiment of the method for transmitting the two kinds of information at the same time, the 8 CSICH information bits transmitted in one access slot are divided so as to use several information bits in indicating the maximum data rate and the remaining information bits in indicating the PCPCH use-status information.

For example, when the same bit is transmitted through the I channel and the Q channel, the first 2 bits of one access slot can be used to transmit the information on the maximum data rate available for the PCPCH of the UTRAN, and the remaining 6 bits can be used to transmit the use-status information of the PCPCHs of the UTRAN. Therefore, 1 bit of the maximum data rate information is transmitted through one access slot and 3 bits of the PCPCH use-status information are transmitted through one access slot.

However, when the different bits are transmitted through the I channel and the Q channel, it is possible to transmit the maximum data rate information and the PCPCH use-status information twice as compared with the case where the same bit is transmitted through the I channel and the Q channel.

In the second embodiment, the first 2 bits of one access slot are used to transmit the maximum data rate of the PCPCH and the remaining 6 bits are used to transmit the PCPCH use-status information. However, various modifications may be made. For example, 6 bits of one access slot can be used to transmit the maximum data rate information and 2 bits of one access slot can be used to transmit the PCPCH use-status information. That is, the number and the positions of the bits used to transmit the maximum data rate information of the PCPCH and the PCPCH use-status information can be determined by the UTRAN and notified to the UE. When the number and the positions of the bits used to transmit the maximum data rate information of the PCPCH and the PCPCH use-status information are determined, an agreement is made with the UE before transmission of the CSICH.

In addition, the UTRAN can transmit the two kinds of information over a plurality of access slots or a plurality of frames. Transmitting the two kinds of information over a plurality of frames is performed when the two kinds of information have a large volume or to increase a reliability of the information. The UTRAN may determine the number of access slots for transmitting the two kinds of information, considering the number of bits needed to transmit the maximum data rate information and the PCPCH use-status information. The number of the frames for transmitting the two kinds of information is also determined considering the number of bits needed to transmit the maximum data rate information and the PCPCH use-status information.

Third Embodiment

In a third embodiment of the method for transmitting the two kinds of information at the same time, the information on the maximum data rate available for the PCPCH and the PCPCH use-status information are transmitted through a plurality of CSICHs which may be simultaneously transmitted. For example, the maximum data rate information is transmitted through any one of the CSICHs and the PCPCH use-status information is transmitted through the other CSICHs. As one example, the transmitted CSICHs may be distinguished with the downlink channelization codes or the uplink channelization codes. As another example, it is also possible to transmit 40 CSICH information bits within one access slot by allocating a separate channelization code to one CSICH. If a separate channelization code is allocated to one CSICH as stated above, it is possible to transmit the maximum data rate information of the PCPCH together with the PCPCH use-status information within one access slot.

In the third embodiment, the UTRAN may determine the number of the CSICHs to be transmitted, considering the maximum data rate information of the PCPCH, the information on the total number of the PCPCHs used in the UTRAN, and a reliability of the above information.

Fourth Embodiment

In a fourth embodiment of the method for transmitting the two kinds of information at the same time, the information is transmitted using plural frames. That is, all the CSICH information bits in one frame are used to transmit the information on the maximum data rate available for the PCPCH, and all the CSICH information bits in the other frames are used to transmit the use-status information of the PCPCHs used in the UTRAN.

In this embodiment, the UTRAN can determine the number of frames for transmitting the maximum data rate information of the PCPCH and the number of frames for transmitting the PCPCH use-status information, considering a quantity, of the information to be transmitted over the CSICH and a reliability of the information quantity. Here, an agreement on the determined results is previously made with the UE.

Fifth Embodiment

In a fifth embodiment of the method for transmitting the two kinds of information at the same time, the maximum data rate information is transmitted to a bit in a previously appointed position out of the CSICH information bits. That is, the maximum data rate information of the PCPCH is transmitted through the CSICH information bits in the positions previously agreed between the UTRAN and the UE, out of the CSICH information bits in the frame. Further, the use-status information of the PCPCHs used in the UTRAN is transmitted through the remaining CSICH information bits excepting the CSICH information bits used for transmitting the maximum data rate information.

In the fifth embodiment, an exemplary method for recording the maximum data rate information of the PCPCH in the CSICH information bits before transmission is expressed by Equation (1) below:

$$d_i = \begin{cases} 0 \\ 1 \end{cases} \quad i = 0, 1, \ldots, I-1 \qquad (1)$$

where i indicates the number of the maximum data rate information bits and $d_i$ indicates the maximum data rate information to be transmitted. For example, if $d_i=\{1\ 0\ 1\}$ with i=3, then $d_0=1$, $d_1=0$ and $d_2=1$.

In the fifth embodiment, an exemplary method for recording the PCPCH use-status information in the CSICH information bits before transmission is expressed by Equation (2) below:

$$p_j = \begin{cases} 0 \\ 1 \end{cases} \quad j = 0, 1, \ldots, J-1 \qquad (2)$$

where j indicates the total number of the PCPCHs used per CPCH set in the UTRAN, and $p_j$ indicates the use-status information of the respective PCPCHs. Hence, the number of the PCPCHs is 16 and the PCPCH use-status information, indicating whether the respective PCPCHs are used or not, is $p_j=\{0\ 0\ 0\ 1\ 1\ 1\ 0\ 0\ 1\ 0\ 1\ 0\ 1\ 1\ 0\ 0\}$.

Equation (3) below shows a method for recording '0' in the remaining bits except the bits needed to repeatedly transmit, for a preset number of times, the maximum data rate information together with the PCPCH use-status information out of the total CSICH information bits, when the total number N of the CSICH information bits, which can be transmitted over one frame, are determined.

$$ek=0, k=0, 1, \ldots, K-1$$

or $$ek=1, k=0, 1, \ldots, K-1 \qquad (3)$$

where k indicates the remaining CSICH information bits other than the bits used to transmit the maximum data rate information available for the PCPCH and the use-status information of the respective PCPCHs used in the UTRAN. In particular, k indicates the number of bits experiencing zero-fading or DTX.

Equation (4) below shows the total number N of the CSICH information bits which can be transmitted over one frame.

$$N=I*R+J+K \qquad (4)$$

When N defined in Equation (4) is less than 120, it is selected from divisors of 120. For example, N=3, 5, 15, 30 and 60. In Equation (4), R indicates how many times the maximum data rate information bits are to be repeated in one access frame. In Equation (4), I and J are determined during system implementation and notified to the UE by the UTRAN. Thus, these values can be previously known. That is, these values are given from the upper layer.

As one method for determining the value N, when I and J are known, the value N may be determined as the minimum number among the values 3, 5, 15, 30 and 60, which satisfy the condition of $N \geq I+J$. Alternatively, the UTRAN transmits the value N or R to the UE in addition to the values I and J, so that the value R or N and the value K may be determined from Equation (4).

The order of determining the values N and R is given in three inventive methods as follows.

In a first method, the value N is determined by the given values I and J, and the value R can be determined as a quotient obtained by dividing (N−J) by I, as expressed by Equation (5) below.

$$R = \left\lfloor \frac{(N-J)}{I} \right\rfloor \qquad (5)$$

In a second method, the value N is previously given using a message from the upper layer and the value R is calculated using Equation (5).

In a third method, the value R is previously given using a message from the upper layer and the vane N is calculated using a value of R*I+J.

Meanwhile, the value K can be calculated using a formula $K=N-(R*I+J)$.

There are several methods for arranging the information on the values I, J, R, N and K, and are described hereinbelow.

The N bits are represented by $SI_0, SI_1, \ldots, SI_{N-1}$, where $SI_0$ indicates the first bit and $SI_{N-1}$ indicates the $N^{th}$ bit.

$$r = \left\lfloor \frac{J}{R} \right\rfloor \qquad (6)$$

where r is an intermediate parameter and may be defined as a quotient obtained by dividing J by R.

$$s = J - r*R \qquad (7)$$

where s is an intermediate parameter, which indicates the remaining bits which have failed to be included in R r-bit groups out of J bits. Here, $0 \leq s < R$ and s is a remainder determined by dividing J by R.

A first embodiment for arranging the information bits is as follows.

$$SI_{1(I+r+1)+i}=d_i$$

$$0 \leq i \leq I-1, l=0, 1, \ldots, s-1 \qquad (8)$$

$$SI_{s(I+r+1)+(1-s)*(I+r)+i}=d_i$$

$$0 \leq i \leq I-1, l=0, 1, \ldots, s-1 \qquad (9)$$

Equations (8) and (9) determine to which position of the CSICH the bit indicating the maximum data rate is to be transmitted.

$$SI_{1(I+r+I)+I+j}=p_{1(r+I)+j}$$

$$0 \leq j \leq r, l=0, 1, \ldots, s-1 \qquad (10)$$

$$SI_{s(I+r+I)+(l-s)(I+r)+I+j}=p_{s(r+I)+(l-s)r+j}$$

$$0 \leq j \leq r-1, l=s, s+1, \ldots, R-1 \qquad (11)$$

When the SCICH is transmitted as stated above, the information bits are transmitted in the following order. Thus, the UE is able to know the values I, J, R and K from the foregoing description and accordingly, know the bit arrangement.

For example, if I=3, J=16, N=30, R=4 and K=2, the 3 maximum data rate information bits; the first 5 bits ($1^{st}$ to $5^{th}$ bits) of the 16-bit PCPCH use-status information; the 3 maximum data rate information bits; the next 5 bits ($6^{th}$ to $10^{th}$ bits) of the 16-bit PCPCH use-status information; the 3 maximum data rate information bits; the next 5 bits ($11^{th}$ to $15^{th}$ bits) of the 16-bit PCPCH use-status information; and the 3 maximum data rate bits are repeatedly arranged in sequence in one frame, and the following 2 bits experience DTX or are padded with '0'. Here, the $16^{th}$ bit 's' indicating the last PCPCH use-status information is located at the rear of the first 5 bits ($1^{st}$ to $5^{th}$ bits) out of the 16 bits. If s=2 bits, it is located at the rear of the next block ($6^{th}$ to $10^{th}$ bits).

Equations (10) and (11) determine to which positions of the CSICH the bits indicating the use-status information of the respective PCPCHs used in the UTRAN are to be transmitted.

$$SI_{R*I+J+k}=e_k$$

$$k=0, 1, \ldots, K-1 \qquad (12)$$

Equation (12) determines the positions where the bits remaining after transmitting through the CSICH the maximum data rate information bits of the PCPCH and the use-status information bits of the respective PCPCHs used in the UTRAN, are to experience zero-padding or DTX.

A second embodiment for arranging the information bits is as follows:

$$t = \min[1:1*(r+l) > J] \quad (13)$$

where t is an intermediate parameter, which corresponds how many times the J bits are divided. In Equation (13), t is less than or equal to R.

$$SI_{l(I+r+l)+i} = d_i$$

$$0 \leq i \leq I-1, \; l = 0, 1, \ldots, t-1 \quad (14)$$

$$SI_{j+l*I+i} = d_i$$

$$0 \leq i \leq I-1, \; l = t, t+1, \ldots, R-1 \quad (15)$$

Equations (14) and (15) determine to which positions of the CSICH the bits indicating the maximum data rate are to be transmitted.

$$SI_{l(I+r+l)+I+j} = p_{l(r+l)+j}$$

$$0 \leq j \leq r, \; l = 0, 1, \ldots, t-2 \quad (16)$$

$$SI_{(t-1)(I+r+l)+I+j} = p_{(t-1)(r+1)+j}$$

$$0 \leq j \leq r - (t*(r+l)-J) \quad (17)$$

Equations (16) and (17) determine to which positions of the CSICH the bits indicating the use-status information of the respective PCPCHs used in the UTRAN are to be transmitted.

$$SI_{R*I+J+k} = e_k$$

$$k = 0, 1, \ldots, K-1 \quad (18)$$

Equation (18) determines the positions where the bits remaining after transmitting through the CSICH the maximum data rate information bits of the PCPCH and the use-status information bits of the respective PCPCHs used in the UTRAN, are to experience zero-padding or DTX.

A third embodiment for arranging the information bits is as follows.

$$SI_j = p_j$$

$$0 \leq j \leq J-1 \quad (19)$$

Equation (19) determines to which positions of the CSICH the bits indicating the use-status information of the respective PCPCHs used in the UTRAN are to be transmitted.

$$SI_{J+l*I+i} = d_i$$

$$0 \leq i \leq I-1, \; 0 \leq l \leq R-1 \quad (20)$$

Equation (20) determines to which positions of the CSICH the bits indicating the maximum data rate are to be transmitted.

$$SI_{R*I+J+k} = e_k$$

$$k = 0, 1, \ldots, K-1 \quad (21)$$

Equation (21) determines the positions where the bits remaining after transmitting through the CSICH the maximum data rate information bits of the PCPCH and the use-status information bits of the respective PCPCHs used in the UTRAN, are to experience zero-padding or DTX.

A fourth embodiment for arranging the information bits is as follows.

$$SI_{R*I+j} = p_j$$

$$0 \leq j \leq J-1 \quad (22)$$

Equation (22) determines to which positions of the CSICH the bits indicating the use-status information of the respective PCPCHs used in the UTRAN are to be transmitted.

$$SI_{l*I+i} = d_i$$

$$0 \leq i \leq I-1, \; 0 \leq l \leq R-1 \quad (23)$$

Equation (23) determines to which positions of the CSICH the bits indicating the maximum data rate are to be transmitted.

$$SI_{R*I+J+k} = e_k$$

$$k = 0, 1, \ldots, K-1 \quad (24)$$

Equation (24) determines the positions where the bits remaining after transmitting through the CSICH the maximum data rate information bits of the PCPCH and the use-status information bits of the respective PCPCHs used in the UTRAN, are to experience zero-padding or DTX.

A fifth embodiment for arranging the information bits is as follows.

$$m = \left\lfloor \frac{K}{R} \right\rfloor \quad (25)$$

where m is an intermediate parameter.

$$SI_{l(I+r+m)+i} = d_i$$

$$0 \leq i \leq I-1, \; l = 0, 1, \ldots, R-1 \quad (26)$$

Equation (26) determines to which positions of the CSICH the bits indicating the maximum data rate are to be transmitted.

$$SI_{l(I+r+m)+I+j} = p_{l*r+j}$$

$$0 \leq j \leq r-1, \; l = 0, 1, \ldots, R-2 \quad (27)$$

$$SI_{(R-1)(I+r+m)+I+j} = p_{(R-1)r+j}$$

$$0 \leq j \leq RI+J-1-(R-1)(I+r+m)-I \quad (28)$$

Equations (27) and (28) determine to which positions of the CSICH the bits indicating the use-status information of the respective PCPCHs used in the UTRAN are to be transmitted.

$$SI_{l*(I+r+m)+I+r+k} = e_{l*m+k}$$

$$0 \leq l \leq R-2, \; k = 0, 1, \ldots, m-1 \quad (29)$$

$$SI_{R*I+J+k} = e_{(R-1)*m+k}$$

$$k = 0, 1, \ldots, N-1-R*I-J \quad (30)$$

Equations (29) and (30) determine the positions where the bits remaining after transmitting through the CSICH the maximum data rate information bits of the PCPCH and the use-status information bits of the respective PCPCHs used in the UTRAN, are to experience zero-padding or DTX.

In the foregoing embodiments of the inventive method for simultaneously transmitting the maximum data rate information available for the PCPCH and the use-status information of the respective PCPCHs used in the UTRAN, it is also possible to transmit a persistence value or an NF_Max value available for the PCPCH in the UTRAN instead of the maximum data rate information.

The transmission method using the separate coding method encodes SI (Status Indicator) information with an error correction code to increase reliability of the SI information transmitted over the CPICH, applies 8 coded symbols to an access slot of an access frame, and transmits 120 coded symbols per access frame. Here, the number of the SI information bits, the meaning of the status information and the method for transmitting the same is previously determined by the UTRAN and the UE, and is also transmitted as a system parameter over the broadcasting channel (BCH). Therefore, the UE also previously knows the number of the SI information bits and the transmission method, and decodes the CSICH signal received from the UTRAN.

Figure 5:
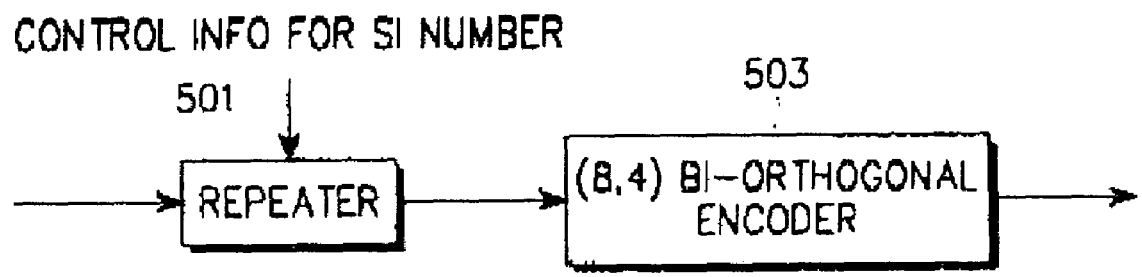
FIG. 5 is a block diagram illustrating a CSICH encoder for transmitting an SI bit according to an embodiment of the present invention.

FIG. 5 shows a structure of a CSICH encoder for transmitting the SI information bits according to an embodiment of the present invention.

Referring to FIG. 5, the UTRAN first checks the present use-status of the uplink CPCH, i.e., the data rate and channel condition of the channel presently received over the uplink channel, to determine the maximum data rate to be transmitted to the CSICH channel, and then outputs corresponding information bits shown in Table 1. The information bits are the input bits shown in Table 2 below.

A method for coding the input bits may vary according to a transmission method. That is, the coding method may vary according to whether to provide the channel status information in a frame unit or a slot unit. First, a description will be made of a case where the channel status information is transmitted in a frame unit. The input information (SI bits) and the control information for the number of the SI bits are simultaneously applied to a repeater 501. The repeater 501 then repeats the SI bits according to the control information for the number of the SI bits. However, the control information for the number of the SI bits is not necessary, when the number of the input information bits is previously known to both the UTRAN and the UE.

Operation of the CSICH encoder of FIG. 5 will be described. Upon receipt of 3 SI bits of S0, S1, and S2, the repeater 501 repeats the received SI bits according to the control information indicating that the number of the SI bits is 3, and outputs a repeated 60-bit stream of S0, S1, S2, S0, S1, S2, . . . , S0, S1, S2. When repeated 60-bit stream is applied to an encoder 503 in a 4-bit unit, the encoder 503 encodes the bits in the bit stream with an (8,4) bi-orthogonal code in a 4-bit unit, and outputs encoded symbols by 8 symbols. In this manner, when the input 60-bit stream is encoded, 120 symbols are output from the encoder 503. By transmitting 8 symbols to every slot in one CSICH, it is possible to transmit the symbols from the encoder 503 over one frame.

When the input information is comprised of 4 bits, the 4 input bits are repeated 15 times by the repeater 501 and output as 60 output symbols. The 60 output symbols are encoded into a bi-orthogonal code of 8 symbols in the 4-bit unit by the (8,4) bi-orthogonal encoder 503. Such a method is equivalent to outputting the input 4 bits into an 8-symbol bi-orthogonal code to transmit the same bi-orthogonal code to every slot (15 slots), with the repeater 501 removed.

Even when the input is 3 bits and an (8,3) encoder is used, the repeater 501 is meaningless. Thus, during implementation, it is possible to remove the repeater 501 and transmit the same encoded symbols to every slot (of 15 slots) by outputting 8 symbols for the 3 input bits.

As described above, if it is possible to transmit the same symbols at every slot, the UTRAN can transmit the CPCH channel status information to the UE in a slot unit. That is, the UTRAN determines the maximum data rate at which the UTRAN transmits data to the UE in the slot unit, determines the input bits corresponding to the determined maximum data rate, and transmits the determined input bits in the slot unit. In this case, since the UTRAN must analyze the data rate and the status of the the uplink channel in the slot unit, it is also possible to transmit the maximum data rate in a unit of several slots.

The (8,4) bi-orthogonal code, which is an error correction code used for encoding, has a relationship between 4 input bits and 8 output symbols as shown in Table 2 below.

TABLE 2

| Input Bits | Coded Symbols |
|---|---|
| 0000 | 0000 0000 |
| 0001 | 0101 0101 |
| 0010 | 0011 0011 |
| 0011 | 0110 0110 |
| 0100 | 0000 1111 |
| 0101 | 0101 1010 |
| 0110 | 0011 1100 |
| 0111 | 0110 1001 |
| 1000 | 1111 1111 |
| 1001 | 1010 1010 |
| 1010 | 1100 1100 |
| 1011 | 1001 1001 |
| 1100 | 1111 0000 |
| 1101 | 1010 0101 |
| 1110 | 1100 0011 |
| 1111 | 1001 0110 |

Figure 6:
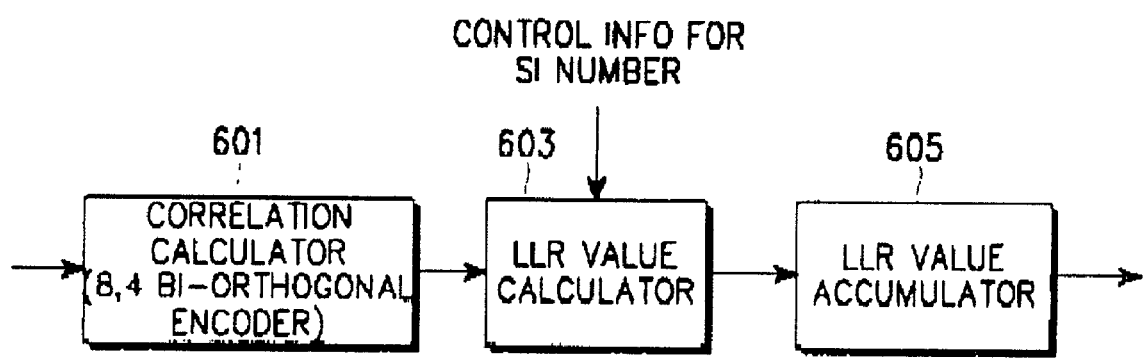
FIG. 6 is a block diagram illustrating a CSICH decoder corresponding to the CSICH encoder of FIG. 5.

FIG. 6 shows a structure of a CSICH decoder corresponding to the CSICH encoder of FIG. 5.

Referring to FIG. 6, 3 input bits are repeated 20 times to create 60 bits, and the created 60 bits are applied to the decoder in a unit of 4 bits. Assuming that the decoder corresponds to the encoder using the (8,4) bi-orthogonal code. Upon receipt of a received signal by 8 symbols, a correlation calculator 601 calculates a correlation between the received signal and the (8,4) bi-orthogonal code, and outputs one of 16 correlation values shown in Table 2.

The output correlation value is applied to a likelihood ratio (LLR) value calculator 603, which calculates a ratio of probability P0 to probability P1, and outputs a 4-bit LLR value. Here, the probability P0 indicates a probability that each decoded bit for the 4 information bits transmitted from the UTRAN according to the control information determined by the number of the SI bits will become 0, and a probability P1 indicates a probability that the decoded bit will become 1. The LLR value is applied to an LLR value accumulator 605. When 8 symbols are received in the next slot, the decoder repeats the above process and adds the 4 bits output from the LLR calculator 603 to the existing value. When all the 15 slots are received in the above process, the decoder determines the status information transmitted from the UTRAN using the value stored in the LLR value accumulator 605.

Next, a description will be made of a case where the input is 4 or 3 bits and the (8,4) or (8,3) encoder is used. When a received signal is applied to the correlation calculator 601 in a unit of 8 symbols, the correlation calculator 601 calculates a correlation between the received signal and the (8,4) or (8,3) bi-orthogonal code. If the status information is received from the UTRAN in the slot unit, the decoder determines the status information transmitted from the UTRAN using the largest correlation value according to the correlation Further, a description will be made of a case where the UTRAN repeats the same status information in the unit of 15 slots (one frame) or several slots and transmits the repeated status information. When the received signal is applied to the correlation calculator 601 by 8 symbols, the correlation calculator 601 calculates a correlation between the received signal and the (8,4) or (8,3) bi-orthogonal code and outputs the calculated correlation value to the LLR value calculator 603. The LLR value calculator 603 then calculates a ratio of a probability P0 to a probability P1, and outputs an LLR value Here, the probability P0 indicates a probability that a decoded bit for the 4 or 3 information bits transmitted from the UTRAN will become 0 according to the control information determined depending on the number of the SI bits, and a probability P1 indicates a probability that the decoded bit will become 1. The LLR value is applied to an LLR value accumulator 605 and accumulated. For the 8 symbols received in the next slot, the decoder repeats the above process to accumulate the calculated value to the existing LLR value. Such an operation is performed on every symbol transmitted over one frame. That is, in the case where 8 symbols are transmitted at one slot, the foregoing operation is repeatedly performed 15 times. Therefore, when the UTRAN repeatedly transmits the same status information, the final LLR value accumulated by the foregoing operation will be equal to the number of the repeated transmissions by the UTRAN. The UE determines the status information transmitted from the UTRAN depending on the accumulated LLR values.

A description will now be made of another embodiment which provides to higher performance than the conventional method in terms of a method for encoding the information bits to be transmitted to the CSICH. To bring a better understanding of this embodiment of the present invention, it will be assumed that there are 4 information bits to be transmitted to the CSICH. The information bits will be represented by S0, S1, S2 and S3 in sequence. In the prior art, the information bits are simply repeated before transmission. That is, if 120 bits are transmitted in one frame, S0 is repeated 30 times, S1 is repeated 30 times, S2 is repeated 30 times and S3 is repeated 30 times. Therefore, the prior art is disadvantageous in that the UE only receives the necessary CPCH information after completely receiving one frame.

To solve this problem, in another embodiment, the sequence of transmitting the information bits is changed to obtain a time diversity so that the UE can know the CPCH status even though the CPCH of one frame is not completely received. For example, when the sequence of transmitting the information bits is S0, S1, S2, S3, S0, S1, S2, S3, S0, S1, S2, S3, . . . , S0, S1, S2 and S3, the same code gain is given in an AWGN (Additive White Gaussian Noise) environment.

However, since a gain of the time diversity is given in a fading environment which occurs inevitably in the mobile communication system, the invention has a higher code gain as compared with the prior art. In addition, the UE can know the status of the CPCH in the UTRAN, even though only one slot of the CSICH (when the number of the information bits is 4 and below) is received. Even when there are many information bits to be transmitted to the CSICH, it is possible to know the information about the CPCH in the UTRAN more quickly as compared with the prior art.

A description will now be made of yet another embodiment which provides higher performance than the conventional method in terms of a method for encoding the information bits to be transmitted to the CSICH. In the foregoing second method, the CSICH information bits were transmitted in a bit unit. That is, when there are 6 information bits to be transmitted to the CSICH and the information bits are represented by S0, S1, S2, S3, S4, S5 and S6, the information bits are repeatedly transmitted in the sequence of S0, S1, S2, S3, S4, S5 and S6. On the contrary, however, in the third method that is described below, the information bits are transmitted in a symbol unit.

In the third method, the reason for transmitting the information bits in a symbol unit is because the downlink AICH channel in the current W-CDMA system transmits in sequence the information bits to the I channel and the Q channel. In addition, another reason is to use the same receiver as the AICH receiver, since the current W-CDMA system is so structured as to repeat the same bit two times in order to transmit the same information bits to the I channel and the Q channel.

A method for transmitting the CSICH information bits in a symbol unit using the above-stated repeating structure is expressed by Equation (31) below.

$$b_{2(n+mN)} = b_{2(n+mN)+1} = \begin{cases} -1 & \text{if, } SI_n = 1 \\ +1 & \text{if, } SI_n = 0 \end{cases} \quad (31)$$

$$\begin{cases} n = 0, 1, ..., N-1 \\ m = 0, 1, ..., \frac{120}{2N} - 1 \end{cases}$$

where N is the number of the SI information bits. The current W-CDMA standard proposes 1, 2, 3, 4, 5, 6, 10, 12, 15, 20, 30 and 60 for the value N. Further, in Equation (31), m indicates a period of the SI information bits which are repeatedly transmitted for one CSICH. The W-CDMA standard proposes 120, 60, 40, 30, 24, 20, 12, 10, 8, 6, 4 and 2 for the value m. The value m is determined depending on the value N. Further, in Equation (31), n indicates one of the N SI information bits.

In Equation (31), $b_{2(n+mN)}$ is a $2(n+mN)^{th}$ information bit and has the same value as $b_{2(n+mN)+1}$. That is, the CSICH information bit is repeated two times with the same value. Meanwhile, in Equation (31), when the value $SI_n$ is 1, the information bits are mapped to −1, and when the value $SI_n$ is 0, the information bits are mapped to +1. The mapping values are interchangeable.

For example, if N=10 in Equation (31), then n has a value of 0 to 9 and m has a value of 0 to 5. Meantime, if $SI_0$=1, $SI_1$=0, $SI_2$=1, $SI_3$=1, $SI_4$=0, $SI_5$=0, $SI_6$=1, $SI_7$=1, $SI_8$=0 and $SI_9$=1, it is possible to obtain from Equation (31) the values of $b_0$=−1, $b_1$=−1, $b_2$=1, $b_3$=1, $b_4$=−1, $b_5$=−1, $b_6$=−1, $b_7$=−1, $b_8$=1, $b_9$=1, $b_{10}$=1, $b_{11}$=1, $b_{12}$=−1, $b_{13}$=−1, $b_{14}$=−1, $b_{15}$=−1, $b_{16}$=1, $b_{17}$=1, $b_{18}$=−1, and $b_{19}$=−1. These values are repeated 6 times within one CSICH frame. That is, the values are repeated based on $b_0$=−1, $b_{20}$=−1, $b_{40}$=−1, $b_{60}$=−1, $b_{80}$=−1 and $b_{100}$=−1.

Figure 31:
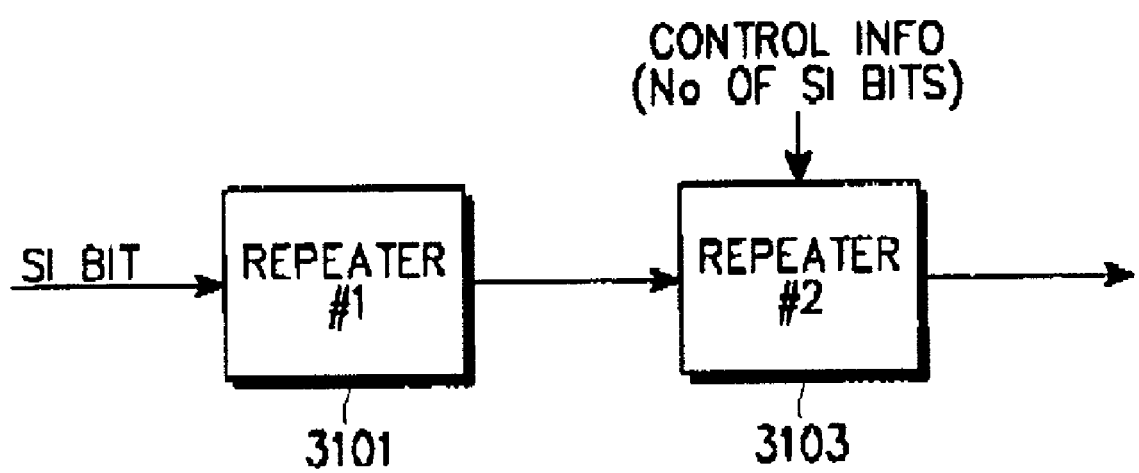
FIG. 31 is a block diagram illustrating a CSICH decoder according to another embodiment of the present invention.

FIG. 31 shows a block diagram of a CSICH decoder according to another embodiment of the present invention.

Referring to FIG. 31, a first repeater 3101 maps input SI information bits 0 and 1 to +1 and −1, and repeats the mapped SI bits in accordance with Equation (31). The repeated SI bits are applied to a second repeater 3103. The second repeater 3103 repeatedly transmits the output of the first repeater 3101 according to control information for the number of the received SI information bits. The number of repetitions is 120/2N. If the first repeater 3101 is removed, FIG. 31 corresponds to a hardware structure for the second embodiment which provides the higher performance than the prior art in terms of a method for encoding the information bits to be transmitted to the CSICH. Otherwise, if the first and second repeaters 3101 and 3103 are both used, FIG. 31 corresponds to a hardware structure for the third embodiment for encoding the information bits to be transmitted to the CSICH.

In the prior art, since the information about the status of each CPCH used in the UTRAN is transmitted over the CSICH, the UTRAN cannot transmit the information in one CSICH slot, but must divide the information into the whole slots of one frame before transmission. Therefore, in order to know the CPCH status in the UTRAN, the UE which desires to use the CPCH must receive the CSICH for a time much longer than in this embodiment. In addition, the information about the slot where the CSICH information starts and the information about the slot where the CSICH information ends are required.

However, in this embodiment of the present invention, when the maximum data rate supported by the CPCH and the multi-code are used regardless of the number of the CPCHs used in the UTRAN, since the number of multi-codes which may be used per CPCH is transmitted, the CPCH status information can be expressed with 4 bits regardless of the number of the CPCHs. In FIGS. 5 and 6, although one information bit is used for the case where the multi-code is used, it is possible to allocate the information bit for the number, NFM (Number of Frame Max (NF_MAX)), of frames which can maximally transmit the CPCH message. The UTRAN can set one NFM per CPCH.

Alternatively, the NFM can correspond to the CA or correspond to the downlink DPCCH. In order to select the NFM, the UE may match NFM with the AP or to the AP sub-channel. There are several methods for setting and informing the NF_MAX in the UTRAN and the UE. As one method, the UTRAN may set either one NF_MAX per CPCH set or several NF_MAXs per CPCH set. When UTRAN sets several NF_MAXs per CPCH set, the UE may personally select each NF_MAX in combination of the AP signature and the AP sub-channel that are transmitted to the UTRAN.

In another method for setting NF MAX, the UTRAN matches the NF_MAX to the channel allocation message and personally provides the UE with the information on the NF_MAX. In yet another method for setting NF_MAX, it is possible to match to NF_MAX to the uplink CPCH and its corresponding downlink DPCCH. In still another method, supervision may be used without the NFM. That is, when there is no data to transmit, the UE stops transmission, and upon detecting this, the UTRAN releases the channel. In still another method, the NFM can be transmitted to the UE using the downlink DPDCH.

AP/AP_AICH

Upon receiving the information about the CPCH in the UTRAN through the CSICH of FIG. 4, the UE prepares to transmit the AP 333 of FIG. 3 in order to obtain the information about the right to use the CPCH channel and the use of the CPCH channel.

To transmit the AP 333, the UE should select a signature for the AP. In the preferred embodiments of the present invention, it is possible to select a proper access service class (ASC) based on the information about the CPCH in the UTRAN, acquired through the CSICH before selecting the signature, and the property of the data that the UE will transmit over the CPCH. For example, the ASC can be distinguished according to a desired class of the UE, the data rate used by the UE, or the service type used by the UE.

The ASC is transmitted to the UEs in the UTRAN over the broadcasting channel, and the UE selects a proper ASC according to the CSICH and the property of the data to be transmitted. Upon selecting the ASC, the UE randomly selects one of AP sub-channel groups for the CPCH, defined in the ASC. If the system frame number (SFN) presently transmitted from the UTRAN is defined as K using Table 3 below and the SFN used for the frame transmitted from the UTRAN, the UE draws the access slots which are available at $(K+1)$ and $(K+2)^{th}$ frames and selects one of the drawn access slots to transmit the AP 333 of FIG. 3. The "AP sub-channel group" refers to the 12 sub-channel groups shown in Table 3.

TABLE 3

| SFN mod 8 | Sub-channel Number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | | | | | | | | | 8 | 9 | 10 | 11 |
| 2 | 12 | 13 | 14 | | | | | | | | | |
| 3 | | | | 0 | 1 | 2 | 3 | 4 | 5 | 6 | 7 | |
| 4 | 9 | 10 | 11 | 12 | 13 | 14 | | | | | | 8 |
| 5 | 6 | 7 | | | | 0 | 1 | 2 | 3 | 4 | 5 | |
| 6 | 3 | 4 | 5 | 6 | 7 | | | | | | | |
| 7 | | | | | | | | 8 | 9 | 10 | 11 | 12 | 13 | 14 |

Figure 7:
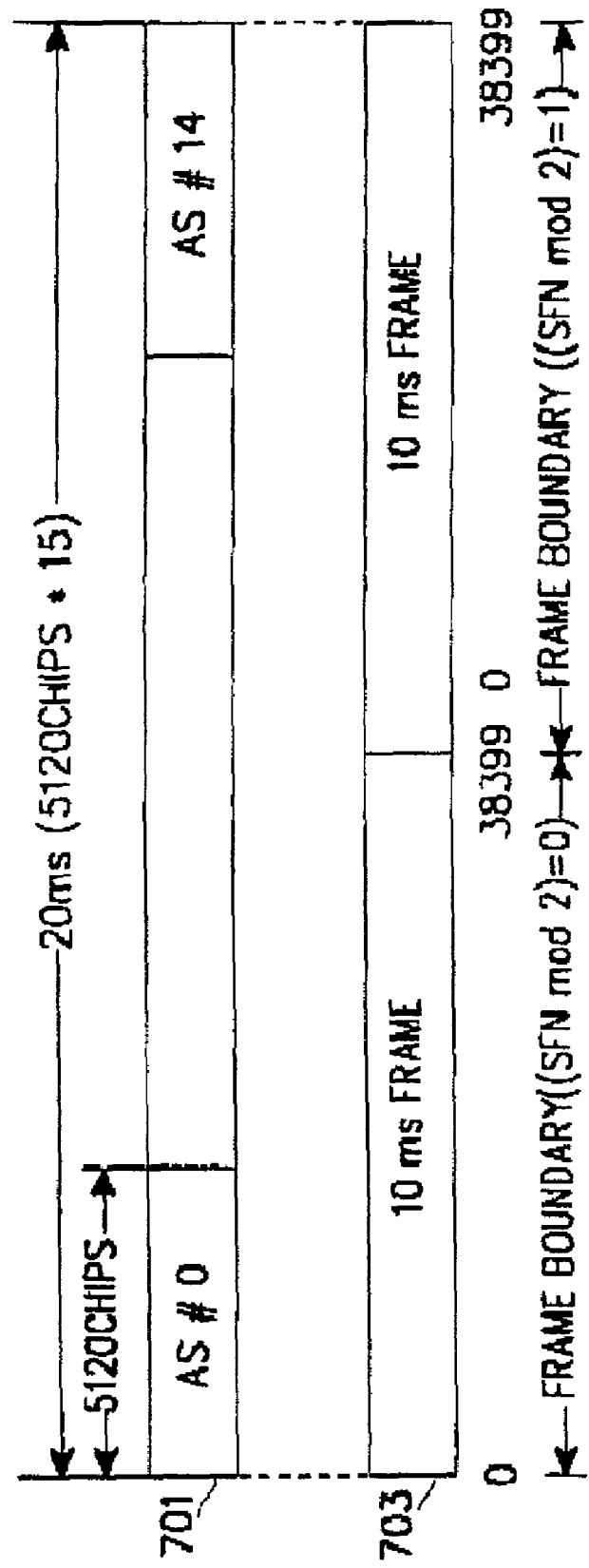
FIG. 7 is a diagram illustrating a structure of an access slot used for transmitting an access preamble according to an embodiment of the present invention.

A structure of an access slot used to transmit the AP 333 of FIG. 3 is shown in FIG. 7. Reference numeral 701 indicates an access slot, which has a length of 5120 chips. The access slot has a structure in which the access slot number is repeated from 0 to 14, and has a repetition period of 20 ms. Reference numeral 703 indicates a beginning and an end of the $0^{th}$ to $14^{th}$ access slots.

With continued reference to FIG. 7, since SFN has a unit of 10 ms, a beginning of the $0^{th}$ access slot is identical to a beginning of a frame whose SFN is an even number, and an end of the $14^{th}$ access slot is identical to an end of a frame whose SFN is an odd number.

The UE randomly selects one of the valid signatures and a signature selected by the UE in the above described manner, i.e., the sub-channel groups for the CPCH, defined in the ASC allocated by the UTRAN. The UE assembles the AP 333 using the selected signature and transmits the assembled AP to the UTRAN in sync with the timing of the UTRAN. The AP 333 is distinguished according to the AP signature used for the AP, and each signature is mapped to the maximum data rate, or the maximum data rate and the NFM can be mapped. Therefore, the information indicated by the AP is the information about the maximum data rate of a CPCH to be used by the UE or the number of data frames to be transmitted by the UE, or a combination of the two kinds of the above information.

Although the combination of the maximum data rate for the AP and the number of the data frames to be transmitted by the CPCH may be mapped, it is also possible, as an alternative method, to select the maximum data rate and NF_MAX (Number of Frame Max) by combining the AP signature with an access slot for transmitting an AP made by the UE using the AP signature, and transmit them to the UTRAN. As an example of the above method, the AP signature selected by the UE can be associated with the maximum data rate or the spreading factor of the data to be transmitted by the UE over the CPCH and the access sub-channel for transmitting the AP made by the UE using the above signature can be associated with the NF_MAX, and vice versa.

For example and referring to FIG. 3, in the process for transmitting the AP 333 from the UE to the UTRAN, after transmitting the AP 333, the UE awaits receipt of the AP_AICH signal from the UTRAN for a predetermined time 332 (i.e., 3 or 4-slot time), and upon receipt of the AP_AICH signal, determines whether the AP_AICH signal includes a response to the AP signature transmitted by the UE. If the AP_AICH signal is not received within the time 332 or the AP_AICH signal is a NAK signal, the UE increases transmission power of the AP, and transmits AP 335 to the UTRAN at the increased transmission power.

When the UTRAN receives AP 335 and it is possible to allocate the CPCH having a data rate requested by the UE, the UTRAN transmits the AP_AICH 303 in response to the received AP 335 after a lapse of a previously appointed time 302. In this case, if the uplink capacity of the UTRAN exceeds a predetermined value or there is no more demodulation, the UTRAN transmits a NAK signal to temporarily discontinue UE's transmitting on the uplink common channel. In addition, when the UTRAN fails to detect the AP, the UTRAN cannot send the ACK or NAK signal on the AICH, such as the AP_AICH 303. Therefore, in the embodiment, it will be assumed that nothing is transmitted.

CD

Upon receipt of the ACK signal over the AP_AICH 303, the UE transmits the CD_P 337. The CD_P has the same structure as that of the AP, and the signature used to construct the CD_P can be selected from the same signature group as the signature group used for the AP. When a signature for the CD_P is used out of the group of the signatures identical to the AP, different scrambling codes are used for the AP and the CD_P in order to distinguish between the AP and the CD_P. The scrambling codes have the same initial value but may have different start points.

Alternatively, the scrambling codes for the AP and the CD_P may have different initial values. The reason for selecting a given signature and transmitting the CD_P is to decrease the probability that the same CD_P may be selected even though there occurs a collision because two or more UEs simultaneously transmit the AP. In the prior art, one CD_P is transmitted at a given transmission time to decrease the probability of an uplink collision between the different UEs. However, in such a method, if another user requests the UTRAN for the right to use the CPCH using the same CD_P before processing a response to the CD_P from one UE, the UTRAN cannot respond to the UE which transmitted the later CD_P. Even if the UTRAN responds to this later UE, there is a probability of an uplink collision with the UE that first transmitted the CD_P.

In FIG. 3, the UTRAN transmits CD/CA_ICH 305 in response to the CD_P 337 transmitted from the UE. The CD_ICH out of the CD/CA_ICH will be first described. The CD_ICH is a channel for transmitting the ACK signal for the CD_P to the corresponding UE, when the UE transmits the signature used for the CD_P over the downlink. The CD_ICH can be spread using a different orthogonal channelization code from that of the AP_AICH. Therefore, the CD_ICH and the AP_AICH can be transmitted over different physical channels, or can be transmitted over the same physical channel by time dividing one orthogonal channel.

In the preferred embodiments of the present invention, the CD_ICH is transmitted over a different physical channel from that of the AP_AICH. That is, the CD_ICH and the AP_AICH are spread with an orthogonal spreading code of length 256 and transmitted over independent physical channels.

CA

In FIG. 3, the CA_ICH (Channel Allocation_Indicator Channel) includes channel information of the CPCH allocated to the UE by the UTRAN and downlink channel allocation information for allocating power control of the CPCH. The downlink allocated to power control the CPCH is available in several methods.

First, a downlink shared power control channel is used. A method for controlling transmission power of a channel using the shared power control channel is disclosed in detail in Korean patent application No. 1998-10394; the contents of which are hereby incorporated by reference. Further, it is possible to transmit a power control command for the CPCH by using the shared power control channel. Allocating the downlink channel may include information about the channel number and the time slot for the downlink shared power control used for power control.

Second, a downlink control channel can be used which is time-divided into a message and a power control command. In the W-CDMA system, this channel is defined to control the downlink shared channel. Even when the data and the power control command is time divided for transmission, the channel information includes the information about the channel number and the time slot of the downlink control channel.

Third, one downlink channel can be allocated to control the CPCH. The power control command and the control command can be transmitted together over this channel. In this case, the channel information becomes a channel number of the downlink channel.

In the preferred embodiments of the present invention, it is assumed that the CD/CA_ICH are simultaneously transmitted. However, the CA_ICH may be transmitted after transmission of the CD_ICH, or the CD_ICH/CA_ICH may be simultaneously transmitted. When the CD_ICH/CA_ICH are simultaneously transmitted, they may be transmitted with either the different channelization codes or the same channelization code. Further, it will be assumed that in order to decrease the delay in processing a message from an upper layer, a channel allocation command transmitted over the CA_ICH is transmitted in the same format as the CD_ICH.

In this case, if there exist 16 signatures and 16 CPCHs, each CPCH will correspond to a unique one of the signatures. For example, when the UTRAN desires to allocate a $5^{th}$ CPCH for transmitting a message to the UE, the UTRAN transmits a $5^{th}$ signature corresponding to the $5^{th}$ CPCH in the channel allocation command.

If it is assumed that the CA_ICH frame over which the channel allocation command is transmitted has a length of 20 ms and includes 15 slots, this structure will be identical to the structure of the AP_AICH and the CD_ICH. The frame for transmitting AP_AICH and the CD_ICH is comprised of 15 slots and each slot can be comprised of 20 symbols. It will be assumed that one symbol period (or duration) has a length of 256 chips and a part where responses to the AP, CD and CA are transmitted, is transmitted in only a 16-symbol period.

Therefore, the channel allocation command transmitted as shown in FIG. 3 can be comprised of 16 symbols, and each symbol has a length of 256 chips. Further, each symbol is multiplied by the 1-bit signature and the spreading code and then transmitted over the downlink, and an orthogonal property (or orthogonality) is guaranteed between the signatures.

In the preferred embodiments of the present invention, the CA_ICH is transmitted using 1, 2 or 4 signatures for the channel allocation command.

In FIG. 3, upon receipt of the CD/CA_ICH 305 transmitted from the UTRAN, the UE examines whether the CD_ICH includes an ACK signal, and analyzes information about the use of the CPCH channel, transmitted over the CA_ICH. Analysis of the two kinds of the above information can be made either sequentially or simultaneously. Receiving the ACK signal through the CD_ICH out of the received CD/CA_ICH 305 and the channel allocation information through the CA_ICH, the UE assembles the data part 343 and the control part 341 of the CPCH according to the channel information of the CPCH allocated by the UTRAN, as shown in FIG. 3. Further, before transmitting the data part 343 and the control part 341 of the CPCH, the UE transmits the power control preamble (PC_P) 339 to the UTRAN after a lapse of a predetermined time from a time when the CD/CA_ICH, set before the CPCH setting process, are received.

PC_P

Although the power control preamble PC_P has a length of 0 or 8 slots, it will be assumed in the preferred embodiments of the present invention that the power control preamble PC_P 339 transmits 8 slots. The primary purpose of the power control preamble PC_P is to enable the UTRAN to initially set an uplink transmission power of the UE using a pilot field of the power control preamble. However, in this embodiment of the present invention, as another use, the power control preamble can be used to reconfirm the channel allocation message received at the UE. A reason for reconfirming the channel allocation message is to prevent a collision with a CPCH used by another UE, which may be caused by the UE's improperly setting the CPCH because the CA_ICH received at the UE has an error. When the power control preamble is used for the purpose of reconfirming the channel allocation message, the power control preamble has a length of 8 slots.

Although the CA message reconfirming method is used for the power control preamble, the UTRAN has no difficulty in measuring the power and confirming the CA message since it already knows a pattern of the pilot bit used for the power control preamble.

At a time close to the time when the power control preamble 339 is transmitted, the UTRAN starts transmitting the downlink dedication channel for uplink power control of the CPCH for the corresponding UE. A channelization code for the downlink dedicated channel is transmitted to the UE through the CA message, and the downlink dedicated channel is comprised of a pilot field, a power control command field and a message field. The message field is transmitted only when the UTRAN has data to transmit to the UE. Reference numeral 307 of FIG. 3 indicates an uplink power control command field, and reference numeral 309 indicates a pilot field.

For the case where the power control preamble 339 of FIG. 3 is used not only for power control but also for reconfirming the CA (Channel Allocation) message, if the CA message transmitted to the analyzed power control preamble by the UTRAN is different from the message transmitted to the CD/CA_ICH 305 by the UTRAN, the UTRAN continuously transmits a transmission power-decreasing command to the power control field of the established downlink dedicated channel, and transmits a CPCH transmission stop message to the FACH or the established downlink dedicated channel.

After transmitting the power control preamble 339 of FIG. 3, the UE immediately transmits the CPCH message part 343. Upon receipt of the CPCH transmission stop command from the UTRAN during transmission of the CPCH message part, the UE immediately stops transmission of the CPCH. If the CPCH transmission stop command is not received, the UE receives an ACK or NAK for the CPCH from the UTRAN after completing transmission of the CPCH.

Structure of the Scrambling Code

FIG. 8A shows a structure of a prior art uplink scrambling code, and FIG. 8B shows a structure of an uplink scrambling code used in an embodiment of the present invention.

More specifically, FIG. 8A shows a structure of an uplink scrambling code used in the process of initially establishing and transmitting the CPCH in the prior art. Reference numeral 801 indicates an uplink scrambling code used for the AP, and reference numeral 803 indicates an uplink scrambling code used for the CD_P. The uplink scrambling code used for the AP and the uplink scrambling code used for the CD_P are the uplink scrambling codes generated from the same initial value: $0^{th}$ to $4095^{th}$ values are used in the AP part, and $4096^{th}$ to $8191^{st}$ values are used in the CD_P part. For the uplink scrambling codes for the AP and the CD_P, the uplink scrambling codes can be used which are broadcast by the UTRAN or previously set in the system. In addition, for the uplink scrambling code, a sequence of length 256 can be used, and a long code which is not repeated for the AP or CD_P period can also be used.

In the AP and the CD_P of FIG. 8A, the same uplink scrambling code can be used. That is, the AP and the CD_P can be used equally by using a specific part of the uplink scrambling code generated using the same initial value. In this case, the signature used for the AP and the signature used for the CD_P are selected from the different signature groups. In such an example, 8 of 16 signatures used for a given access channel are allocated for the AP and the remaining 8 signatures are allocated for the CD_P.

Reference numerals 805 and 807 of FIG. 8A indicate uplink scrambling codes used for the power control preamble PC_P and the CPCH message part, respectively. The parts used in the uplink scrambling codes having the same initial value are made different to be used for the PC_P and the CPCH message part. The uplink scrambling code used for the PC_P part and the CPCH message part can be the same scrambling code as the uplink scrambling code used for the AP and the CD_P, or can be the up link scrambling code corresponding on a one-to-one basis to the signature for the AP transmitted by the UE. A PC_P scrambling code 805 of FIG. 8A uses $0^{th}$ to $0^{th}$ to $20,479^{th}$ values of the uplink scrambling code #B, and a message scrambling code 807 uses a scrambling code of length 38,400 by using $20,480^{th}$ to $58,888^{th}$ values of the uplink scrambling code. Also, for the scrambling codes used for the PC_P and the CPCH message part, a scrambling code having a length of 256 can be used.

FIG. 8B shows a structure of an uplink scrambling code used in an embodiment of the present invention. Reference numerals 811 and 813 indicate uplink scrambling codes used for the AP and the CD_P, respectively. The uplink scrambling codes 811 and 813 are used in the same manner as in the prior art. The uplink scrambling codes are known to the UE by the UTRAN, or the uplink scrambling codes are previously appointed in the system.

Reference numeral 815 of FIG. 8B indicates an uplink scrambling code used for the PC_P part. The uplink scrambling code used for the PC_P part may be the same scrambling code as the uplink scrambling code used for the AP and the CD_P, or can be the scrambling code which corresponds to the signature used for the AP on a one-to-one basis. Reference numeral 815 of FIG. 8B indicates a scrambling code used for the PC_P part, having $0^{th}$ to $20,479^{th}$ values. Reference numeral 817 of FIG. 8B indicates an uplink scrambling code used for the CPCH message part. For this scrambling code, there can be used the same code as the scrambling code used for the PC_P, or a scrambling code which corresponds to the scrambling code used for the PC_P or the signature used for the AP on a one-to-one basis. The CPCH message part uses scrambling codes of length 38,400 of $0^{th}$ to $38,399^{th}$.

For all the scrambling codes used in describing the structure of the scrambling code according to an embodiment of the present invention, the long scrambling code is used which is not repeated for the AP, CD_P, PC_P and the CPCH message part. However, it is also possible to use a short scrambling code having a length of 256.

Detailed Description of the AP

FIGS. 9A and 9B show a channel structure of the CPCH access preamble according to an embodiment of the present invention and a scheme for generating the same, respectively. More specifically, FIG. 9A shows the channel structure of the AP, and FIG. 9B shows a scheme for generating one AP slot.

Reference numeral 901 of FIG. 9A indicates a length of the access preamble AP, the size of which is identical to 256 times the length of a signature 903 for the AP. The signature 903 for the AP is an orthogonal code of length 16. A variable 'k' indicated in the signature 903 of FIG. 9A can be 0 to 15. That is, in this embodiment of the present invention, there are provided 16 kinds of the signatures.

Table 4 below shows the signatures for the AP, by way of example. A method for selecting the signature 903 in the UE is as follows. That is, the UE first determines the maximum data rate which can be supported by the CPCH in the UTRAN through the CSICH transmitted by the UTRAN and the number of the multi-codes which can be used in one CPCH, and selects a proper ASC in consideration of the properties, data rate and transmission length of the data to be transmitted through the CPCH. Thereafter, the UE selects a signature proper for the UE data traffic out of the signatures defined in the selected ASC.

An access preamble 905 of FIG. 9B has a size indicated by 901. The access preamble 905 is spread with an uplink scrambling code 907 by a multiplier 906 and transmitted to the UTRAN. The time point where the AP is transmitted has been described with reference to FIG. 7 and Table 3, and the scrambling code 907 has been described with reference to FIG. 8B.

The information transmitted from the UE to the UTRAN through the AP of FIG. 9B includes the data rate of the CPCH, requested by the UE, or the number of frames to be transmitted by the UE, or includes information generated by associating a combination of the two kinds of the above information with the signature on a one-to-one basis.

In the prior art, with regard to the information transmitted from the UE to the UTRAN through the AP, the UE determines the uplink scrambling code and data rate necessary for the CPCH, the channelization code and data rate for the downlink dedicated channel for CPCH power control, and the number of data frames to be transmitted, and transmits the corresponding signature to the UTRAN through the AP. When the information transmitted through the AP is determined in the above manner, the UTRAN has only the function of allowing or not allowing the UE to use the channel requested by the UE. Therefore, even though there exists an available CPCH in the UTRAN, the prior art cannot allocate the CPCH to the UE.

When there are many UEs which requests the CPCH having the same condition, a collision occurs between the different UEs trying to acquire the CPCH, thus increasing the time required when the UE acquires the channel. In this embodiment of the present invention, however, the UE transmits only the possible maximum data rate of the CPCH, or the maximum data rate and the number of the data frames to be transmitted to the UTRAN, and the UTRAN then determines, through the CA, the other information for using the CPCH of the uplink scrambling code and the channelization code for the downlink dedicated channel. Therefore, in the embodiment of the present invention, it is possible to endow the UE with the right to use the CPCH, thereby making it possible to efficiently and flexibly allocate the CPCH in the UTRAN.

TABLE 4

| Signature | n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$  | A | A | A | A | A | A | A | A | A | A | A | A | A | A | A | A |
| $P_1(n)$  | A | -A | A | -A | A | -A | A | -A | A | -A | A | -A | A | -A | A | -A |
| $P_2(n)$  | A | A | -A | -A | A | A | -A | -A | A | A | -A | -A | A | A | -A | -A |
| $P_3(n)$  | A | -A | -A | A | A | -A | -A | A | A | -A | -A | A | A | -A | -A | A |
| $P_4(n)$  | A | A | A | A | -A | -A | -A | -A | A | A | A | A | -A | -A | -A | -A |
| $P_5(n)$  | A | -A | A | -A | -A | A | -A | A | A | -A | A | -A | -A | A | -A | A |
| $P_6(n)$  | A | A | -A | -A | -A | -A | A | A | A | A | -A | -A | -A | -A | A | A |
| $P_7(n)$  | A | -A | -A | A | -A | A | A | -A | A | -A | -A | A | -A | A | A | -A |
| $P_8(n)$  | A | A | A | A | A | A | A | A | -A | -A | -A | -A | -A | -A | -A | -A |
| $P_9(n)$  | A | -A | A | -A | A | -A | A | -A | -A | A | -A | A | -A | A | -A | A |
| $P_{10}(n)$ | A | A | -A | -A | A | A | -A | -A | -A | -A | A | A | -A | -A | A | A |
| $P_{11}(n)$ | A | -A | -A | A | A | -A | -A | A | -A | A | A | -A | -A | A | A | -A |
| $P_{12}(n)$ | A | A | A | A | -A | -A | -A | -A | -A | -A | -A | -A | A | A | A | A |
| $P_{13}(n)$ | A | -A | A | -A | -A | A | -A | A | -A | A | -A | A | A | -A | A | -A |
| $P_{14}(n)$ | A | A | -A | -A | -A | -A | A | A | -A | -A | A | A | A | A | -A | -A |
| $P_{15}(n)$ | A | -A | -A | A | -A | A | A | -A | -A | A | A | -A | A | -A | -A | A |

When the UTRAN supports multi-channel code transmission which uses multiple channelization codes in one PCPCH (Physical CPCH), the AP signature used for transmission of the AP may indicate either a scrambling code used for transmission of the multi-codes or the number of the multiple codes desired by the UE when the UE can select the number of the multiple codes to be used in the PCPCH. When the AP signature indicates the uplink scrambling code for the multiple codes, the channel allocation message transmitted to the UE by the UTRAN may indicate the number of the multiple codes to be used by the UE, and when the AP signature indicates the number of the multiple codes that the UE desires to use, the channel allocation message may indicate the uplink scrambling code to be used by the UE in transmitting the multiple codes.

Detailed Description of the CD_P

FIGS. 10A and 10B show the channel structure of the collision detection preamble CD_P and a scheme for generating the same, respectively, according to an embodiment of the present invention. The structure of the CD_P and its generating scheme are the same as those of the AP shown in FIGS. 9A and 9B. The uplink scrambling code shown in FIG. 10B is different from the AP scrambling code shown in FIG. 8B. Reference numeral 1001 of FIG. 10A indicates a length of the CD_P, which is 256 times a signature 1003 for the AP, shown in Table 4. A variable 'j' of the signature 1003 can be 0 to 15. That is, there are provided 16 signatures for the CD_P. The signature 1003 of FIG. 10A is randomly selected from the 16 signatures.

One reason for randomly selecting the signature is to prevent a collision between the UEs which have received the ACK signal after transmitting the same AP to the UTRAN, thereby having to perform the confirmation process again. In using the signature 1003 of FIG. 10A, the prior art uses a method which is used when specifying only one signature for the CD_P or transmitting the AP in a given access channel. The conventional method for transmitting the CD_P using only one signature has an object of preventing a collision between the UEs by randomizing the transmission time point of the CD_P instead of using the same signature. However, the conventional method is disadvantageous in that if another UE transmits the CD_P to the UTRAN at a time point where the UTRAN has not transmitted an ACK for the received CD_P received from one UE, the UTRAN cannot process the CD_P transmitted from another UE before processing the ACK for the first received CD_P. That is, the UTRAN cannot process the CD_P from the other UEs while processing the CD_P from one UE. The conventional method for transmitting the CD_P in the random access channel RACH is disadvantageous in that it takes a long time until the UE detects an access slot for transmitting the CD_P, causing an increased time delay in transmitting the CD_P.

In an embodiment of the present invention, upon receipt of the AP_AICH, the UE selects a given signature after a lapse of a predetermined time and transmits the selected signature to the UTRAN.

The CD_P 1005 of FIG. 10B has a same size indicated by 1001 of FIG. 10A. The CD_P 1005 is spread with the uplink scrambling code 1007 by a multiplier 1006 and then transmitted to the UTRAN after a lapse of a predetermined time from the time point where the AP_AICH is received. In FIG. 10B, for the uplink scrambling code, the code (of the $0^{th}$ to $4,095^{th}$ chips) which is identical to that used for the AP can be used. That is, when 12 of the 16 signatures are used for the preamble of the random access channel (RACH), the remaining 4 signatures can be dividedly used for the AP and the CD_P of the CPCH. The uplink scrambling code 1007 has been described with reference to FIG. 8B.

AP_AICH and CD/CA_ICH

Figure 11A:
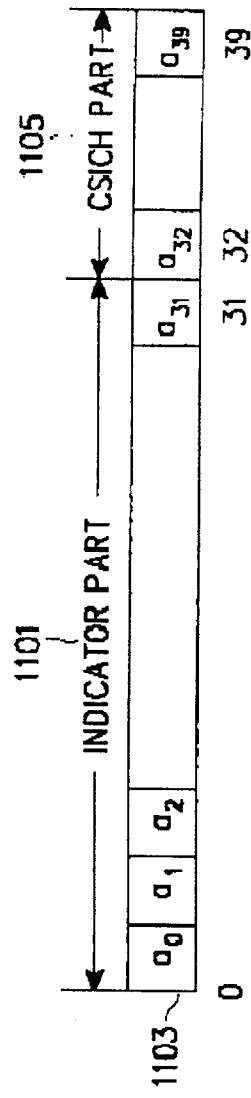
FIGS. 11A and 11B are diagrams illustrating structure of a channel allocation indicator channel (CA_ICH) according to an embodiment of the present invention, and a scheme for generating the same.
Figure 11B:
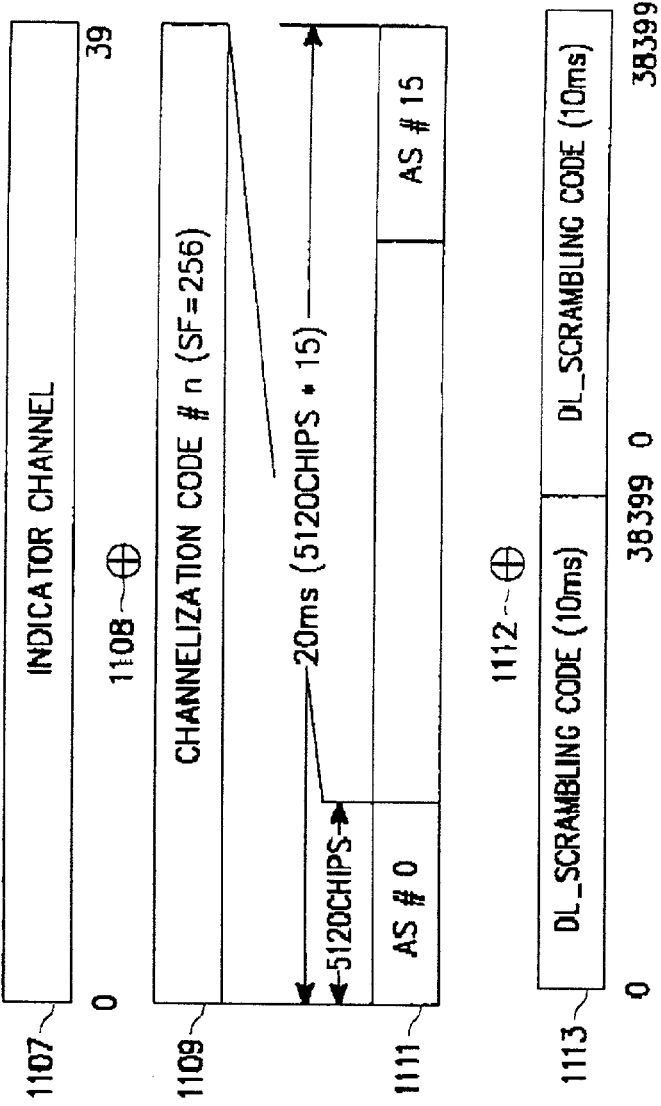

FIG. 11A shows a channel structure of an access preamble acquisition indicator channel (AP_AICH) over which the UTRAN can transmit ACK or NAK in response to the received AP, a collision detection indicator channel (CD_ICH) over which the UTRAN can transmit ACK or NAK in response to the received CD_P, or a channel allocation indicator channel (CA_ICH) over which the UTRAN transmits a CPCH channel allocation command to the UE, and FIG. 11B shows a scheme for generating the same.

Reference numeral 1101 of FIG. 11A indicates an AP_AICH indicator part for transmitting ACK and NAK for the AP acquired by the UTRAN. When transmitting the AP_AICH, a rear part 1105 of the indicator part (or signature transmission part) 1101 transmits the CSICH signal. In addition, FIG. 11A shows a structure for transmitting the CD/CA_ICH signal for transmitting a response to the CD_P signal, and the channel allocation signal. However, the indicator part 1101 has the same channel structure as the AP_AICH, and the response signals (ACK, NAK or Acquisition_Fail) for the CP_D and the CA signal are simultaneously transmitted.

In describing the CD/CA_ICH of FIG. 11A, the rear part 1105 of the indicator part 1101 may either be left empty or transmit the CSICH. The AP_AICH and the CD/CA_ICH can be distinguished from each other by making the channelization codes (OVSF codes) become different using the same scrambling code. The channel structure of the CSICH and its generating scheme have been described above with reference to FIGS. 4A and 4B. Reference numeral 1111 of FIG. 11B indicates a frame structure of an indicator channel (ICH). As illustrated, one ICH frame has a length of 20 ms, and includes 15 slots, each of which can transmit 0 or more than 1 of the 16 signatures shown in Table 4.

A CPCH status indicator channel (CSICH) 1007 of FIG. 11B has the same size as represented by 1103 of FIG. 11A. Reference numeral 1109 of FIG. 11B indicates a channelization code, for which the AP_AICH, CD_ICH, and CA_ICH may use different channelization codes and the CD_ICH and CA_ICH may use the same channelization code. A signal on the CPCH status indicator channel 1107 is spread with the channelization code 1109 by a multiplier 1108. The 15 spread slots constituting one ICH frame are spread with a downlink scrambling code 1113 by a multiplier 1112 before transmission.

Figure 12:
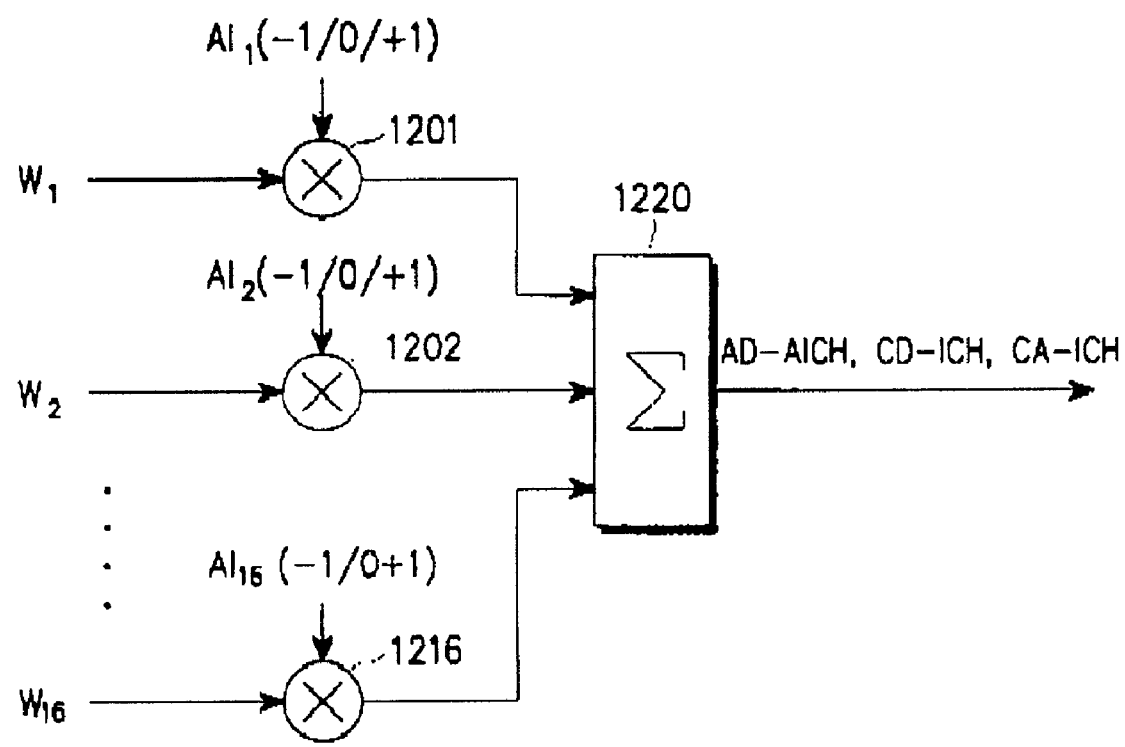
FIG. 12 is a diagram illustrating an AICH generator according to an embodiment of the present invention.

FIG. 12 shows an ICH generator for generating CD_ICH and CA_ICH commands. An AP_AICH generator also has the same structure. As described above, to each slot of the ICH frame is allocated a corresponding one of the 16 signatures. Referring to FIG. 12, multipliers 1201–1216 receive corresponding signatures (orthogonal codes $W_1$–$W_{16}$) as a first input and receive acquisition indicators $AI_1$–$AI_{16}$ as a second input, respectively. Each AI has a value of 1, 0 or −1 for the AP_AICH and the CD_ICH: AI=1 indicates ACK, AI=−1 indicates NAK, and AI=0 indicates a failure to acquire the corresponding signature transmitted from the UE. Therefore, the multipliers 1201–1216 multiply the corresponding orthogonal code by the corresponding acquisition indicator AI, respectively, and a summer 1220 sums up the outputs of the multipliers 1201–1216 and outputs the resulting value as an ICH signal.

The UTRAN can transmit the channel allocation command using the ICH generator of FIG. 12 in several methods which are given below by way of example.

1. First Channel Allocation Method

In this method, one downlink channel is allocated to transmit the channel allocation command over the allocated channel. FIGS. 13A and 13B show the structures of the CD_ICH and the CA_ICH implemented according to the first method. More specifically, FIG. 13A shows the slot structure of the CD_ICH and the CA_ICH, and FIG. 13B shows an exemplary method for transmitting the CD_ICH and CA_ICH. Reference numeral 1301 of FIG. 13A indicates a transmission slot structure of the CD_ICH for transmitting a response signal for the CD_P.

Reference numeral 1311 indicates a transmission slot structure of the CA_ICH for transmitting a channel allocation command. Reference numeral 1331 indicates a transmission frame structure of the CD_ICH for transmitting a response signal for the CD_P. Reference numeral 1341 indicates a frame structure for transmitting the channel allocation command over the CA_ICH with a tune delay τ after transmission of the CD_ICH frame. Reference numerals 1303 and 1313 indicate the CSICH part. The method for allocating the channels as shown in FIGS. 13A and 13B has the following advantages.

In this channel allocation method, the CD_ICH and the CA_ICH are physically separated, because they have different downlink channels. Therefore, if the AICH has 16 signatures, the first channel allocation method can use 16 signatures for the CD_ICH and also use 16 signatures for the CA_ICH. In this case, the kind of information that can be transmitted using the sign of the signatures can be doubled. Therefore, by using the sign of '+1' or '−1' of the CA_ICH, it is possible to use 32 signatures for the CA_ICH.

In this case, it is possible to allocate the different channels to several users, who have simultaneously requested the same kind of channel, in the following sequence. First, it is assumed that UE#1, UE#2 and UE#3 in a UTRAN simultaneously transmit AP#3 to the UTRAN to request a channel corresponding to the AP#3, and UE#4 transmits AP#5 to the UTRAN to request a channel corresponding to the AP#5. This assumption corresponds to the first column of Table 5 below.

In this case, the UTRAN recognizes the AP#3 and the AP#5. At this point, the UTRAN generates AP_AICH as a response to the received APs according to a defined previously criterion. As an example of the previously defined criterion, the UTRAN can respond to the received APs according to a receiving power ratio of the APs. Here, it is assumed that the UTRAN selects the AP#3. The UTRAN then transmits ACK to the AP#3 and NAK to the AP#5. This corresponds to the second column of Table 5.

Then, the UE#1, UE#2 and UE#3 receive ACK transmitted from the UTRAN, and randomly generate CD_Ps, respectively. When three UEs generate the CD Ps (i.e., at least two UEs generate the CD_Ps for one AP_AICH), the respective UEs generate the CD_Ps using given signatures and the CD_Ps transmitted to the UTRAN have the different signatures. Herein, it is assumed that the UE#1 generated CD_P#6, the UE#2 generated CD_P#2 and the UE#3 generated CD_P#9, respectively.

Upon receipt of the CD_Ps transmitted from the UEs, the UTRAN recognizes receipt of the 3 CD_Ps and examines whether the CPCHs requested by the UEs are available. When there exist more than 3 CPCHs in the UTRAN, requested by the UEs, the UTRAN transmits ACKs to CD_ICH#2, CD_ICH#6 and CD_ICH#9, and transmits three channel allocation messages through the CA_ICH. In this case, if the UTRAN transmits the messages for allocating the channel numbers of #4, #6 and #10 through the CA_ICH, the UEs will know the CPCH number allocated to themselves in the following process. The UE#1 knows the signature for the CD_P transmitted to the UTRAN and also knows that the signature number is 6. In this manner, even when the UTRAN transmits several ACKs to the CD_ICH, it is possible to know how many ACKs have been transmitted.

A description of this embodiment of the present invention has been made on the assumption of the case shown in Table 5. First, the UTRAN has transmitted three ACKs to the UEs through CD_ICH, and also transmitted three channel allocation messages to the CA_ICH. The transmitted channel allocation messages correspond to the channel numbers of #2, #6 and #9. Upon receipt of the CD_ICH and the CA_ICH, the UE#1 may know that three UEs in the UTRAN have simultaneously requested the CPCH channels and the UE#1 itself can use the CPCH according to the contents of the second message out of the channel allocation messages transmitted through the CA_ICH, in the sequence of the ACKs of the CD_ICH.

TABLE 5

| UE No | AP No | AP_IACH | CD_P No | CA_ICH |
|---|---|---|---|---|
| 1 | 3 | ACK#3 | 6 (Second) | #6 (Second) |
| 2 | 3 | ACK#3 | 2 (First) | #4 (First) |
| 3 | 3 | ACK#3 | 9 (Third) | #10 (Third) |
| 4 | 5 | NAK#5 | | |

In this process, since the UE#2 has transmitted the CD_P#2, the UE#2 will use the fourth one out of the channel allocation messages transmitted by the CA_ICH. In the same manner, the UE#3 is allocated the $10^{th}$ channel. In this manner, it is possible to simultaneously allocate several channels to several users.

2. Second Channel Allocation Method

The second channel allocation method is a modified form of the first channel allocation method, implemented by setting a transmission time difference τ between the CD_ICH frame and the CA_ICH frame to '0' to simultaneously transmit the CD_ICH and the CA_ICH. The W-CDMA system spreads one symbol of the AP_AICH with a spreading factor 256 and transmits 16 symbols at one slot of the AICH. The method for simultaneously transmitting the CD_ICH and the CA_ICH can be implemented by using symbols of different lengths.

That is, the method can be implemented by allocating orthogonal codes having different spreading factors to the CD_ICH and the CA_ICH. As an example of the second method, when the possible number of the signatures used for the CD_P is 16 and a maximum of 16 CPCHs can be allocated, it is possible to allocate the channels of a length of 512 chips to the CA_ICH and the CD_ICH, and the CA_ICH and the CD_ICH each can transmit 8 symbols with a length of 512 chips. Here, by allocating 8 signatures, being orthogonal to one another, to the CD_ICH and the CA_ICH and multiplying the allocated 8 signatures by a sign of +1/−1, it is possible to transmit 16 kinds of the CA_ICH and the CD_ICH. This method is advantageous in that it is not necessary to allocate separate orthogonal codes to the CA_ICH.

As described above, the orthogonal codes having a length of 512 chips can be allocated to the CA_ICH and the CD_ICH in the following method. One orthogonal code $W_i$ of length 256 is allocated to both the CA_ICH and the CD_ICH. For the orthogonal code of length 512 allocated to the CD_ICH, the orthogonal code $W_i$ is repeated twice to create an orthogonal code $[W_i \, W_i]$ of length 512. Further, for the orthogonal code of length 512 allocated to the CA_ICH, an inverse orthogonal code $-W_i$ is connected to the orthogonal code Wi to create an orthogonal code $[W_i -W_i]$. It is possible to simultaneously transmit the CD_ICH and the CA_ICH without allocating separate orthogonal codes, by using the created orthogonal codes $[W_i \, W_i]$ and $[W_i -W_i]$.

Figure 14:
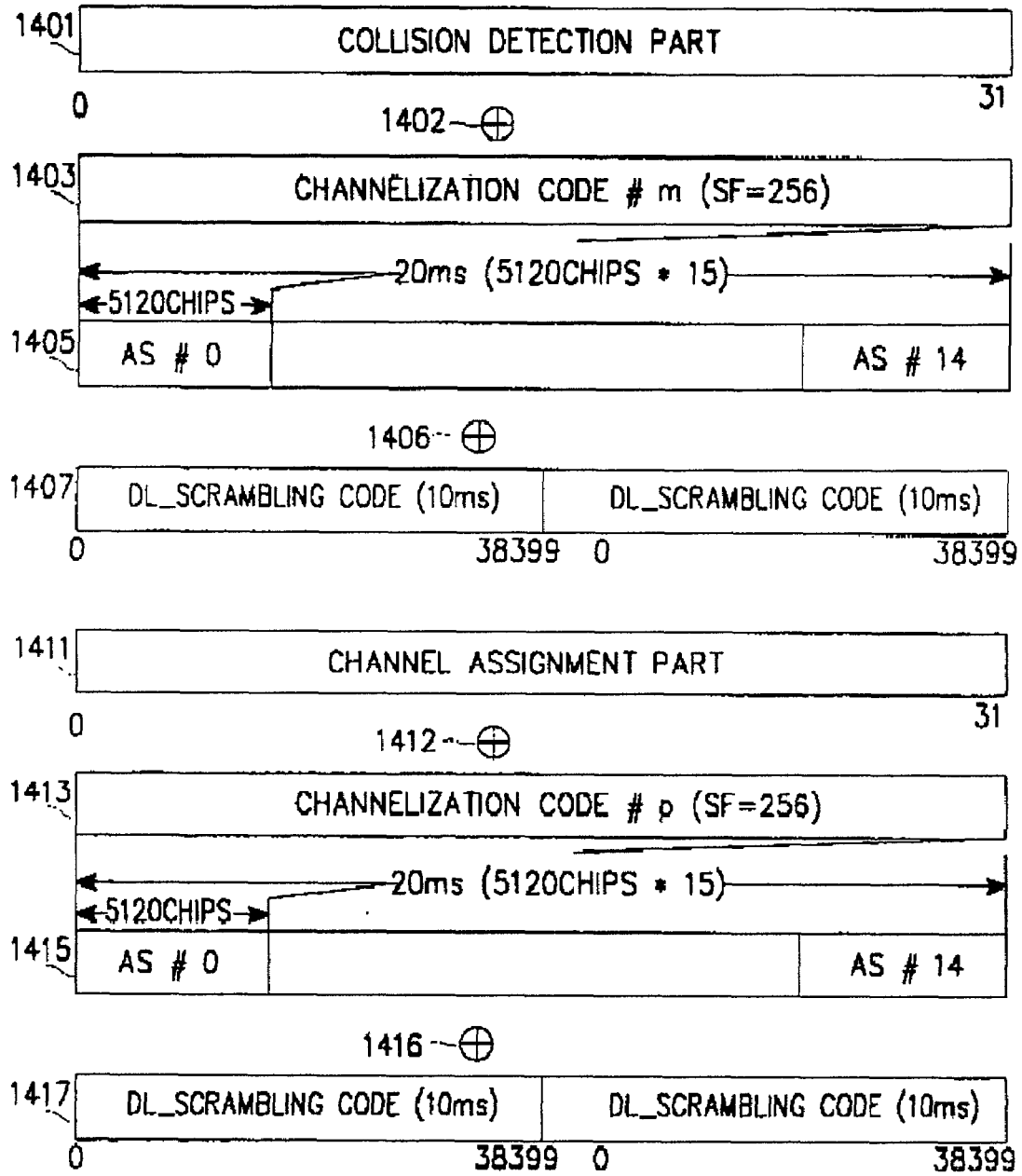
FIG. 14 is a diagram illustrating a scheme for simultaneously transmitting a collision detection indicator channel (CD_ICH) and the CA_ICH by allocating different channelization codes having the same spreading factor according to an embodiment of the present invention.

FIG. 14 shows another example of the second method, where the CD_ICH and the CA_ICH are simultaneously transmitted by allocating different channelization codes having the same spreading factor. Reference numerals 1401 and 1411 of FIG. 14 indicate the CD_ICH part and the CA_ICH part, respectively. Reference numerals 1403 and 1413 indicate different orthogonal channelization codes having the same spreading factor of 256. Reference numerals 1405 and 1415 indicate a CD_ICH frame and a CA_ICH frame each comprised of 15 access slots having a length of 5120 chips.

Referring to FIG. 14, the CD_ICH part 1401 is created by multiplying the signatures obtained by repeating a signature of length 16 twice in a symbol unit by sign values of '1', '−1' or '0' (indicating ACK, NAK, or Acquisition_Fail, respectively) on a symbol unit basis. The CD_ICH part 1401 can simultaneously transmit ACK and NAK for several signatures. The CD_ICH part 1401 is spread with the channelization code 1403 by a multiplier 1402, and constitutes one access slot of the CD_ICH frame 1405. The CD_ICH frame 1405 is spread with a downlink scrambling code 1407 by a multiplier 1406 and then transmitted.

The CA_ICH part 1411 is created by multiplying the signatures obtained by repeating a signature of length 16 twice in a symbol unit by the sign values of '1', '−1' or '0' (indicating ACK, NAK, or Acquisition_Fail, respectively) on a symbol unit basis. The CA_ICH part 1411 can simultaneously transmit ACK and NAK for several signatures. The CA_ICH part 1411 is spread with the channelization code 1413 by a multiplier 1412, and constitutes one access slot of the CA_ICH frame 1415. The CA_ICH frame 1415 is spread with a downlink scrambling code 1417 by a multiplier 1416 before transmission.

Figure 15:
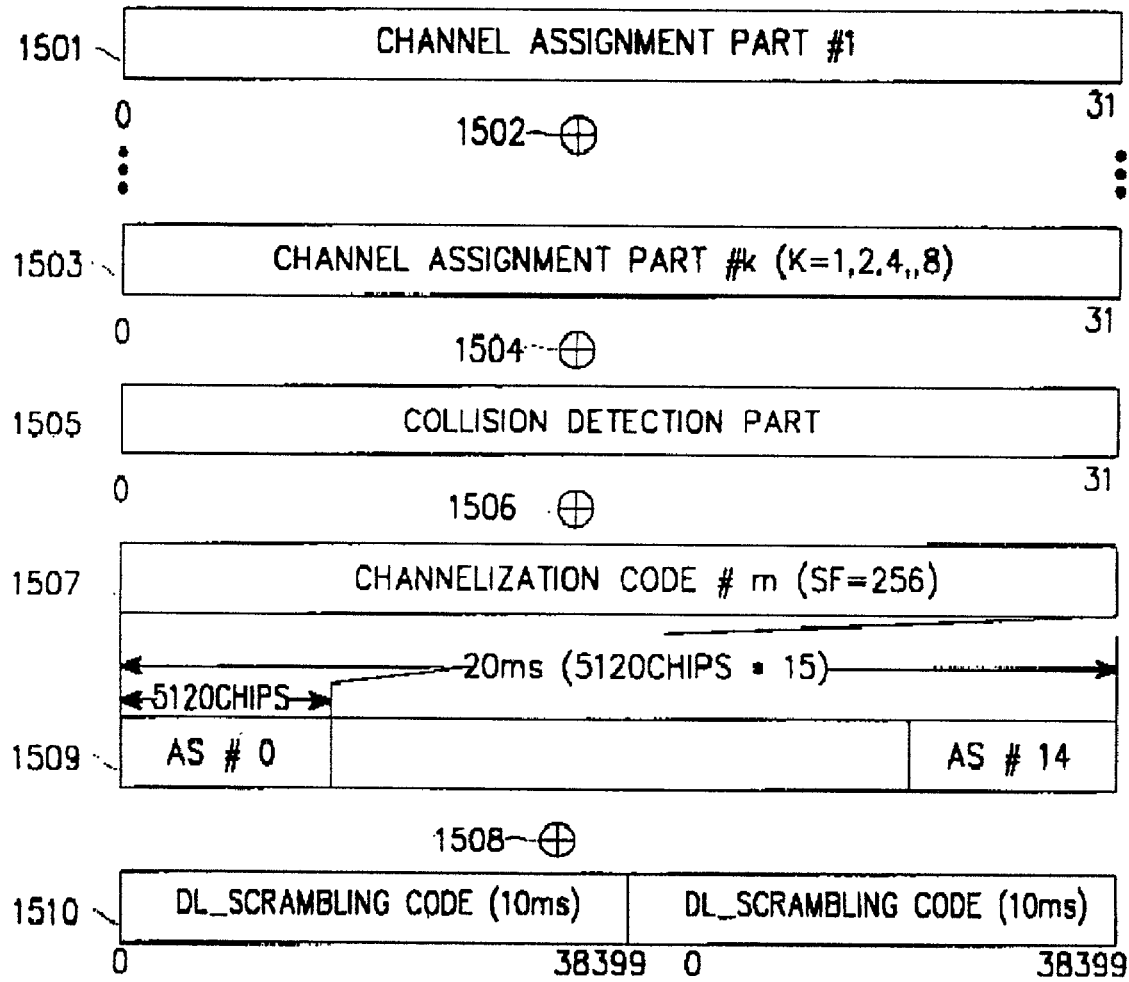
FIG. 15 is a diagram illustrating a scheme for spreading the CD_ICH and the CA_ICH with the same channelization code and simultaneously transmitting the spread channels using the different signature groups according to another embodiment of the present invention.

FIG. 15 shows further another example of the second method, where the CD_ICH and the CA_ICH are spread with the same channelization code and simultaneously transmitted using different signature groups.

Referring to FIG. 15, a CA_ICH part 1501 is created by multiplying the signatures obtained by repeating a signature of length 16 twice in a symbol unit by the sign values of '1', '−1' or '0' (indicating ACK, NAK, or Acquisition_Fail, respectively) on a symbol unit basis. The CA_ICH part 1501 can simultaneously transmit ACK and NAK for several signatures. A $k^{th}$ CA_ICH part 1503 is used when one CPCH channel is associated with several CA signatures. A reason for associating one CPCH channel with several CA signatures is to decrease the probability that the UE will use a CPCH that is not allocated by the UTRAN due to an error that occurred while the CA_ICH was transmitted from the UTRAN to the UE.

Reference numeral 1505 of FIG. 15 indicates a CD_ICH part. The CD_ICH part 1505 is identical to the CA_ICH part 1501 in physical structure. However, the CD_ICH part 1505 is orthogonal with the CA_ICH part 1501, since the CD_ICH part 1505 uses a signature selected from a signature group different from the signature group used for the CA_ICH part. Therefore, even though the UTRAN simultaneously transmits the CD_ICH and the CA_ICH, the UE cannot confuse the CD_ICH with the CA_ICH. The CA_ICH part#1 1501 is added to the CA_ICH part#k 1503 by an adder 1502. The CD_ICH part 1505 is added to the added CA_ICH part by an adder 1504, and then spread with the orthogonal channelization code 1507 by a multiplier 1506. The resulting spread value constitutes an indicator part of one CD/CA_ICH slot, and the CD/CA_ICH is spread with a downlink scrambling code 1510 by a multiplier 1508 before transmission.

In the method for simultaneously transmitting the CD_ICH and the CA_ICH by setting the transmission time different τ between the CD_ICH frame and the CA_ICH frame to '0', the signatures for the AICH, shown in Table 4, defined in the W-CDMA standard can be used. With regard to the CA_ICH, since the UTRAN designates one of several CPCH channels to the UE, the UE receiver should attempt detecting several signatures. In the conventional AP_AICH and the CD_ICH, the UE would perform detection on only one signature.

However, when the CA_ICH according to this embodiment of the present invention is used, the UE receiver should attempt detecting all the possible signatures. Therefore, there is required a method for designing or rearranging the structure of signatures for the AICH so as to decrease complexity of the UE receiver.

As described above, it will be assumed that the 16 signatures created by multiplying 8 signatures out of 16 possible signatures by the signs (+1/−1) are allocated to the CD_ICH, and the 16 signatures created by multiplying the remaining 8 signatures out of the 16 possible signatures by the signs (+1/−1) are allocated to the CA_ICH for CPCH allocation.

In the W-CDMA standard, the signatures for the AICH use the Hadamard function, which is made in the following format.

| | | |
|---|---|---|
| Hn = | Hn-1 | Hn-1 |
| | Hn-1 | −Hn-1 |
| H1 = | 1 | 1 |
| | 1 | −1 |

From this, the Hadamard function of length 16 required in the embodiment of the present invention is as follows. The signatures created by the Hadamard function shown in Table 4 show the format given after multiplying the signatures by a channel gain A of the AICH, and the following signatures show the format given before multiplying the signatures by the channel gain A of the AICH.

```
1  1  1  1  1  1  1  1  1  1  1  1  1  1  1  1  => S0
1 -1  1 -1  1 -1  1 -1  1 -1  1 -1  1 -1  1 -1  => S1
1  1 -1 -1  1  1 -1 -1  1  1 -1 -1  1  1 -1 -1  => S2
```

-continued

```
1  -1  -1   1   1  -1  -1   1   1  -1  -1   1   1  -1  -1   1  =>  S3
1   1   1   1  -1  -1  -1  -1   1   1   1   1  -1  -1  -1  -1  =>  S4
1  -1   1  -1  -1   1  -1   1   1  -1   1  -1  -1   1  -1   1  =>  S5
1   1  -1  -1  -1  -1   1   1   1   1  -1  -1  -1  -1   1   1  =>  S6
1  -1  -1   1  -1   1   1  -1   1  -1  -1   1  -1   1   1  -1  =>  S7
1   1   1   1   1   1   1   1  -1  -1  -1  -1  -1  -1  -1  -1  =>  S8
1  -1   1  -1   1  -1   1  -1  -1   1  -1   1  -1   1  -1   1  =>  S9
1   1  -1  -1   1   1  -1  -1  -1  -1   1   1  -1  -1   1   1  =>  S10
1  -1  -1   1   1  -1  -1   1  -1   1   1  -1  -1   1   1  -1  =>  S11
1   1   1   1  -1  -1  -1  -1  -1  -1  -1  -1   1   1   1   1  =>  S12
1  -1   1  -1  -1   1  -1   1  -1   1  -1   1   1  -1   1  -1  =>  S13
1   1  -1  -1  -1  -1   1   1  -1  -1   1   1   1   1  -1  -1  =>  S14
1  -1  -1   1  -1   1   1  -1  -1   1   1  -1   1  -1  -1   1  =>  S15
```

Eight of the above Hadamard functions are allocated to the CD_ICH and the remaining eight Hadamard functions are allocated to the CA_ICH. In order to simply perform the fast Hadamard transform (FHT), the signatures for the CA_ICH are allocated in the following sequence.

{S0, S8, S12, S2, S6, S10, S14}

Further, the signatures for the CD_ICH are allocated in the following sequence.

{S1, S9, S5, S13, S3, S7, S11, S15}

Here, the signatures for the CA_ICH are allocated from left to right in order to enable the UE to perform FHT, thereby minimizing the complexity. When 2, 4 and 8 signatures are selected from the signatures for the CA_ICH from left to right, the number of 1's is equal to the number of −1's in each column except the last column. By allocating the signatures for the CD_ICH and the CA_ICH in the above manner, it is possible to simplify the structure of the UE receiver for the number of the used signatures.

In addition, it is possible to associate the signatures to the CPCH or the downlink channel for controlling the CPCH in another format. For example, the signatures for the CA_ICH can be allocated as follows.

| | |
|---|---|
| [0, 8] => | a maximum of 2 signatures are used |
| [0, 4, 8, 12] => | a maximum of 4 signatures are used |
| [0, 2, 4, 6, 8, 10, 12, 14] => | a maximum of 8 signatures are used |

If NUM_CPCH (where 1<NUM_CPCH≦16) CPCHs are used, the signs (+1/−1) multiplied by the signatures associated with a $k^{th}$ (k=0, . . . , NUM_CPCH−1) CPCH (or a downlink channel for controlling the CPCH) are given as follows.

$CA\_sign\_sig[k]=(-1)[k \bmod 2]$ where CA_sign_sig[k] indicates the sign of +1/−1 multiplied by the $k^{th}$ signature, and [k mod 2] indicates a remainder determined by dividing 'k' by 2. 'x' is defined as a number indicating a dimension of the signatures, which can be expressed as follows.

$x=2$ if $0<NUM\_CPCH≦4$ $4$ if $4<NUM\_CPCH≦8$ $8$ if $8<NUM\_CPCH≦16$

Further, the used signatures are as follows.

$CA\_sig[k]=(16/x)*\lfloor k/2 \rfloor+1$ where $\lfloor y \rfloor$ indicates that the maximum integer which does not exceed 'y'. For example, when 4 signatures are used, they can be allocated as follows.

```
S1   =>  1  1  1  1   1   1   1   1   1   1   1   1   1   1   1   1
S5   =>  1  1  1  1  -1  -1  -1  -1   1   1   1   1  -1  -1  -1  -1
S9   =>  1  1  1  1   1   1   1   1  -1  -1  -1  -1  -1  -1  -1  -1
S13  =>  1  1  1  1  -1  -1  -1  -1  -1  -1  -1  -1   1   1   1   1
```

As can be appreciated, if the signatures are allocated according to an embodiment of the present invention, the signatures have a format in which the Hadamard codes of length 4 are repeated four times. The UE receiver adds the repeated 4 symbols and then takes FHT of length 4, when receiving the CA_ICH, thereby making it possible to highly decrease the complexity of the UE.

Furthermore, in the CA_ICH signature mapping, the signature numbers for the respective CPCH are added one by one. In this case, the consecutive $2i^{th}$ and $(2i+1)^{th}$ symbols have opposite signs, and the UE receiver subtracts the rear symbol from the front symbol out of the two despread symbols, so that it can be regarded as the same implementation.

On the contrary, the signatures for the CD_ICH can be allocated in the following sequence. The easiest way of creating the signatures for the $k^{th}$ CD_ICH is to increase the signature number one by one in the above method for allocating the signatures for the CA_ICH. Another method can be expressed as follow.

$CD\_sign\_sig[k]=(-1)[k \bmod 2]$ $CD\_sig[k]=2*\lfloor k/2 \rfloor+2$

That is, as described above, the CA_ICH is allocated in the sequence of [1, 3, 5, 7, 9, 11, 13, 15].

Figure 16:
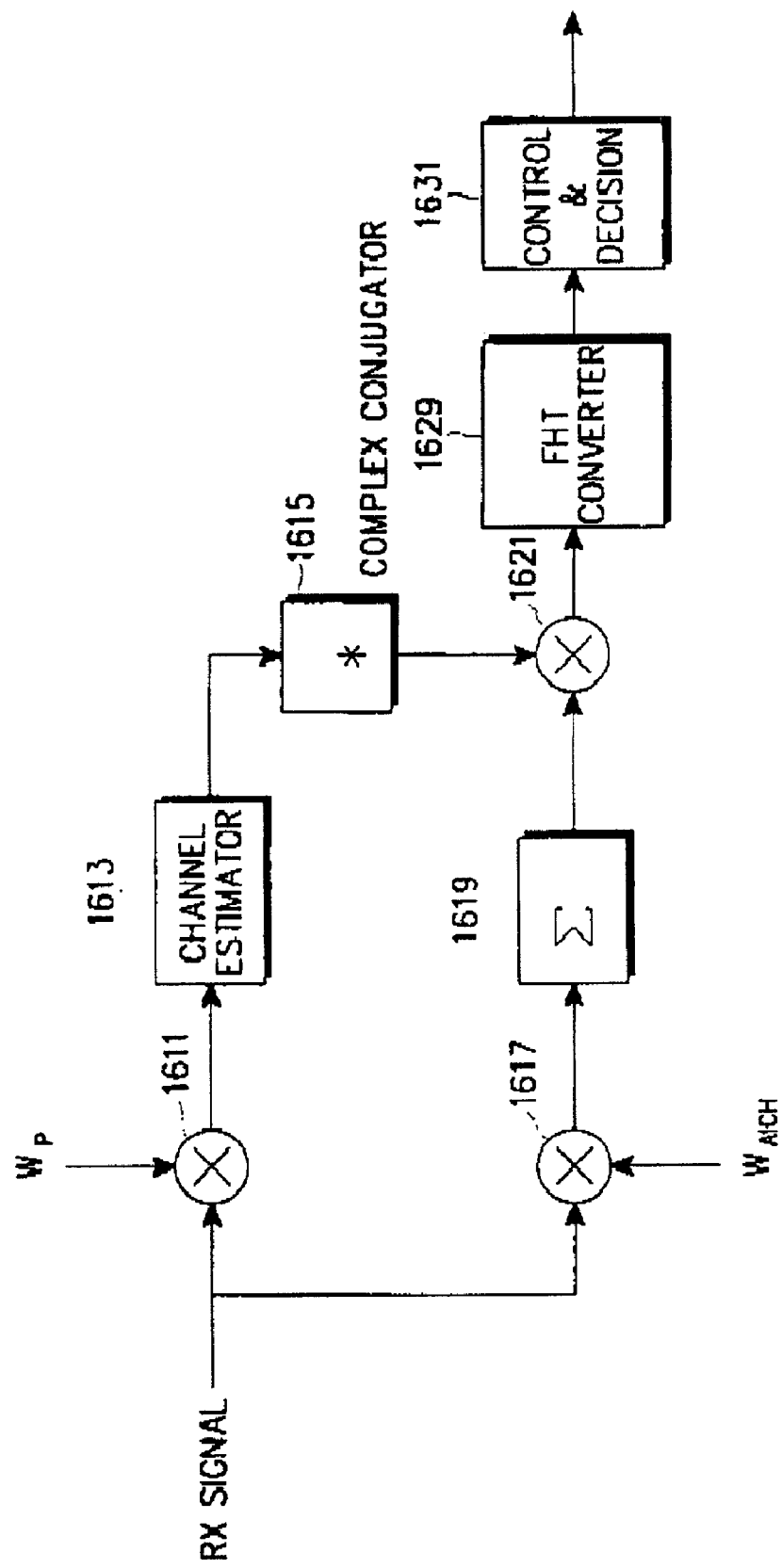
FIG. 16 is a diagram illustrating a CA_ICH receiver of a user equipment (UE) for a signature structure according to an embodiment of the present invention.

FIG. 16 shows a CA_ICH receiving device of the UE for the above signature structure. Referring to FIG. 16, a multiplier 1611 multiplies a signal received from an analog-to-digital (A/D) converter (not shown) by a spreading code $W_p$ for the pilot channel to despread the received signal, and provides the despread signal to a channel estimator 1613. The channel estimator 1613 estimates the size and phase of the downlink channel from the despread pilot channel signal. A complex conjugator 1615 complex conjugates the output of the channel estimator 1613.

In addition, further another method for transmitting the ICH is to use signatures other than the signatures used for the preamble. These signatures are shown in Table 6 below.

A second embodiment of the present invention uses the signatures shown in Table 6 for the ICH signatures and allocates the CA_ICH so that the UE receiver may have low complexity. An orthogonal property is maintained between the ICH signatures. Therefore, if the signatures allocated to the ICH are efficiently arranged, the UE can easily demodulate the CD_ICH by inverse fast Hadamard transform (IFHT).

TABLE 6

| Signature | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
|---|---|---|---|---|---|---|---|---|---|---|---|---|---|---|---|---|
| 1 | A | A | A | -A | -A | -A | A | -A | -A | A | A | -A | A | -A | A | A |
| 2 | -A | A | -A | -A | A | A | A | -A | A | A | A | -A | -A | A | -A | A |
| 3 | A | -A | A | A | A | -A | A | A | -A | A | A | A | -A | A | -A | A |
| 4 | -A | A | -A | A | -A | -A | -A | -A | -A | A | -A | A | -A | A | A | A |
| 5 | A | -A | -A | -A | -A | A | A | -A | -A | -A | -A | A | -A | -A | -A | A |
| 6 | -A | -A | A | -A | A | -A | A | -A | A | -A | -A | A | A | A | A | A |
| 7 | -A | A | A | A | -A | -A | A | A | A | -A | -A | -A | -A | -A | -A | A |
| 8 | A | A | -A | -A | -A | -A | -A | A | A | -A | A | A | A | A | -A | A |
| 9 | A | -A | A | -A | -A | A | A | A | A | A | -A | A | -A | A | A | A |
| 10 | -A | A | A | -A | A | A | -A | A | -A | A | A | A | -A | -A | A | A |
| 11 | A | A | A | A | A | A | -A | -A | A | A | -A | A | A | -A | -A | A |
| 12 | A | A | -A | A | A | A | A | A | -A | -A | -A | -A | A | A | A | A |
| 13 | A | -A | -A | A | A | -A | -A | -A | A | -A | A | -A | A | -A | A | A |
| 14 | -A | -A | -A | A | -A | A | A | A | A | A | A | A | -A | A | A | A |
| 15 | -A | -A | -A | -A | A | -A | -A | A | -A | A | -A | -A | A | -A | -A | A |
| 16 | -A | -A | A | A | -A | A | -A | -A | -A | -A | A | -A | A | A | -A | A |

A multiplier 1617 multiplies the received signal by a Walsh spreading code $W^{AICH}$ for the AICH channel, and an accumulator 1619 accumulates the outputs of the multiplier 1617 for a predetermined symbol period (e.g. 256-chip period) and outputs despread symbols. A multiplier 1621 multiplies the output of the accumulator 1619 by the output of the complex conjugator 1615 to modulate the input values, and provides the resulting output value to an FHT converter 1629.

Upon receiving the demodulated symbols, the FHT converter 1629 outputs signal strength for each signature. A control and decision block 1631 receives the output of the FHT converter 1629 and decides a signature having the highest possibility for the CA_ICH. In this embodiment of the present invention, the signature specified in the W-CDMA standard is used for the signature structure for the CA_ICH to simplify the structure of the UE receiver. Another allocation method will be described below, which is more efficient than the method for using a part of the signatures for the CA_ICH.

In this new allocation method, $2^K$ signatures of length $2^K$ are generated. (If the $2^K$ signatures are multiplied by the signs of +1/−1, the number of the possible signatures can be $2^{K+1}$.) However, if only some of the signatures are used, rather than all, it is necessary to more efficiently allocate the signatures in order to decrease complexity of the UE receiver. It will be assumed that M signatures out of all possible signatures are used. Herein, $2^{L-1} < M \leq 2^L$ and $1 \leq L \leq K$. The M signatures of length $2^K$ are converted to the form in which each bit of the Hadamard function of length $2^L$ is repeated $2^{K-L}$ times before transmission.

In Table 6, if the $n^{th}$ signature is represented by Sn and a value determined by multiplying $n^{th}$ signature by a sign '−1' is represented by −Sn, then the ICH signatures according to a second embodiment of the present invention are allocated as follows.

{S1, −S1, S2, −S2, S3, −S3, S14, −S14, S4, −S4, S9, −S9, S11, −S11, S15, −S15}

If the number of the CPCHs is smaller than 16, the signatures are allocated to the CPCHs from left to right so as to enable the UE to perform IFHT, thereby reducing the complexity. If 2, 4 and 8 signatures are selected from {1, 2, 3, 14, 15, 9, 4, 11} from left to right, the number of A's is equal to the number of −A's in each column excepting the last column. Then, by rearranging (or permuting) the sequence of the symbols and multiplying the rearranged symbols by a given mask, the signatures are converted to an orthogonal code capable of performing IFHT.

Figure 17:
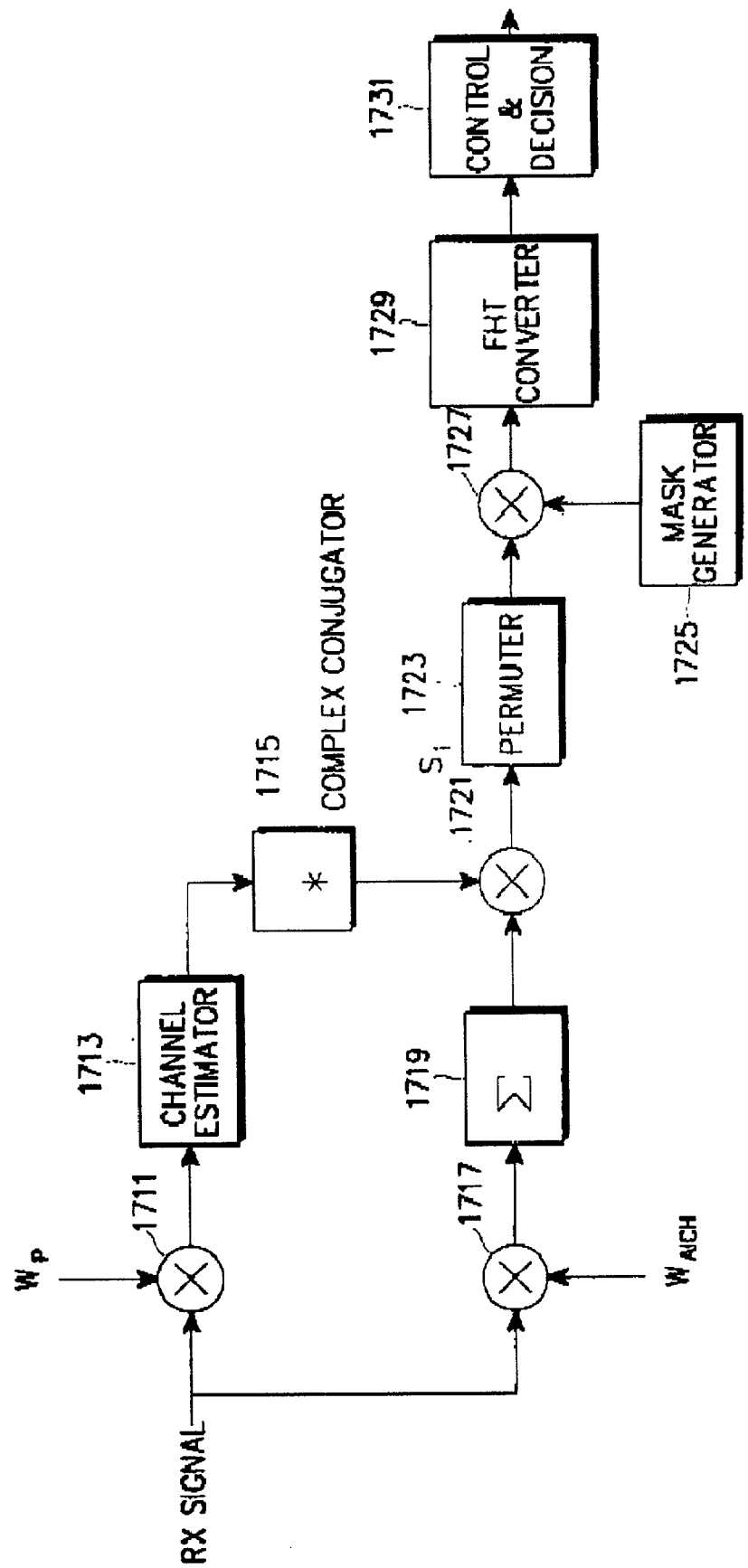
FIG. 17 is a diagram illustrating a receiver structure according to another embodiment of the present invention.

FIG. 17 shows a structure of the UE receiver according to a second embodiment of the present invention. Referring to FIG. 17, the UE despreads an input signal for a 256-chip period to generate channel-compensated symbol $X_i$. If it is assumed that $X_i$ indicates an $i^{th}$ symbol input to the UE receiver, a position shifter (or permuter) 1723 rearranges $X_i$ as follows.

Y={$X_{15}$, $X_9$, $X_{10}$, $X_6$, $X_{11}$, $X_3$, $X_7$, $X_1 X_{13}$, $X_{12}$, $X_{14}$, $X_4$, $X_8$, $X_5$, $X_2$, $X_0$}

A multiplier 1727 multiplies the rearranged value Y by the following mask M generated by a mask generator 1725.

M={−1, −1, −1, −1, 1, 1, 1, −1, 1, −1, −1, 1, 1, 1, −1, −1}

Then, the signatures of S1, S2, S3, S14, S15, S9, S4 and S11 are converted into S'1, S'2, S'3, S'14, S'15, S'9, S'4 and S'11, as follows.

```
S'1  =  1  1  1  1  1  1  1  1  1  1  1  1  1  1  1  1
S'2  =  1  1  1  1  1  1  1  1 -1 -1 -1 -1 -1 -1 -1 -1
S'3  =  1  1  1  1 -1 -1 -1 -1 -1 -1 -1 -1  1  1  1  1
S'14 =  1  1  1  1 -1 -1 -1 -1  1  1  1  1 -1 -1 -1 -1
S'15 =  1  1 -1 -1  1  1 -1 -1  1  1 -1 -1  1  1 -1 -1
S'9  =  1  1 -1 -1  1  1 -1 -1 -1 -1  1  1 -1 -1  1  1
S'4  =  1  1 -1 -1 -1 -1  1  1 -1 -1  1  1  1  1 -1 -1
S'11 =  1  1 -1 -1 -1 -1  1  1  1  1 -1 -1 -1 -1  1  1
```

It can be understood that by rearranging the sequence of the input symbols and multiplying the rearranged symbols by a given mask, the signatures are converted to an orthogonal code capable of performing IFHT. Further, it is not necessary to perform IFHT on the length 16, and it is possible to further decrease the complexity of the receiver by adding the repeated symbols and performing IFHT on the added symbols. That is, when 5 to 8 signatures are used (i.e., 9 to 16 CPCHs are used), two symbols are repeated. Thus, if the repeated symbols are added, IFHT is performed on only the length 8.

In addition, when 3 to 4 signatures are used (i.e., 5 to 8 CPCHs are used), 4 symbols are repeated, so that IFHT can be performed after adding the repeated symbols. By efficiently rearranging the signatures in this manner, it is possible to drastically decrease the complexity of the receiver.

The UE receiver of FIG. 17 is so constructed as to rearrange the despread symbols and then multiply the rearranged symbols by a specific mask M. However, it is possible to obtain the same result even if the despread symbols are first multiplied by a specific mask M before rearrangement. In this case, it should be noted that the mask M has a different type.

In operation, a multiplier 1711 receives an output signal of an A/D converter (not shown) and multiplies the received signal by a spreading code $W_p$ for the pilot channel to despread the received signal. A channel estimator 1713 estimates the size and phase of the downlink channel from the despread pilot signal. A multiplier 1717 multiplies the received signal by a Walsh spreading code $W_{AICH}$ for the AICH channel, and an accumulator 1719 accumulates the outputs of the multiplier 1717 for a predetermined symbol period (e.g., 256-chip period) and outputs despread symbols.

For demodulation, the despread AICH symbols are multiplied by the output of a complex conjugator 1715, which complex conjugates the output of the channel estimator 1713. The demodulated symbols are provided to a position shifter 1723, which rearranges the input symbols such that the repeated symbols should neighbor to each other. The output of the position shifter 1723 is multiplied by a mask output from a mask generator 1725 by a multiplier 1727 and provided to an FHT converter 1729. Receiving the output of the multiplier 1727, the FHT converter 1729 outputs signal strength of each signature. A control and decision block 1731 receives the output of the FHT converter 1729 and decides the signature having the highest possibility for CA_ICH. In FIG. 17, it is possible to obtain the same results, although the locations of the position shifter 1723, the mask generator 1725 and the multiplier 1727 are interchanged. Further, even if the UE receiver does not rearrange the position of the input symbols using the position shifter 1723, it is also possible to previously appoint the positions at which the symbols are to be transmitted and use the positional information when performing FHT.

Summarizing the embodiment of the CA_ICH signature structure according to the present invention, $2^K$ signatures of length $2^K$ are generated. (If the $2^K$ signatures are multiplied by the signs of +1/−1, the number of the possible signatures can be $2^{K+1}$). However, if only some of the signatures are used, rather than all, it is necessary to more efficiently allocate the signatures in order to decrease the complexity of the UE receiver. It will be assumed that M signatures out of the whole signatures are used. Herein, $2^{L-1} < M \leq 2^L$ and $1 \leq L \leq K$. The M signatures of length $2^K$ are converted to the form in which each bit of the Hadamard function of length $2^L$ is repeated $2^{K-L}$ times before transmission, when a specific mask is applied to (or XORed with) the respective bits after permuting the symbols. Therefore, this embodiment aims to simply perform FHT by multiplying the received symbols by a specific mask and permuting the symbols at the UE receiver.

It is important not only to select the proper signatures used for allocating the CPCH channel, but also to allocate the data channel and control channel for the uplink CPCH and a downlink control channel for controlling the uplink CPCH.

It is very important to allocate a data channel and a control channel of the uplink CPCH and allocate a downlink control channel for controlling the uplink CPCH as well as to select the proper signatures used for assigning the CPCH channel.

First, the easiest method for allocating the uplink common channel is to allocate a downlink control channel over which the UTRAN transmits power control information and an uplink common control channel over which the UE transmits a message, on a one-to-one basis. When the downlink control channel and the uplink common control channel are allocated on a one-to-one basis, it is possible to allocate the downlink control channel and the uplink common control channel by transmitting a command only once without a separate message. That is, this channel allocation method is applied when the CA_ICH designates the channels used for both the downlink and the uplink.

A second method maps the uplink channel to the function of the signatures for the AP, the slot number of the access channel and the signatures for the CD_P, transmitted from the UE. For example, the uplink common channel is associated with an uplink channel corresponding to a slot number at a time point when the signature for the CD_P and its preamble are transmitted. That is, in this channel allocation method, the CD_ICH allocates the channel used for the uplink, and the CA_ICH allocates the channel used for the downlink. If the UTRAN allocates the downlink channel in this method, it is possible to maximally utilize the resources of the UTRAN, thereby increasing utilization efficiency of the channels.

As another example of the method for allocating the uplink CPCH, since the UTRAN and the UE simultaneously know the signature for the AP transmitted from the UE and the CA_ICH received at the UE, the uplink CPCH channel is allocated using the above two variables. It is possible to increase capability of freely selecting the channels by associating the signatures for the AP with the data rate and allocating the CA_ICH to the uplink CPCH channel belonging to the data rate. Here, if the total number of the signatures for the AP is M and the number of the CA_ICHs is N, the number of selectable cases is M×N.

It will be assumed herein that the number of the signatures for the AP is M=3 and the number of the CA_ICHs is N=4, as shown in Table 7 below.

TABLE 7

| Channel No | | CA No received over CA_ICH | | | |
|---|---|---|---|---|---|
| | | CA(1) | CA(2) | CA(3) | CA(4) |
| AP No | AP(1) | 1 | 2 | 3 | 4 |
| | AP(2) | 5 | 6 | 7 | 8 |
| | AP(3) | 9 | 10 | 11 | 12 |

In Table 7, the signatures for the AP are AP(1), AP(2) and AP(3), and the channel numbers allocated by the CA_ICH are CA(1), CA(2), CA(3) and CA(4). For channel allocation, if the channels are selected by the CA_ICH only, the number of allocable channels is 4. That is, when the UTRAN transmits CA(3) to the UE and the UE receives the transmitted CA(3), the UE allocates the $3^{rd}$ channel.

However, since the UE and the UTRAN know the AP number and the CA number, it is possible to them in combination. For example, in the case where the channels are allocated using the AP number and the CA number shown in Table 7, if the UE has transmitted AP(2) and the UTRAN has received CA(3), the UE selects the channel number 7 (2,3) rather than selecting the channel number 3. That is, from Table 7, it is possible to know the channel corresponding to AP=2 and CA=3, and the information of Table 7 is stored in both the UE and the UTRAN. Therefore, the UE and the UTRAN may know that the allocated CPCH channel number is 7, by selecting the second row and the third column of Table 7. As a result, the CHCP channel number corresponding to (2,3) is 7.

Therefore, the method for selecting the channel using the two variables increases the number of selectable channels. The UE and the UTRAN have the information of Table 7 by signal exchange with their upper layers, or can calculate the information based on a formula. That is, it is possible to determine an intersection and its associated number using the AP number in row and the CA number in column. At present, since there are 16 kinds of APs and there are 16 numbers which can be allocated by the CA_ACH, the number of the possible channels is 16×16=256.

The information determined using the 16 kinds of the AP signatures and the CA_ICH message means the scrambling code used when the PC_P and the message of the uplink CPCH, the channelization code used for the uplink CPCH, (i.e., the channelization code to be used for the uplink DPDCH and the uplink DPCCH included in the uplink CPCH), and the channelization code for the downlink dedicated channel DL_DCH (i.e., the channelization code for the DL_DPCCH) for controlling power of the uplink CPCH. Regarding a method in which the UTRAN allocates a channel to the UE, since the AP signature requested by the UE is the maximum data rate desired by the UE, the UTRAN selects an unused one of the corresponding channels when it can allocate the maximum data rate requested by the UE.

Subsequently, the UTRAN selects the signatures according to the following rule for designating the signatures corresponding to the channel and transmits the selected signatures.

Figure 30A:
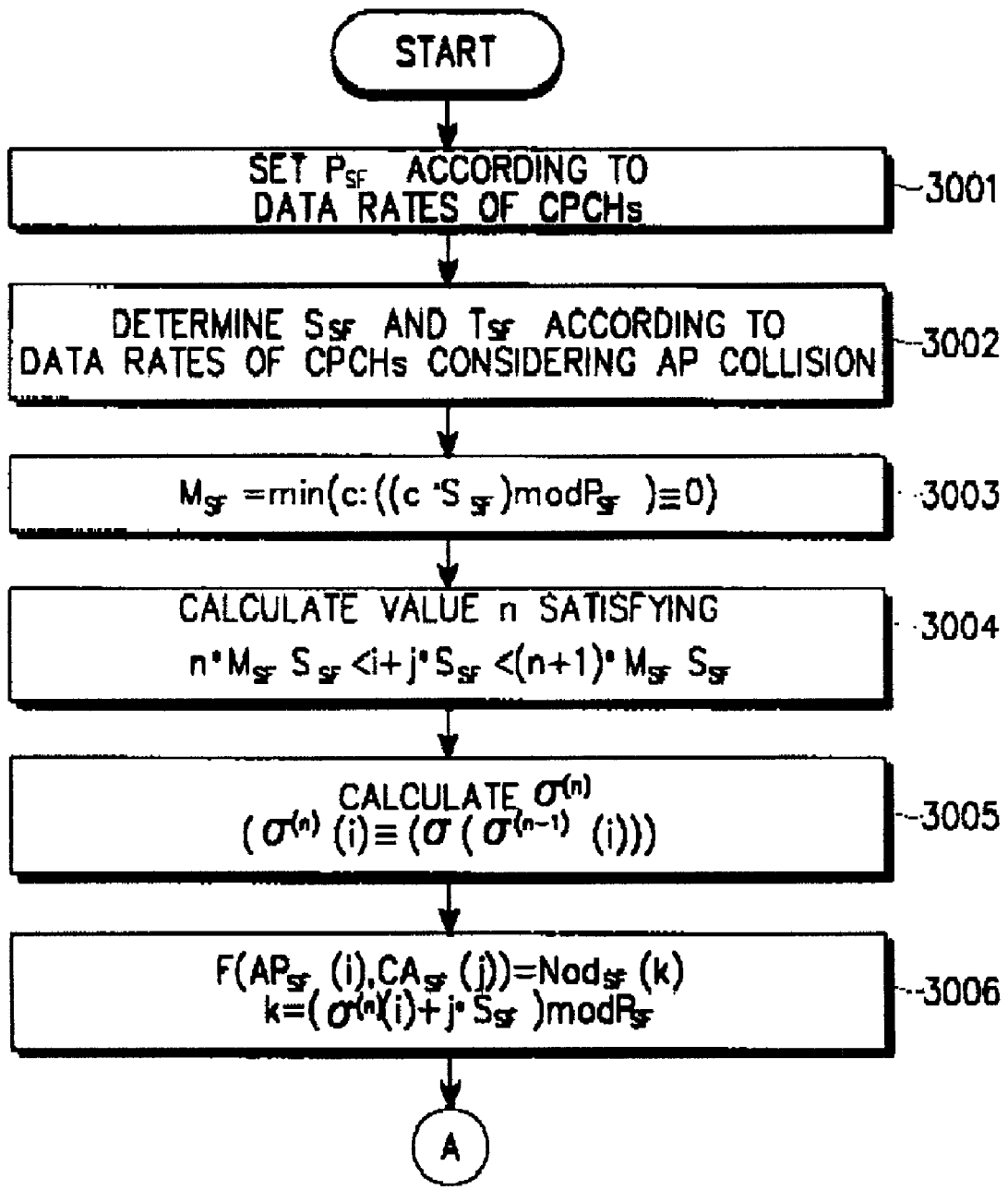
FIGS. 30A and 30B are flow charts illustrating a procedure for allocating information necessary for the CPCH to the UE using an AP signature and a CA message according to an embodiment of the present invention.
Figure 30B:
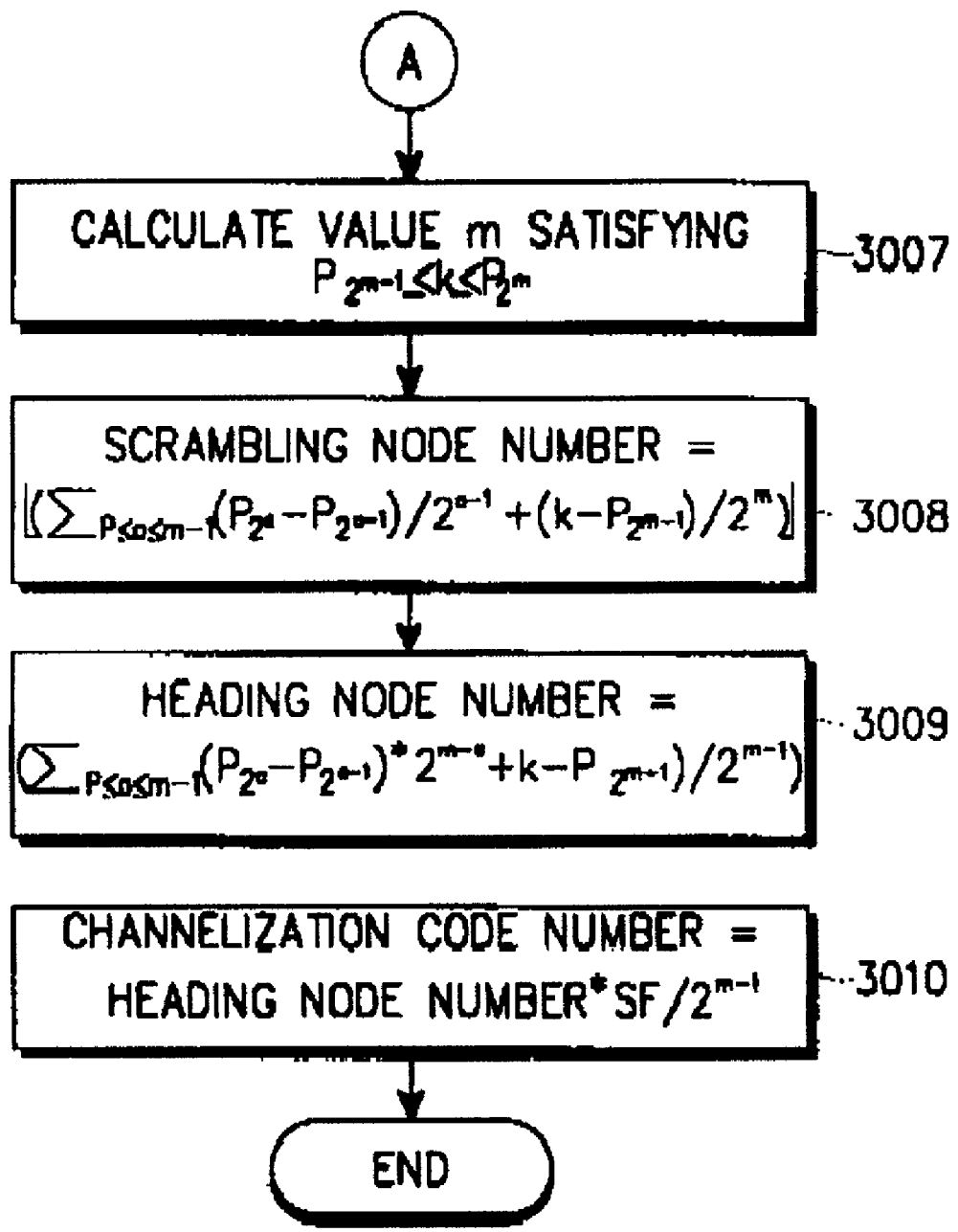

Shown in FIGS. 30A and 30B is an embodiment in which, as described above, the UTRAN allocates to the UE the uplink scramble code, the channelization code used for the scrambling code and the downlink dedicated channel for power control of the uplink CPCH, using the 16 kinds of the AP signatures and the CA_ICH message.

This method has the following disadvantages, when the UTRAN allocates the number of modems to a fixed value according to a data rate of the PCPCH. For example, assume that the UTRAN allocated 5 modems for a data rate 60 Kbps, 10 modems for a data rate 30 Kbps and 20 modems for a data rate 15 Kbps. In this circumstance, while the UEs belonging to the UTRAN use 20 15 Kbps PCPCHs, 7 30 Kbps PCPCHs and 3 60 Kbps PCPCHs, if another UE in the UTRAN requests the 15 Kbps PCPCH, the UTRAN cannot allocate the requested 15 bps PCPCH to the UE due to lack of an extra 15 Kbps PCPCH.

Therefore, an embodiment of the present invention includes a method of allocating the PCPCH to the UE even in the above situation, and providing two or, more data rates to a certain PCPCH so as to allocate the PCPCH having a higher data rate as a PCPCH having a lower data rate, when necessary.

Before describing a first method in which the UTRAN transmits information needed to use the CPCH to the UE using the AP signature and the CA_ICH message, the following three parameters are determined.

First, $P_{SF}$ indicates the number of the PCPCHs with a specific spreading factor (SF), and a code number of a channelization code with a specific spreading factor can be represented using the $P_{SF}$. For example, the channelization code can be represented by $Nod_{SF}(0)$, $Nod_{SF}(1)$, $Nod_{SF}(2)$, ..., $Nod_{SF}(P_{SF}-1)$. Among the $Nod_{SF}$ values, the even $Nod_{SF}$ values are used to spread the data part of the CPCH, and the odd $Nod_{SF}$ values are used to spread the control part of the CPCH. The $P_{SF}$ is equal to the number of modems used to demodulate the uplink CPCH at the UTRAN, and may also be equal to the number of the downlink dedicated channels allocated by the UTRAN in association with the uplink CPCH.

Second, $T_{SF}$ indicates the number of CA signatures used for a specific spreading factor, and a certain CA signature number used for a specific spreading factor can be represented using the $T_{SF}$. For example, the CA signature number can be represented by $CA_{SF}(0)$, $CA_{SF}(1)$, ..., $CA_{SF}(T_{SF}-1)$.

Third, $S_{SF}$ indicates the number of the AP signatures used for a specific spreading factor, and a certain AP signature number used for a specific spreading factor may be represented using the $S_{SF}$. For example, the AP signature number may be represented by $AP_{SF}(0)$, $AP_{SF}(1)$, ..., $AP_{SF}(S_{SF}-1)$.

These three parameters are determined by the UTRAN. A value obtained by multiplying $T_{SF}$ by $S_{SF}$ must be equal to or larger than $P_{SF}$, and the $S_{SF}$ may be set by the UTRAN considering a collision degree permissible by the UEs using the CPCH in the process of transmitting the AP, and a utilization degree of the CPCH with the respective spreading factor (which is inversely proportional to the data rate). When the $S_{SF}$ is set, $T_{SF}$ is determined considering $P_{SF}$.

With reference to FIGS. 30A and 30B, a detailed description will now be made of the first method for transmitting the information necessary for the CPCH to the UE using the AP signature and the CA message. In FIG. 30A, reference numeral 3001 indicates a step where the UTRAN sets $P_{SF}$ according to how may PCPCHs are to be used, and reference numeral 3002 indicates a step of determining $S_{SF}$ and $T_{SF}$.

Reference numeral 3003 indicates a step of calculating $M_{SF}$. The $M_{SF}$ is the minimum positive number C set such that a valued determined by multiplying a given positive number C by $S_{SF}$ and then dividing the multiplied value by $S_{SF}$ becomes 0. The $M_{SF}$ is a period needed when the CA message indicates the same physical common packet channel (PCPCH). A reason for calculating $M_{SF}$ is to allocate the CA message such that the CA message should not repeatedly indicate the same PCPCH at stated periods. In step 3003, the $M_{SF}$ is calculated by $$M_{SF} = \min\{c : (c*S_{SF}) \bmod (S_{SF}) \equiv 0\}$$

Reference numeral 3004 is a step of calculating a value n, which indicates how many times the period of $M_{SF}$ has been repeated. For example, n=0 means that the period of the CA message has never been repeated, and n=1 means that the period of the CA message has been repeated once. The value n is obtained in the process of searching for n satisfying the following condition, wherein n starts from 0:

$$n*M_{SF}*S_{SF} \leq i + j*S_{SF} < (n+1)*M_{SF}*S_{SF}$$

where i denotes an AP signature number and j denotes a CA message number.

Reference numeral 3005 is a step of calculating a sigma (σ) function value. The σ function corresponds to permutation, and an abject of calculating the σ function is as follows. That is, if the CA message periodically indicates only a specific PCPCH, the CA message will have a periodic property, so that it may not indicate other PCPCHs. Therefore, the σ function is calculated to freely control the period of the CA message so as to prevent the CA message from having the period property, thus enabling the CA message to be able to freely indicate PCPCHs.

The σ function is defined as:

$$\sigma^0(i) \equiv i$$

$$\sigma^1(i) \equiv (i+1) \bmod S_{SF}$$

$$\sigma^n(i) \equiv \sigma(\sigma^n(i))$$

where i denotes an AP signature number, and an $S_{SF}$ modulo operation is performed to prevent the σ value from exceeding the $S_{SF}$ value and to enable the CA message to sequentially indicate the PCPCHs.

Reference numeral 3006 indicates a step of calculating a value k by receiving an AP signature number i and a CA message number j, using the σ function value calculated in step 3005 and the value n calculated in step 3004. The value k indicates a channel number of the PCPCH with a specific spreading factor or a specific data rate. The value k corresponds on a one-to-one basis to the modem number allocated for demodulation of the uplink PDPDH with the specific spreading factor or the specific data rate. In addition, the value k can also correspond to the scrambling code for the uplink PCPCH on a one-to-one basis.

As a result of calculating the value k, a channel number of the downlink dedicated channel is determined which corresponds to the value k on a one-to-one basis. In other words, the channel number of the downlink dedicated channel is determined in combination of the AP signature number transmitted by the UE and the CA message allocated by the UTRAN, thus making it possible to control the uplink CPCH which corresponds to the downlink dedicated channel.

In FIG. 30B, reference numeral 3007 indicates a step of determining a range m of the channelization code to determine which spreading factor corresponds to the channelization code for the data part of the uplink common channel corresponding on a one-to-one basis to the downlink dedicated channel to which the value k calculated in step 3006 is designated. The range of the uplink channelization code is calculated using the following condition:

$$P_{2^{m-1}} \leq k < P_{2^m}$$

where $P_{2^{m-1}}$ denotes a channelization code (or OVSF code) with a spreading factor $2^{m-1}$, and $P_{2^m}$ denotes a channelization code (or OVSF code) with a spreading factor $2^m$. Hence, by using the value k, it is possible to know which spreading factor the channelization code used in the message part of the uplink PCPCH has in the OVSF code tree.

Reference numeral 3008 is a step of determining a code number of the scrambling code to be used for the uplink PCPCH depending on the value k calculated in step 3006 and the value m calculated in step 3007. The code number of the scrambling code corresponds to the uplink scrambling code used for the PCPCH on a one-to-one basis, and the UE then spreads PC_P and PCPCH using the scrambling code indicated by the scrambling code number and transmits the spread values to the UTRAN.

The code number of the uplink scrambling code is calculated by $$\left\lfloor \sum_{2 \leq a < m-1} (P_{2^n} - P_{2^{u-1}})/2^{a-1} + (k - P_{2^{m-1}})/2^m \right\rfloor$$

where k denotes the value calculated in step 3006 and m denotes the value calculated in step 3007.

Reference numeral 3009 indicates a step of determining a heading node of the channelization code used when the UE channelizes the message part of the uplink PCPCH. The heading node means a node, which coincides with the value k, having the lowest spreading factor (or the highest data rate) in the branches of the OVSF code tree.

After determining the heading node, the UE determines the channelization code to be used depending on the spreading factor determined while receiving AP. For example, if k=4, the heading node coinciding with the value k has a spreading factor 16 and the UE desires a PCPCH with a spreading factor 64, then the UE will select and use a channelization code with a spreading factor 64 from the heading node. There are two selecting methods.

In one method, a channelization code having a channelization code branch extending upward in the heading node, i.e., having a spreading factor 256, is used for a control part of the uplink PCPCH, and when it reaches a channelization code branch having the spreading factor requested by the UE out of the channelization code branches extending downward in the heading node, a channelization code extending upward from the above branch is used for the message part. In another method, a channelization code with a spreading factor 256, created while continuously extending downward from the lower branch of the heading node is used for channel spreading the control part of the PCPCH, and when it reaches a channelization code branch having the spreading code requested by the UE while continuously extending upward from the upper branch of the heading node, the upper one of the two branches is used for channel spreading the message part.

Reference numeral 3010 indicates a step of determining a channelization code used to channel-spread the message part of the PCPCH using the heading node calculated in step 3009 and the spreading factor known to the UE while transmitting the AP. In this step, the latter method was used to determine the channelization code to be used by the UE. The channelization code is determined by a following formula:

Channel Code Number=(Heading Node Number)
$*SF/2^{m-1}$

It is possible to increase utilization of the PCPCH resources as compared with the prior art, if the UTRAN allocates the information and channel necessary for the PCPCH to the UE using the AP and the CA message in the method described with reference to FIGS. 30A and 30B.

Embodiments

A detailed description will be made of an algorithm for the first method according to an embodiment of the present invention, in which the UTRAN transmits to the UE the information needed to use the CPCH using the AP signature and the CA_ICH message.

| | | |
|---|---|---|
| $P_{4,2} = 1$ | $AP_1 (=AP_{4,2}(0))$, | $AP_2 (=AP_{4,2}(1))$ |
| $P_4 = 1$ | $AP_3 (=AP_4(0))$, | $AP_4 (=AP_4(1))$ |
| $P_8 = 2$ | $AP_5 (=AP_8(0))$, | $AP_6 (=AP_8(1))$ |
| $P_{16} = 4$ | $AP_7 (=AP_{16}(0))$, | $AP_8 (=AP_{16}(1))$ |
| $P_{32} = 8$ | $AP_9 (=AP_{32}(0))$, | $AP_{10} (=AP_{32}(1))$ |
| $P_{64} = 16$ | $AP_{11} (=AP_{64}(0))$, | $AP_{12} (=AP_{64}(1))$ |
| $P_{128} = 32$ | $AP_{13} (=AP_{128}(0))$, | $AP_{14} (=AP_{128}(1))$ |
| $P_{256} = 32$ | $AP_{15} (=AP_{256}(0))$, | $AP_{16} (=AP_{256}(1))$ |

It will be assumed herein that all the 16 CAs can be used. Here, the node values are searched using a given AP signature value and a CA signature value provided from the UTRAN, as follows.

(1) For multi-code: $P_{4,2}=1$
$F(AP_1,CA_0)=Nod_{4,2}(0)$
$F(AP_2,CA_0)=Nod_{4,2}(0)$
(2) For SF=4: $P_4=1$
$F(AP_3,CA_0)=Nod_4(0)$
$F(AP_4,CA_0)=Nod_4(0)$
(3) For SF=8: $P_8=2$
$F(AP_5,CA_0)=Nod_8(0)$, $F(AP_6,CA_1)=Nod_8(0)$
$F(AP_6,CA_0)=Nod_8(1)$, $F(AP_5,CA_1)=Nod_8(1)$
(4) For SF=16: $P_{16}=4$
$F(AP_7,CA_0)=Nod_{16}(0)$, $F(AP_8,CA_2)=Nod_{16}(0)$
$F(AP_8,CA_0)=Nod_{16}(1)$, $F(AP_7,CA_2)=Nod_{16}(1)$
$F(AP_7,CA_1)=Nod_{16}(2)$, $F(AP_8,CA_3)=Nod_{16}(2)$
$F(AP_8,CA_1)=Nod_{16}(3)$, $F(AP_7,CA_3)=Nod_{16}(3)$
(5) For SF=32: $P_{32}=8$
$F(AP_9,CA_0)=Nod_{32}(0)$, $F(AP_{10},CA_4)=Nod_{32}(0)$
$F(AP_{10},CA_0)=Nod_{32}(1)$, $F(AP_9,CA_4)=Nod_{32}(1)$
$F(AP_9,CA_1)=Nod_{32}(2)$, $F(AP_{10},CA_5)=Nod_{32}(2)$
$F(AP_{10},CA_1)=Nod_{32}(3)$, $F(AP_9,CA_5)=Nod_{32}(3)$
$F(AP_9,CA_2)=Nod_{32}(4)$, $F(AP_{10},CA_6)=Nod_{32}(4)$
$F(AP_{10},CA_2)=Nod_{32}(5)$, $F(AP_9,CA_6)=Nod_{32}(5)$
$F(AP_9,CA_3)=Nod_{32}(6)$, $F(AP_{10},CA_7)=Nod_{32}(6)$
$F(AP_{10},CA_3)=Nod_{32}(7)$, $F(AP_9,CA_7)=Nod_{32}(6)$
(6) For SF=64: $P_{64}=16$
$F(AP_{11},CA_0)=Nod_{64}(0)$, $F(AP_{12},CA_8)=Nod_{64}(0)$
$F(AP_{12},CA_0)=Nod_{64}(1)$, $F(AP_{11},CA_8)=Nod_{64}(1)$
$F(AP_{11},CA_1)=Nod_{64}(2)$, $F(AP_{12},CA_9)=Nod_{64}(2)$
$F(AP_{12},CA_1)=Nod_{64}(3)$, $F(AP_{11},CA_9)=Nod_{64}(3)$
$F(AP_{11},CA_2)=Nod_{64}(4)$, $F(AP_{12},CA_{10})=Nod_{64}(4)$
$F(AP_{12},CA_2)=Nod_{64}(5)$, $F(AP_{11},CA_{10})=Nod_{64}(5)$
$F(AP_{11},CA_3)=Nod_{64}(6)$, $F(AP_{12},CA_{11})=Nod_{64}(6)$
$F(AP_{12},CA_3)=Nod_{64}(7)$, $F(AP_{11},CA_{11})=Nod_{64}(7)$
$F(AP_{11},CA_4)=Nod_{64}(8)$, $F(AP_{12},CA_{12})=Nod_{64}(8)$
$F(AP_{12},CA_4)=Nod_{64}(9)$, $F(AP_{11},CA_{12})=Nod_{64}(9)$
$F(AP_{11},CA_5)=Nod_{64}(10)$, $F(AP_{12},CA_{13})=Nod_{64}(10)$
$F(AP_{12},CA_5)=Nod_{64}(11)$, $F(AP_{11},CA_{13})=Nod_{64}(11)$
$F(AP_{11},CA_6)=Nod_{64}(12)$, $F(AP_{12},CA_{14})=Nod_{64}(12)$
$F(AP_{12},CA_6)=Nod_{64}(13)$, $F(AP_{11},CA_{14})=Nod_{64}(13)$
$F(AP_{11},CA_7)=Nod_{64}(14)$, $F(AP_{12},CA_{15})=Nod_{64}(14)$
$F(AP_{12},CA_7)=Nod_{64}(15)$, $F(AP_{11},CA_{15})=Nod_{64}(15)$
(7) For SF128: $P_{128}=32$
$F(AP_{13},CA_0)=Nod_{128}(0)$
$F(AP_{14},CA_0)=Nod_{128}(1)$
$F(AP_{13},CA_1)=Nod_{128}(2)$
$F(AP_{14},CA_1)=Nod_{128}(3)$
$F(AP_{13},CA_2)=Nod_{128}(4)$
$F(AP_{14},CA_2)=Nod_{128}(5)$
$F(AP_{13},CA_3)=Nod_{128}(6)$
$F(AP_{14},CA_3)=Nod_{128}(7)$
$F(AP_{13},CA_4)=Nod128(8)$
$F(AP_{14},CA_4)=Nod_{128}(9)$
$F(AP_{13},CA_5)=Nod_{128}(10)$
$F(AP_{14},CA_5)=Nod_{128}(11)$
$F(AP_{13},CA_6)=Nod_{128}(12)$
$F(AP_{14},CA_6)=Nod_{128}(13)$
$F(AP_{13},CA_7)=Nod_{128}(14)$
$F(AP_{14},CA_7)=Nod_{128}(15)$
$F(AP_{13},CA_8)=Nod_{128}(16)$
$F(AP_{14},CA_8)=Nod_{128}(17)$
$F(AP_{13},CA_9)=Nod_{128}(18)$
$F(AP_{14},CA_9)=Nod_{128}(19)$
$F(AP_{13},CA_{10})=Nod_{128}(20)$
$F(AP_{14},CA_{10})=Nod_{128}(21)$
$F(AP_{13},CA_{11})=Nod_{128}(22)$
$F(AP_{14},CA_{11})=Nod_{128}(23)$
$F(AP_{13},CA_{12})=Nod_{128}(24)$
$F(AP_{14},CA_{12})=Nod_{128}(25)$
$F(AP_{13},CA_{13})=Nod_{128}(26)$
$F(AP_{14},CA_{13})=Nod_{128}(27)$
$F(AP_{13},CA_{14})=Nod_{128}(28)$
$F(AP_{14},CA_{14})=Nod_{128}(29)$
$F(AP_{13},CA_{15})=Nod_{128}(30)$
$F(AP_{14},CA_{15})=Nod_{64}(31)$
(8) For SF=256: $P_{256}=32$
$F(AP_{15},CA_0)=Nod_{256}(0)$
$F(AP_{16},CA_0)=Nod_{256}(1)$
$F(AP_{15},CA_1)=Nod_{256}(2)$
$F(AP_{16},CA_1)=Nod_{256}(3)$
$F(AP_{15},CA_2)=Nod_{256}(4)$
$F(AP_{16},CA_2)=Nod_{256}(5)$
$F(AP_{15},CA_3)=Nod_{256}(6)$
$F(AP_{16},CA_3)=Nod_{256}(7)$
$F(AP_{15},CA_4)=Nod_{256}(8)$
$F(AP_{16},CA_4)=Nod_{256}(9)$
$F(AP_{15},CA_5)=Nod_{256}(10)$
$F(AP_{16},CA_5)=Nod_{256}(11)$
$F(AP_{15},CA_6)=Nod_{256}(12)$
$F(AP_{16},CA_6)=Nod_{256}(13)$
$F(AP_{15},CA_7)=Nod_{256}(14)$
$F(AP_{16},CA_7)=Nod_{256}(15)$
$F(AP_{15},CA_8)=Nod_{256}(16)$
$F(AP_{16},CA_8)=Nod_{256}(17)$
$F(AP_{15},CA_9)=Nod_{256}(18)$
$F(AP_{16},CA_9)=Nod_{256}(19)$
$F(AP_{15},CA_{10})=Nod_{256}(20)$
$F(AP_{16},CA_{10})=Nod_{256}(21)$
$F(AP_{15},CA_{11})=Nod_{256}(22)$
$F(AP_{16},CA_{11})=Nod_{256}(23)$
$F(AP_{15},CA_{12})=Nod_{256}(24)$
$F(AP_{16},CA_{12})=Nod_{256}(25)$
$F(AP_{15},CA_{13})=Nod_{256}(26)$ $F(AP_{16},CA_{13})=Nod_{256}(27)$
$F(AP_{15},CA_{14})=Nod_{256}(28)$
$F(AP_{16},CA_{14})=Nod_{256}(29)$
$F(AP_{15},CA_{15})=Nod_{256}(30)$
$F(AP_{16},CA_{15})=Nod_{256}(31)$ The foregoing can be expressed using Table 8 below, which shows a channel mapping relationship according to the embodiment of the present invention. The necessary scrambling code number and channelization code number can be determined as shown in Table 8. When the UE uses its unique scrambling code, the scrambling code number is coincident with the PCPCH number and the channelization codes are all 0.

$j^{th}$ message out of the CA signatures with a specific spreading factor. The F function indicates the uplink PCPCH number k that the UTRAN allocates to the UE using the AP signature number and the CA signature number at the specific spreading factor. $M_{SF}$ in the foregoing formula is different in meaning from $M_{SF}$ of FIG. 30A. $M_{SF}$ of FIG. 30A is a period needed when the CA message indicates the same PCPCH, whereas $M_{SF}$ in the foregoing formula indicates a smaller value out of the total number of the PCPCHs with a specific spreading factor and the total number of CA messages used at a specific spreading factor.

The foregoing formula cannot be used, when the CA signature number is less than $M_{SF}$ at the specific spreading

TABLE 8

| PCPCH Num | Scrambling Code Num | Channelization Code Num | SF = 4 | SF = 8 | SF = 16 | SF = 32 | SF = 64 | SF = 128 | SF = 256 |
|---|---|---|---|---|---|---|---|---|---|
| 0 | 1 | SF4-0 | $Nod_4(0)$ | $Nod_8(0)$ | $Nod_{16}(0)$ | $Nod_{32}(0)$ | $Nod_{64}(0)$ | $Nod_{128}(0)$ | $Nod_{256}(0)$ |
| 1 | 1 | SF8-4 | | $Nod_8(1)$ | $Nod_{16}(1)$ | $Nod_{32}(1)$ | $Nod_{64}(1)$ | $Nod_{128}(1)$ | $Nod_{256}(1)$ |
| 2 | 1 | SF16-12 | | | $Nod_{16}(2)$ | $Nod_{32}(2)$ | $Nod_{64}(2)$ | $Nod_{128}(2)$ | $Nod_{256}(2)$ |
| 3 | 1 | SF16-14 | | | $Nod_{16}(3)$ | $Nod_{32}(3)$ | $Nod_{64}(3)$ | $Nod_{128}(3)$ | $Nod_{256}(3)$ |
| 4 | 2 | SF32-0 | | | | $Nod_{32}(4)$ | $Nod_{64}(4)$ | $Nod_{128}(4)$ | $Nod_{256}(4)$ |
| 5 | 2 | SF32-2 | | | | $Nod_{32}(5)$ | $Nod_{64}(5)$ | $Nod_{128}(5)$ | $Nod_{256}(5)$ |
| 6 | 2 | SF32-4 | | | | $Nod_{32}(6)$ | $Nod_{64}(6)$ | $Nod_{128}(6)$ | $Nod_{256}(6)$ |
| 7 | 2 | SF32-6 | | | | $Nod_{32}(7)$ | $Nod_{64}(7)$ | $Nod_{128}(7)$ | $Nod_{256}(7)$ |
| 8 | 2 | SF64-16 | | | | | $Nod_{64}(8)$ | $Nod_{128}(8)$ | $Nod_{256}(8)$ |
| 9 | 2 | SF64-18 | | | | | $Nod_{64}(9)$ | $Nod_{128}(9)$ | $Nod_{256}(9)$ |
| 10 | 2 | SF64-20 | | | | | $Nod_{64}(10)$ | $Nod_{128}(10)$ | $Nod_{256}(10)$ |
| 11 | 2 | SF64-22 | | | | | $Nod_{64}(11)$ | $Nod_{128}(11)$ | $Nod_{256}(11)$ |
| 12 | 2 | SF64-24 | | | | | $Nod_{64}(12)$ | $Nod_{128}(12)$ | $Nod_{256}(12)$ |
| 13 | 2 | SF64-26 | | | | | $Nod_{64}(13)$ | $Nod_{128}(13)$ | $Nod_{256}(13)$ |
| 14 | 2 | SF64-28 | | | | | $Nod_{64}(14)$ | $Nod_{128}(14)$ | $Nod_{256}(14)$ |
| 15 | 2 | SF64-30 | | | | | $Nod_{64}(15)$ | $Nod_{128}(15)$ | $Nod_{256}(15)$ |
| 16 | 2 | SF128-64 | | | | | | $Nod_{128}(16)$ | $Nod_{256}(16)$ |
| 17 | 2 | SF128-66 | | | | | | $Nod_{128}(17)$ | $Nod_{256}(17)$ |
| 18 | 2 | SF128-68 | | | | | | $Nod_{128}(18)$ | $Nod_{256}(18)$ |
| 19 | 2 | SF128-70 | | | | | | $Nod_{128}(19)$ | $Nod_{256}(19)$ |
| 20 | 2 | SF128-72 | | | | | | $Nod_{128}(20)$ | $Nod_{256}(20)$ |
| 21 | 2 | SF128-74 | | | | | | $Nod_{128}(21)$ | $Nod_{256}(21)$ |
| 22 | 2 | SF128-76 | | | | | | $Nod_{128}(22)$ | $Nod_{256}(22)$ |
| 23 | 2 | SF128-78 | | | | | | $Nod_{128}(23)$ | $Nod_{256}(23)$ |
| 24 | 2 | SF128-80 | | | | | | $Nod_{128}(24)$ | $Nod_{256}(24)$ |
| 25 | 2 | SF128-82 | | | | | | $Nod_{128}(25)$ | $Nod_{256}(25)$ |
| 26 | 2 | SF128-84 | | | | | | $Nod_{128}(26)$ | $Nod_{256}(26)$ |
| 27 | 2 | SF128-86 | | | | | | $Nod_{128}(27)$ | $Nod_{256}(27)$ |
| 28 | 2 | SF128-88 | | | | | | $Nod_{128}(28)$ | $Nod_{256}(28)$ |
| 29 | 2 | SF128-90 | | | | | | $Nod_{128}(29)$ | $Nod_{256}(29)$ |
| 30 | 2 | SF128-92 | | | | | | $Nod_{128}(30)$ | $Nod_{256}(30)$ |
| 31 | 2 | SF128-94 | | | | | | $Nod_{128}(31)$ | $Nod_{256}(31)$ |

Table 8 shows an example in which several UEs can simultaneously use one scrambling code. However, when each UE uses a unique scrambling code, the scrambling code number in Table 8 is identical to the PCPCH number and the channelization code numbers are all 0 or 1 in an SF=4 node.

Reference numerals 3001 to 3006 of FIG. 30A are the steps of calculating the PCPCH number k with a specific spreading factor or a specific data rate. Unlike the method used in steps 3001 to 3006 of FIG. 30A, there is another method for determining the value k using the AP signature number i and the CA signature number j.

The second method determines the value k using the AP and the CA message in accordance with the following formula:

$$F(AP_{SF}(i),CA_{SF}(j))=Nod_{SF}(i*M_{SF}+j \bmod P_{SF}) \text{ for } j<M_{SF}$$

$$M_{SF} \min(P_{SF},T_{SF})$$

where $AP_{SF}(i)$ denotes an $i^{th}$ signature out of the AP signatures with a specific spreading factor and $CA_{SF}(j)$ denotes a factor. That is, if the total number of the CA signatures used at the specific spreading factor is smaller than the number of the PCPCHs, the CA signature number transmitted to the UE by the UTRAN should be set to a value smaller than the total number of the CA signatures. If, however, the total number of the PCPCHs used at the specific spreading factor is smaller than the number of the CA signatures, the CA signature number transmitted to the UE by the UTRAN should be set to a value smaller than the total number of the PCPCHs. The reason for defining the range as stated above is to allocate the PCPCHs by the number of the CA signatures, with the AP signature number fixed in the formula of the foregoing second method.

When the UTRAN allocates the PCPCHs to the UE using the multiple CA signatures, there is a case where the number of the PCPCHs with the specific spreading factor is larger than the number of the CA messages. In this case, the number of the CA signatures is insufficient, so that the UTRAN allocates the PCPCHs using the AP signatures transmitted from the UE.

In the foregoing formula, the value k of the uplink PCPCH number is determined by performing a modulo $P_{SF}$ operation on the CA signature number j and a value obtained by multiplying $M_{SF}$ by the AP signature number i. When the number of the CA signatures is smaller than the number of the PCPCHs after the modulo operation, the UTRAN can allocate the PCPCHs using even the AP, and when the number of the CA signatures is larger than the number of the PCPCHs, the UTRAN can use the CA signatures as many as it requires, through the modulo operation.

The major difference between the foregoing first and second methods for allocating the uplink PCPCH using the AP signature number i and the CA signature number j is as follows. The first method allocates the PCPCH using the AP signature number with the CA signature number fixed, while the second method allocates the PCPCH using the CA signature number with the AP signature number fixed.

The value k calculated by the formula used in the second method is used in step 3007 of FIG. 30B to calculate the spreading factor of the channelization code used for the data part of the uplink PCPCH. The calculation result of step 3007 and the value k determine the uplink scrambling code number to be used for the uplink PCPCH. The heading node number is determined in step 3009, and the channelization code number used for the uplink PCPCH is determined in step 3010. The steps 3007 to 3010 are equal to the first method for allocating the uplink PCPCH using the AP signature number and the CA signature number.

A third method for allocating the uplink PCPCH using the AP signature number i and the CA signature number j, uses the following formulas.

$$P_{SF} \leq T_{SF} \rightarrow F(AP_{SF}(i), CA_{SF}(j)) = Nod_{SF}(j)$$

$$P_{SF} > T_{SF} \rightarrow F(AP_{SF}(i), CA_{SF}(j)) = Nod_{SF}(\sigma^{(n)}(i) + (j-1) \\ *S_{SF} \bmod P_{SF}))$$

The third method compares the total number of the PCPCHs with a specific data rate or a specific spreading factor with the total number of the CA signatures and uses different formulas for determining the uplink PCPCH number k. A first one of the foregoing formulas of the third method is used when the number of the PCPCHs is smaller than or equal to the number of the CA signatures, and in this formula, the CA signature number j becomes the uplink PCPCH number k.

A second one of the foregoing formulas of the third method is used when the number of the uplink PCPCHs is larger than the number of the CA signatures. In this formula, the σ function is identical to the σ function calculated in step 3005 of FIG. 30A, and this σ function enables the CA message to sequentially indicate the PCPCHs. In this formula, performing a modulo $P_{SF}$ operation on the value determined by multiplying the total number of the AP signatures by the CA signature number subtracted by 1 is to prevent the uplink PCPCH number k from being higher than the total number of the uplink PCPCHs, set at a specific spreading factor.

The value k calculated in the foregoing formula is used in steps 3007 to, 3010 where the UTRAN allocates the uplink PCPCH to the UE.

Such an operation will be described with reference to FIGS. 18 and 19. A controller 1820 of the UE and a controller 1920 of the UTRAN can allocate the common packet channels having the structure of Table 7, by using either the CPCH allocating information of Table 7 included therein, or the calculating method stated above. It will be assumed in FIGS. 18 and 19 that the controllers 1820 and 1920 include the information of Table 7.

The controller 1820 of the UE determines, when communication over the CPCH is required, an AP signature corresponding to a desired data rate, and transmits the determined AP signature through a preamble generator 1831 which multiplies the determined AP signature by the scrambling code in a unit of a chip. Upon receipt of the AP preamble, the UTRAN examines the signature used for the AP preamble. If the received signature is not used by another UE, the UTRAN creates the AP_AICH using the received signature.

Otherwise, if the received signature is used by another UE, the UTRAN creates the AP_AICH using a signature value obtained by inverting the phase of the received signature. Upon receipt of an AP preamble for which a different signature is used by another UE, the UTRAN examines whether to use the received signature and creates the AP_AICH using the inversed or in-phase signature of the received signature. Thereafter, the UTRAN creates the AP_AICH by adding the generated AP_AICH signals and thus, can transmit the status of the signatures.

Upon receipt of an AP_AICH using the same signature as the transmitted signature, the UE creates the CD_P using any one of the signatures for detecting collision and transmits the created CD_P. Upon receipt of the signature included in the CD_P from the UE, the UTRAN transmits the CD_ICH using the same signature as the signature used for the CD_P. At the same time, if the UTRAN receives the CD_P through a preamble detector 1911, the controller 1920 of the UTRAN detects CPCH allocation request, creates a CA_ICH and transmits the CA_ICH to the UE.

As stated above, the CD_ICH and the CA_ICH can be transmitted either simultaneously or separately. Describing operation of generating the CA_ICH, the UTRAN determines an unused scrambling code out of the scrambling codes corresponding to the data rate requested by the UE according to the signatures requested in the AP by the UE, i.e., the designated CA_ICH signature of Table 7.

The determined CA_ICH signature is combined with the signature used for the AP preamble, creating information for allocating the CPCH. The controller 1920 of the UTRAN allocates the CPCH by combining the determined CA_ICH signature with the received AP signature. Further, the UTRAN receives the determined CA_ICH signature information through an AICH generator 1931 to generate the CA_ICH. The CA_ICH is transmitted to the UE through a frame formatter 1933. Upon receipt of the CA_ICH signature information, the UE allocates the common packet channel in the above manner, using the signature information of the transmitted AP and the received CA_ICH signature.

Figure 18:
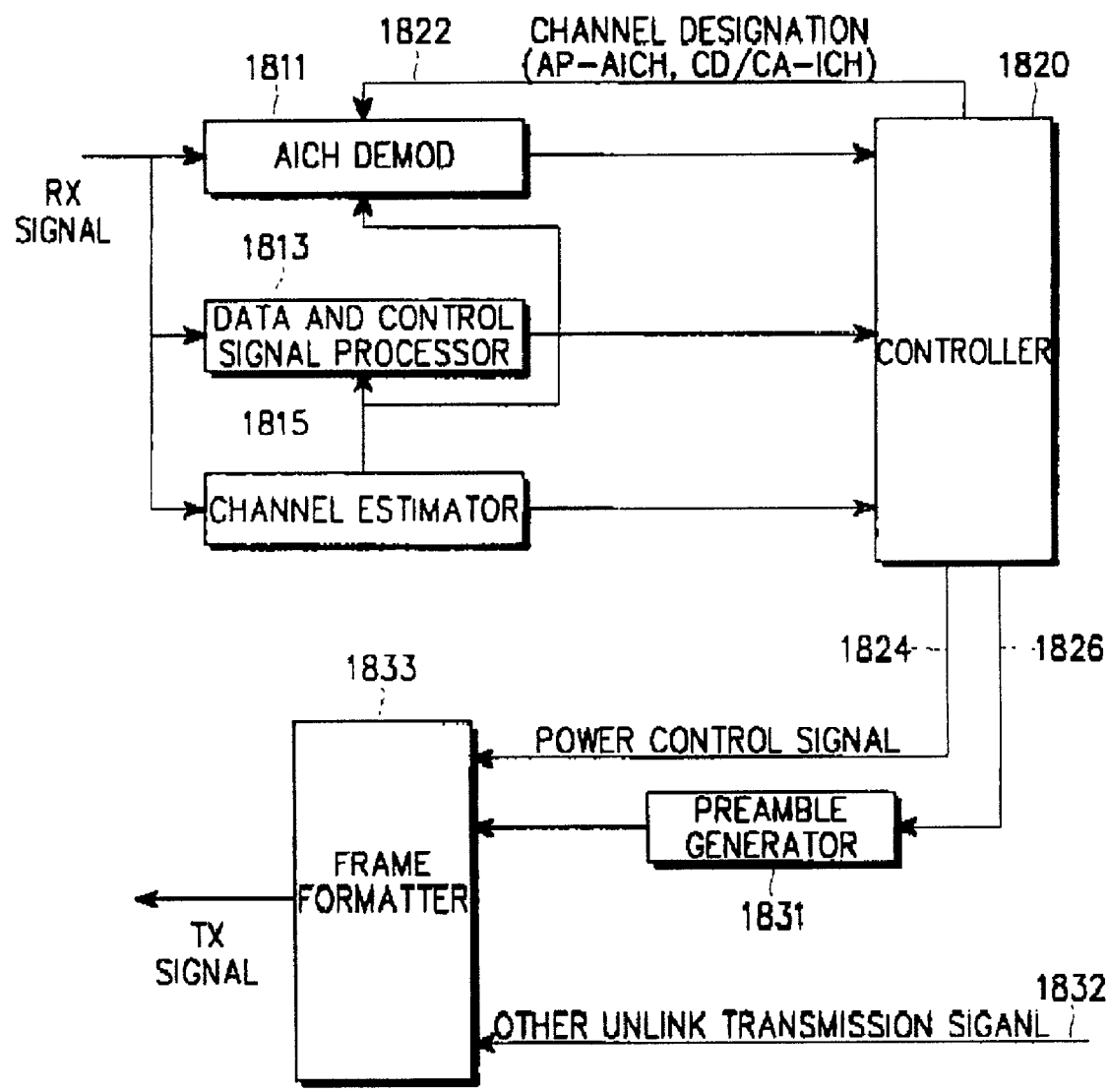
FIG. 18 is a diagram illustrating a transceiver of a UE according to an embodiment of the present invention.

FIG. 18 shows a structure of the UE for receiving AICH signals, transmitting preambles, and, in general, communicating a message over an uplink CPCH according to an embodiment of the present invention.

Referring to FIG. 18, an AICH demodulator 1811 demodulates AICH signals on the downlink transmitted from the AICH generator of the UTRAN, according to a control message 1822 for channel designation, provided from the controller 1820. The AICH demodulator 1811 may include an AP_AICH demodulator, a CD_ICH demodulator and a CA_ICH demodulator.

In this case, the controller 1820 designates the channels of the respective demodulators to enable them to receive AP_AICH, CD_ICH and CA_ICH, respectively, transmitted from the UTRAN. The AP_AICH, CD_ICH and CA_ICH can be implemented by either one demodulator or separate demodulators. In this case, the controller 1820 can designate the channels by allocating the slots to receive the time-divided AICHs.

A data and control signal processor 1813 designates a channel under the control of the controller 1820, and processes data or a control signal (including a power control command) received over the designated channel. A channel estimator 1815 estimates strength of a signal received from the UTRAN over the downlink, and controls phase compensation and gain of the data and control signal processor 1813 to assist demodulation.

The controller 1820 controls the overall operation of a downlink channel receiver and an uplink channel transmitter of the UE. In this embodiment of the present invention, the controller 1820 controls generation of the access preamble AP and the collision detection preamble CD_P while accessing the UTRAN using a preamble generating control signal 1826, controls transmission power of the up link using an uplink power control signal 1824, and processes the AICH signals transmitted from the UTRAN. That is, the controller 1820 controls the preamble generator 1831 to generate the access preamble AP and the collision detection preamble CD_P as shown by 331 of FIG. 3, and controls the AICH demodulator 1811 to process the AICH signals generated as shown by 301 of FIG. 3.

The preamble generator 1831, under the control of the controller 1820, generates the preambles AP and CD_P as shown by 331 of FIG. 3. A frame formatter 1833 formats frame data by receiving the preambles AP and CD_P output from the preamble generator 1831, and the packet data and pilot signals on the uplink. The frame formatter 1833 controls transmission power of the uplink according to the power control signal output from the controller 1820, and can transmit another uplink transmission signal 1832 such as a power control preamble and data after being allocated a CPCH from the UTRAN. In this case, it is also possible to transmit a power control command for controlling transmission power of the downlink over the uplink.

Figure 19:
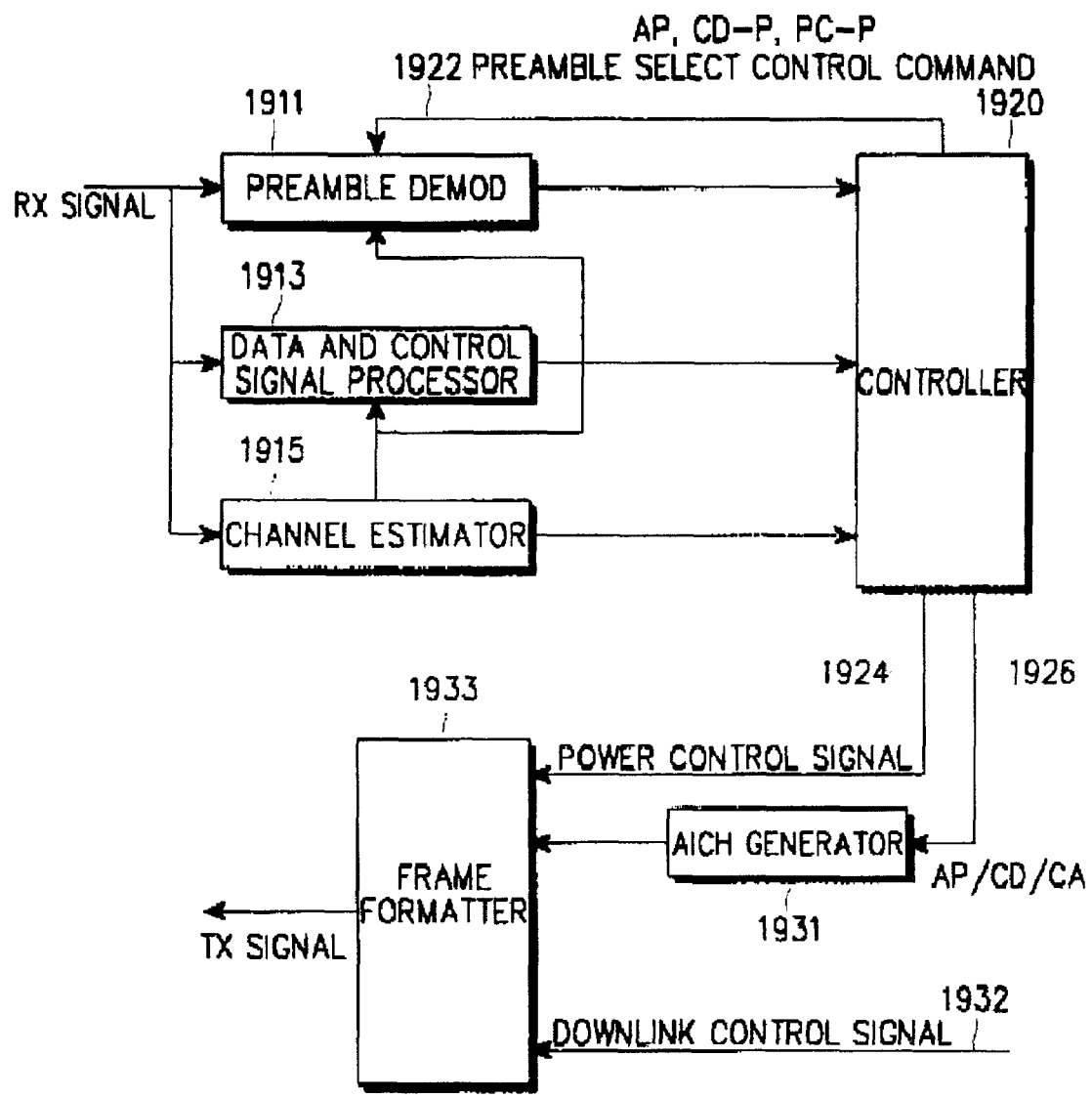
FIG. 19 is a diagram illustrating a transceiver of a UTRAN according to an embodiment of the present invention.

FIG. 19 shows a transceiver of the UTRAN for receiving preambles, transmitting AICH signals, and, in general, communicating a message over an uplink CPCH according to an embodiment of the present invention.

Referring to FIG. 19, an AICH detector 1911 detects the AP and the CD_P shown by 331 of FIG. 3, transmitted from the UE, and provides the detected AP and CD_P to the controller 1920. A data and control signal processor 1913 designates a channel under the control of the controller 1920, and processes data or a control signal received over the designated channel. A channel estimator 1915 estimates strength of a signal received from the UE over the downlink, and controls a gain of the data and control signal processor 1913.

The controller 1920 controls the overall operation of a downlink channel transmitter and an uplink channel receiver of the UTRAN. Based on a preamble select control command 1922, the controller 1920 controls detection of the access preamble AP and the collision detection preamble CD_P generated when the UE accesses the UTRAN, and controls generation of the AICH signals for responding to the AP and CD_P and commanding channel allocation. That is, the controller 1920 controls the AICH generator 1931 using an AICH generation control command 1926 to generate the AICH signals shown by 301 of FIG. 3, upon detecting the access preamble AP and the collision detection preamble CD_P received through the preamble detector 1911.

The AICH generator 1931, under the control of the controller 1920, generates AP_AICH, CD_ICH and CA_ICH which are response signals to the preamble signals. The AICH generator 1931 may include an AP_AICH generator, a CD_ICH generator and a CA_ICH generator. In this case, the controller 1920 designates the generators so as to generate the AP_AICH, CD_ICH and CA_ICH shown by 301 of FIG. 3, respectively. The AP_AICH, CD_ICH and CA_ICH can be generated by either one generator or by separate generators. In this case, the controller 1920 can allocate the time-divided slots of the AICH frame so as to transmit the AP_AICH, CD_ICH and CA_ICH.

A frame formatter 1933 formats frame data by receiving the AP_AICH, CD_ICH and CA_ICH output from the AICH generator 1931, and the downlink control signals, and controls transmission power of the uplink according to the power control command 1924 output from the controller 1920. Further, when a downlink power control command 1932 is received over the uplink, the frame formatter 1933 may control transmission power of an downlink channel for controlling the common packet channel according to the power control command.

The embodiment of the present invention includes one method in which the UTRAN performs outer-loop power control using the downlink dedicated, channel established in association with the uplink CPCH on a one-to-one basis, and another method in which the UTRAN transmits a CA confirmation message to the UE.

The downlink physical dedicated channel is comprised of a downlink physical dedicated control channel and a downlink physical dedicated data channel. The downlink physical dedicated control channel is comprised of a 4-bit pilot, a 2-bit uplink power control command and a 0-bit TFCI (Transport Format Combination Indicator), and the downlink physical dedicated data channel is comprised of 4-bit data. The downlink physical dedicated channel corresponding to the uplink CPCH is spread with a channelization code with a spreading factor 512 and transmitted to the UE.

In the method for performing outer-loop power control using the downlink physical dedicated channel, the UTRAN sends a bit pattern previously scheduled with the UE using the TFCI part or the pilot part of the downlink physical dedicated data channel and the downlink physical dedicated control channel, to enable the UE to measure a bit error rate (BER) of the downlink physical dedicated data channel and a BER of the downlink physical dedicated control channel and transmit the measured values to the UTRAN. The UTRAN then performs the outer-loop power control using the measured values.

The "bit pattern" previously scheduled between the UTRAN and the UE may be a channel allocation confirmation message, a specific bit pattern corresponding to the channel allocation confirmation message on a one-to-one basis, or a coded bit stream. The "channel allocation confirmation message" refers to a confirmation message for the CPCH allocated by the UTRAN at the request of the UE.

The channel allocation confirmation message transmitted to the UE by the UTRAN, the specific bit pattern corresponding to the channel allocation confirmation message on a one-to-one basis or the coded bit stream can be transmitted using a data part of the downlink physical dedicated data channel corresponding to the uplink CPCH and the TFCI part of the downlink physical dedicated control channel.

The transmission method using the data part of the downlink physical dedicated data channel is divided into one method for repeatedly transmitting the 4-bit or 3-bit channel allocation confirmation message for the 4-bit data part without encoding, and another method for transmitting the channel allocation confirmation after encoding. The 3-bit channel allocation confirmation message is used when allocating the uplink CPCH to the UE using 8 signatures. In this case, the downlink physical dedicated channel structure is comprised of a 4-bit data part, a 4-bit pilot part and a 2-bit power control command part.

The transmission method using the TFCI part of the downlink physical dedicated control channel allocates, to the TFCI part, 2 of the 4 bits assigned to the data part of the downlink physical dedicated channel, and transmits coded symbols to the 2-bit TFCI part. The 2-bit TFCI part is transmitted at one slot, and 30 bits are transmitted for one frame comprised of 15 slots. For a method for encoding the bits transmitted to the TFCI part, a (30,4) encoding method or a (30,3) encoding method is typically used, which can be implemented by using 0-fading in a (30,6) encoding method used to transmit the TFCI in the conventional W-CDMA standard. In this case, the downlink physical dedicated channel structure is comprised of a 2-bit data part, a 2-bit TFCI part, a 2-bit TPC and a 4-bit pilot.

In the foregoing two transmission methods, it is possible to measure the bit error rate for outer-loop power control using the downlink physical dedicated channel. In addition, it is possible to confirm channel allocation of the CPCH by transmitting the channel allocation confirmation message or the bit stream corresponding to the channel allocation confirmation message on a one-to-one basis, which is known to both the UTRAN and the UE, thereby ensuring stable CPCH channel allocation.

When transmitting one frame of the downlink dedicated channel, N slots of the frame can transmit a pattern previously scheduled between the UTRAN and the UE to measure the bit error rate, and the remaining (15−N) slots of the frame can be used to transmit the channel allocation confirmation message.

Alternatively, when transmitting the downlink dedicated channel, a specific frame can be used to transmit the pattern previously scheduled between the UTRAN and the UE to measure the bit error rate, and another specific frame can be used to transmit the channel allocation confirmation message. As an example of the foregoing transmission method, the first one or two frames of the downlink physical dedicated channel can be used to transmit the channel allocation message, and the succeeding frames can be used to transmit the bit pattern previously scheduled between the UTRAN and the UE to measure the bit error rate of the downlink dedicated channel.

Figure 33:
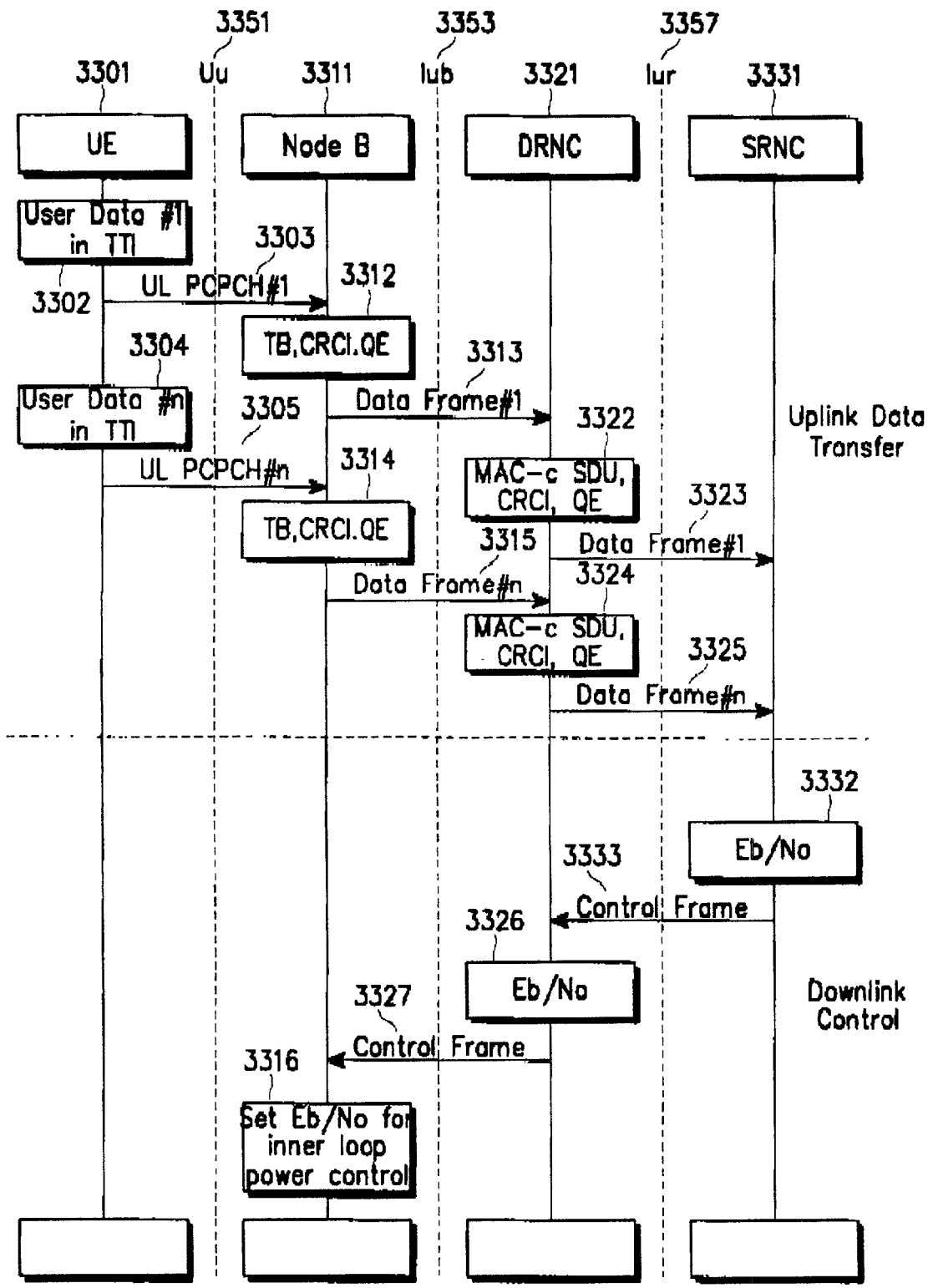
FIG. 33 is a diagram illustrating a signal and data flow between the UE and the UTRAN to perform uplink outer-loop power control according to an embodiment of the present invention.

FIG. 33 shows a signal and data flow between the UTRAN and the UE according to an embodiment of the present invention, proposed for uplink outer-loop power control of the outer-loop power control. Downlink outer-loop power control of the outer-loop power control can be performed in the same method as used for downlink outer-loop power control of the dedicated channel in the W-CDMA standard.

Before describing FIG. 33, the terminologies shown in FIG. 33 will first be defined. The terminologies defined below are commonly used in the W-CDMA standard.

Reference numeral 3301 of FIG. 33 indicates a UE (user equipment). Node B 3311, DRNC 3321 and SRNC 3331 are included in the UTRAN. The Node B corresponds to a base station in an asynchronous mobile communication system, and the DRNC (Drift Radio Network Controller) and the SRNC (Serving Radio Network Controller) constitute an RNC (Radio Network Controller) which, has the function of managing the Node B in the UTRAN.

The RNC has the function similar to that of the base station controller in the synchronous mobile communication system. The SRNC and the DRNC are distinguished from the standpoint of the UE. When the UE is connected to a specific Node B and connected to a core network of the asynchronous mobile communication network through the RNC that manages the Node B, the RNC serves as the SRNC. However, when the UE is connected to a specific Node B and connected to a core network of the asynchronous mobile communication network through an RNC that does not manage the Node B, the RNC serves as the DRNC.

In FIG. 33, Uu 3351 is an interface between the UE 3301 and the Node B 3311, Iub 3353 is an interface between the Node B 3311 and the DRNC 3321, and Iur 3357 is an interface between the DRNC 3321 and the SRNC 3331.

A signal and control flow between the UE and the UTRAN to perform outer-loop power control on the CPCH is as follows. Reference numerals 3302 and 3304 indicate user data #1 and user data #n transmitted over an uplink PCPCH 3303 and an uplink 3305 in a unit of TTI (Transmit Time Interval), respectively. For convenience of explanation, the user #1 and the user #n are assumed to be connected to the same Node B and RNC. The TTI is a time unit in which an upper layer of the physical layer transmits data, and the W-CDMA standard uses 10, 20, 40 and 80 ms for the TTI.

The user data 3302 and the user data 3304 transmitted over the PCPCHs 3303 and 3305 are received at the Node B 3311. The Node B 3311 performs CRC (Cyclic Redundancy Check) in a transmission block unit and indicates the CRC check results using CRCI (CRC indicator). The CRC and the CRCI are transmitted together with QE (Quality Estimate=bit error rate of the physical channel). Reference numerals 3312 and 3314 indicate messages added to the Iub CPCH data frames 3313 and 3315. The CRCI is added to every transmission block, and the CPCH data frames 3313 and 3315 transmitted over the Iub are transmitted to the RNC 3321 at every TTI.

For convenience of explanation, the RNC 3321 is assumed to be the DRNC. Upon receipt of the Iub CPCH data frames 3313 and 3315 transmitted from the Node B 3311, the RNC 3321 analyzes an SRNTI value by analyzing the header of the transmission block in the data frames. The SRNTI value is a temporary indicator given in the SRNC to identify the UE. When the UE accesses the SRNC, the SRNC assigns one SRNTI to the corresponding UE. The DRNC or the Node B can inform the SRNC, by using the SRNTI, from which UE the presently transmitted data has been received.

Upon detecting the SRNTI value, the DRNC 3321 assembles the header-removed MAC-c SDU (Service Data Unit), CRCI and QE and transmits the assembled data together with Iur data frames 3323 and 3325 to the SRNC 3331. The MAC-c is a MAC (Medium Access Control) message used for the common channel during medium access control. The SRNC 3331 obtains information necessary for outer-loop power control of the CPCH by analyzing the Iur data frames 3323 and 3325 transmitted from the DRNC 3321. The "necessary information" may be QE of the uplink PCPCH or CRCI. It is possible to calculate Eb/No 3332 using the CRCI value.

The SRNC 3331 transmits the Eb/No 3332 for outer-loop power control and the Iur control frame 3333 to DRNC 3321. At this point, the SRNC 3331 fills the SRNTI value in a payload of the Iur control frame before transmission, in order to inform the DRNC 3321 of the corresponding UE used for outer-loop power control.

Upon receipt of the Iur control frame 3333, the DRNC 3321 analyzes the SRNTI filled in the payload of the Iur control frame 3333 and transmits the analyzed value to the Node B 3311 to which the corresponding UE belongs, through a Iub control frame 3327 in which Eb/No 3326 is included. In this case, the Node B 3311 may add the SRNTI value or the PCPCH indicator to the Iub control frame 3327, providing for the case where the Node B 3311 cannot distinguish to which UE the received Iub control frame 3327 corresponds.

Upon receipt of the Iub control frame 3327, the Node B 3311 sets the Eb/No value 3316 transmitted from the SRNC as a threshold value for inner-loop power control, and performs inner-loop power control. The "inner-loop power control" refers to closed-loop power control performed only between the UE and the Node B.

Figure 34:
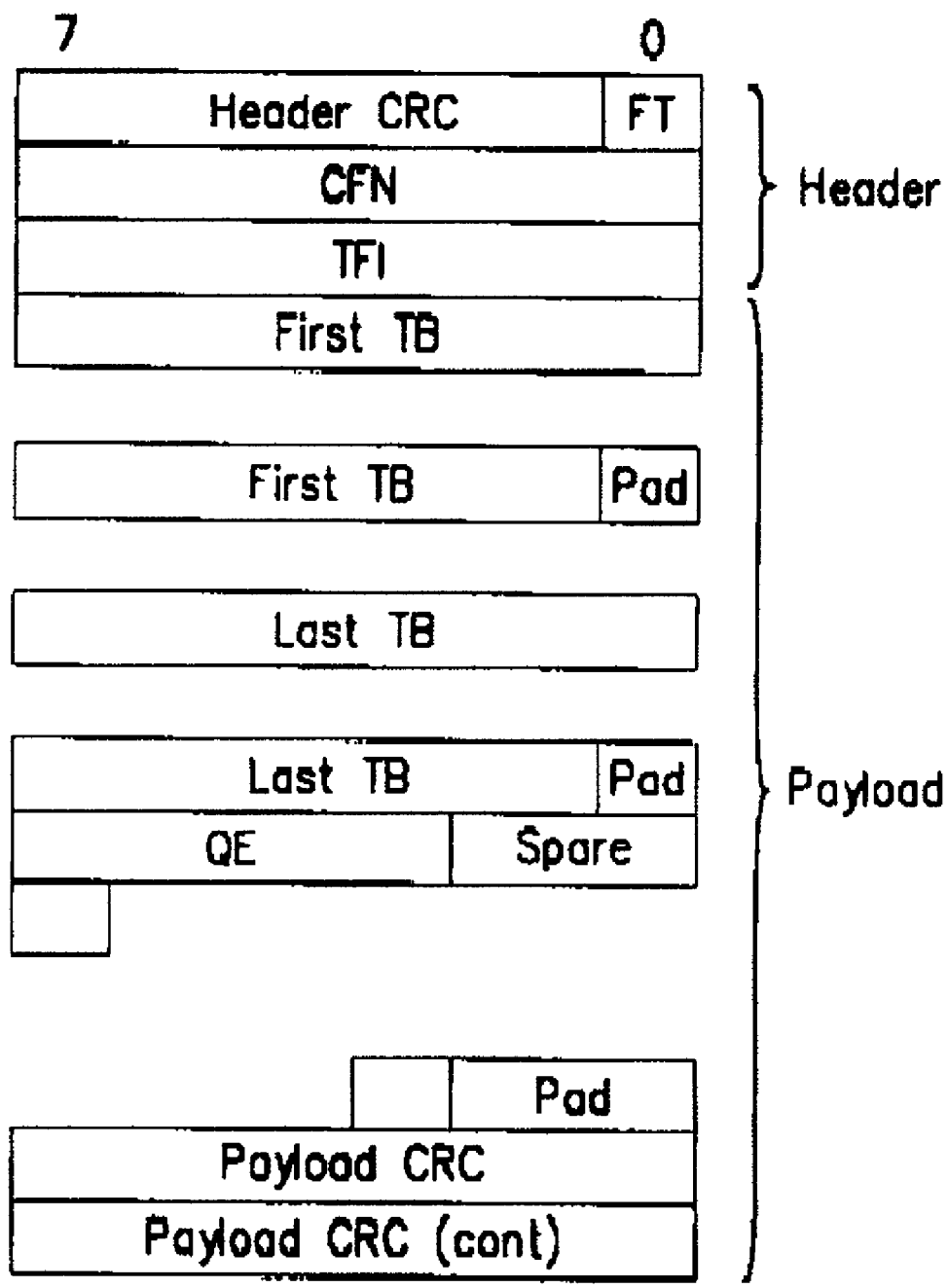
FIG. 34 is a diagram illustrating a structure of a Iub data frame for uplink outer-loop power control according to an embodiment of the present invention.

FIG. 34 shows a structure of the Iub data frames 3313 and 3315 of FIG. 33, wherein QE is the message added for outer-loop power control of the uplink PCPCH according to an embodiment of the present invention.

Figure 35:
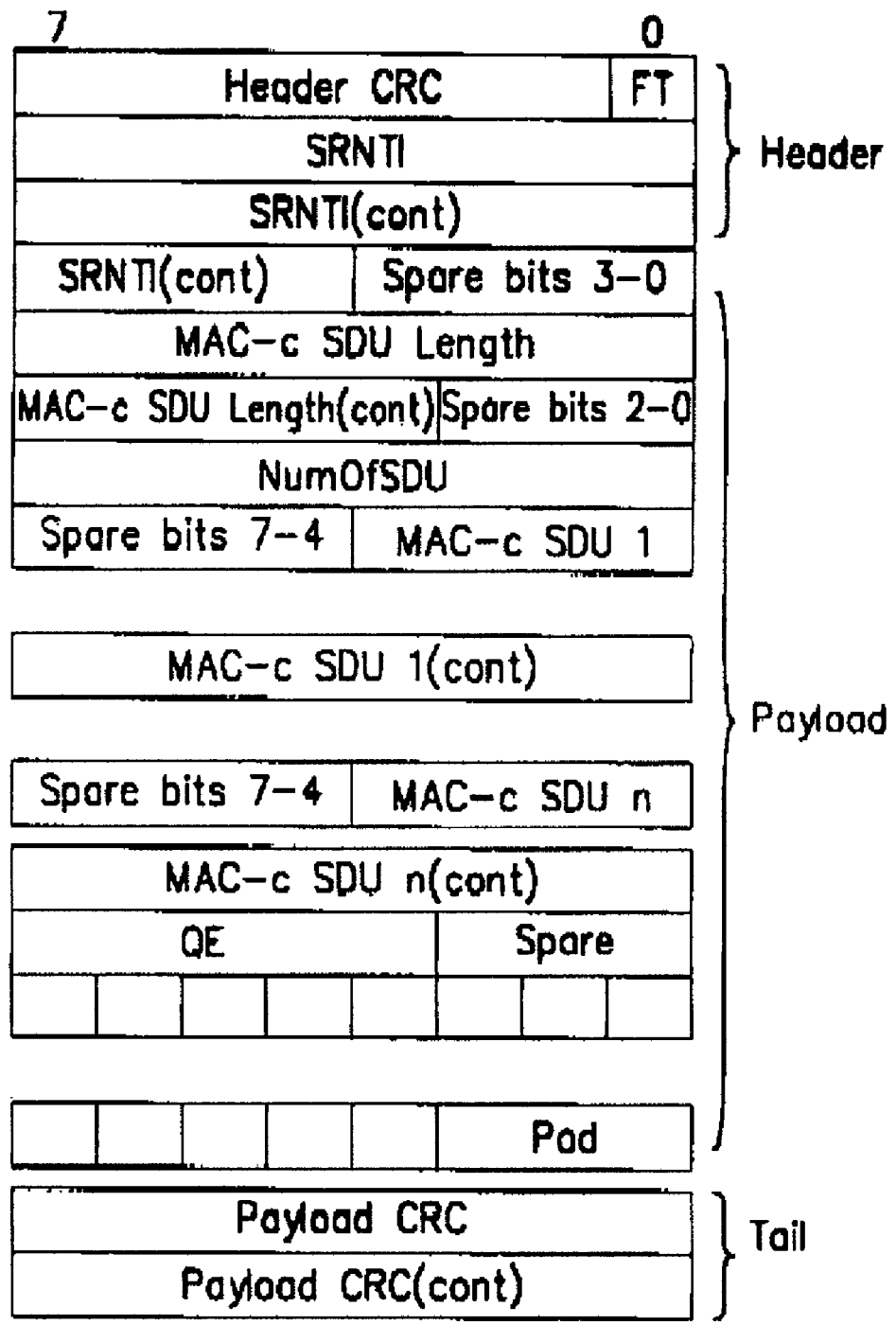
FIG. 35 is a diagram illustrating a structure of Iur data frame for uplink outer-loop power control according to an embodiment of the present invention.

FIG. 35 shows a structure of the Iur data frames 3323 and 3325 of FIG. 33, wherein QE and CRCI are the messages added for outer-loop power control of the uplink PCPCH according to an embodiment of the present invention.

Figure 36:
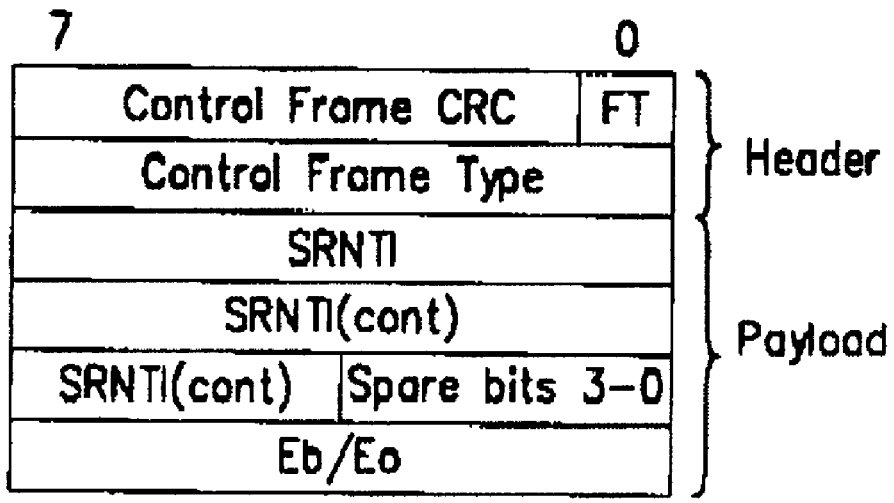
FIG. 36 is a diagram illustrating a structure of a Iur control frame for uplink outer-loop power control according to an embodiment of the present invention.

FIG. 36 shows a structure of the control frame 3333 of FIG. 33, wherein "Payload" is the message added for outer-loop power control of the uplink PCPCH according to an embodiment of the present invention.

Figure 37:
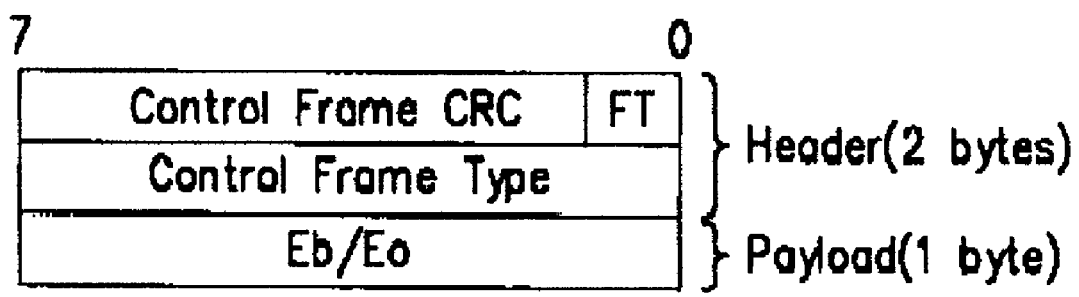
FIG. 37 is a diagram illustrating a structure of a Iub control frame for uplink outer-loop power control according to an embodiment of the present invention.

FIG. 37 shows a structure of the control frame 3327 of FIG. 33, wherein "Payload" is the message added for outer-loop power control of the uplink PCPCH according to an embodiment of the present invention.

Figure 20:
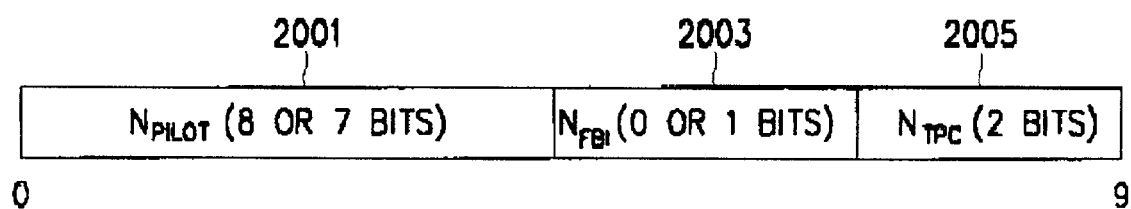
FIG. 20 is a diagram illustrating a slot structure of a power control preamble (PC_P) according to an embodiment of the present invention.

FIG. 20 shows a slot structure of a power control preamble PC_P transmitted from the UE to the UTRAN. The PC_P has a length of 0 or 8 slots. The length of the PC_P becomes 0 slots, when the radio environment between the UTRAN and the UE is so good that it is not necessary to set initial power of the uplink CPCH or when the system does not use the PC_P. Otherwise, the length of the PC_P becomes 8 slots.

Shown in FIG. 20 is the fundamental structure of the PC_P defined in the W-CDMA standard. The PC_P has two slot types, and includes 10 bits per slot. Reference numeral 2001 indicates the pilot field, which is comprised of 8 or 7 bits according to the slot type of the PC_P. Reference numeral 2003 indicates a feedback information field used when there is feedback information to be transmitted to the UTRAN, and this field has a length of 0 or 1 bit. Reference numeral 2005 indicates a field for transmitting a power control command. This field is used when the UE controls transmission power of the downlink, and has a length of 2 bits.

The UTRAN measures transmission power of the UE using the pilot field 2001 and then transmits a power control command over the downlink dedicated channel established when the uplink CPCH is established, to control initial transmission power of the uplink CPCH. In the power control process, the UTRAN transmits a power-up command when it is determined that the transmission power of the UE is low, and transmits a power-down command when it is determined that the transmission power is high.

The preferred embodiment of the present invention proposes a method for using the PC_P for the purpose of confirming CPCH establishment in addition to the purpose of power control. A reason for confirming CPCH establishment is as follows. When the UTRAN has transmitted a channel allocation message to the UE, the channel allocation message may have an error due to a bad radio environment or a bad multi-path environment between the UTRAN and the UE.

In this case, the UE will receive the channel allocation message with errors and wrongly use a CPCH which was not designated by the UTRAN, thus causing a collision on the uplink with another UE using the corresponding CPCH. Such a collision may occur in the prior art even when the right of using the channel is required, if the UE misconceives NAK transmitted from the UTRAN for ACK. Therefore, one preferred embodiment of the present invention proposes a method in which the UE requests the UTRAN to confirm the channel message again, thereby increasing the reliability in using the uplink CPCH.

The foregoing method in which the UE requests the UTRAN to confirm the channel allocation message or channel request message, using the PC_P, does not affect the PC_P's original purpose of measuring receiving power of the uplink for power control. The pilot field of the PC_P is information known to the UTRAN, and a value of the channel allocation confirmation message transmitted from the UE to the UTRAN is also known to the UTRAN, so that the UTRAN has no difficulty in measuring the receiving power of the uplink. Therefore, the UTRAN can confirm whether the UE has normally received the channel allocation message, by examining the receiving status of the $PC_{13}$ P.

In this embodiment of the present invention, if the pilot bits known to the UTRAN are not demodulated in the process of measuring the receiving power of the uplink, the UTRAN determines that a channel allocation message or a channel using ACK message transmitted to the UE has an error, and continuously transmits a power-down command for decreasing transmission power of the uplink over a downlink which corresponds to the uplink CPCH on a one-to-one basis. Since the W-CDMA standard specifies that the power-down command should be transmitted 16 times for one 10 ms frame, the transmission power decreases by at least 15 dB within 10 ms from the time point when the error has occurred, not having so serious influence over the other UEs.

Figure 21:
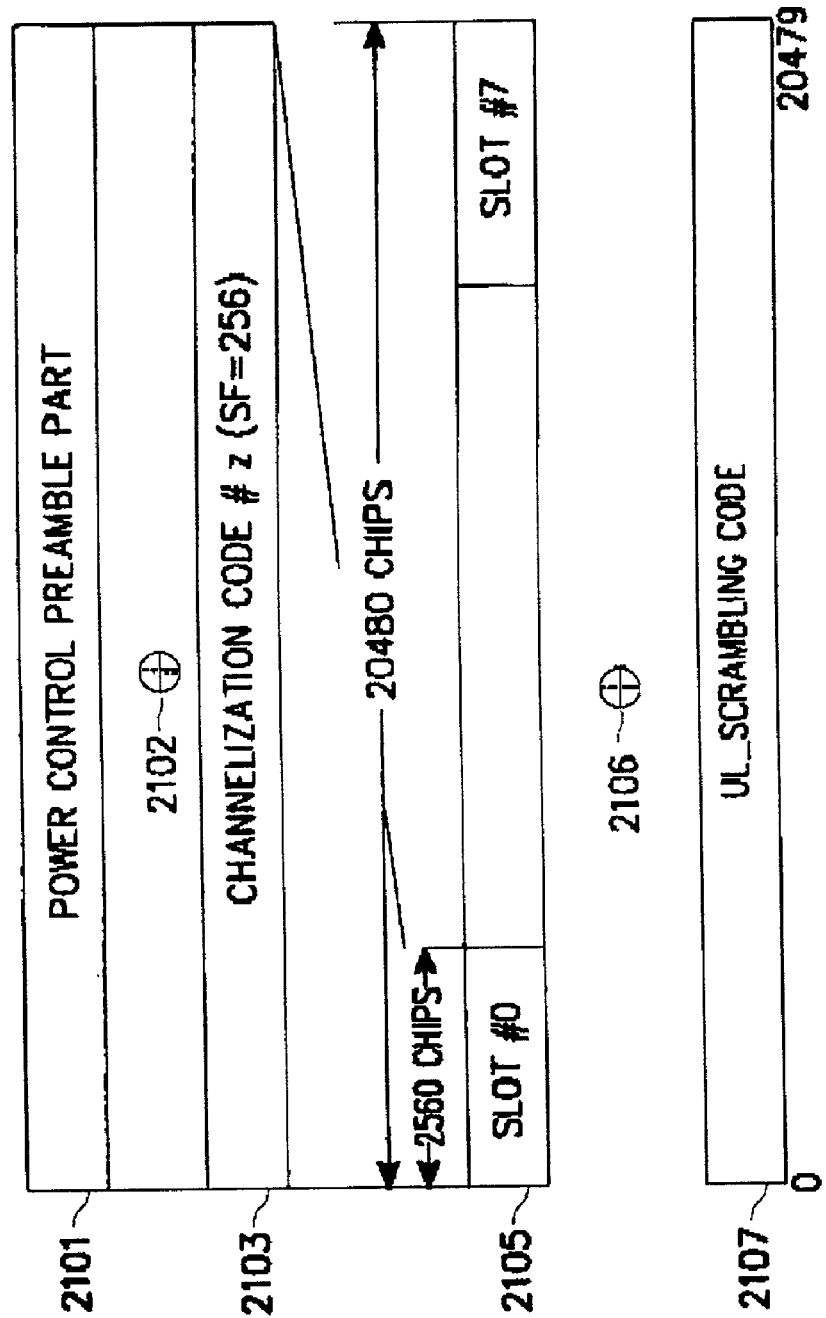
FIG. 21 is a diagram illustrating a structure of the PC_P shown in FIG. 20.

FIG. 21 shows a structure of the PC_P of FIG. 20. Reference numeral 2101 indicates the PC_P and has the same structure as shown in FIG. 20. Reference numeral 2103 indicates a channelization code, which is multiplied by the CP_P by a multiplier 2102 to channel spread the PC_P. The channelization code 2103 has a spreading factor of 256 chips, and is set according to a rule determined by a CA message transmitted from the UTRAN. Reference numeral 2105 indicates a PC_P frame, which is comprised of 8 slots, each slot having a length of 2560 chips. Reference numeral 2107 indicates an uplink scrambling code used for the PC_P. A multiplier 2106 spreads the PC_P frame 2105 with the uplink scrambling code 2107. The spread PC_P frame is transmitted to the UTRAN.

FIG. 22A shows a method for transmitting a channel allocation confirmation message or a channel request confirmation message from the UE to the UTRAN by using the PC_P. In FIG. 22A, PC_P 2201, channelization code 2203, PC_P frame 2205 and uplink scrambling code 2207 have the same structure and operation as the PC_P 2101, channelization code 2103, PC_P frame 2105 and uplink scrambling code 2107, respectively, of FIG. 21. Further, multipliers 2202 and 2206 also have the same operation as the multipliers 2102 and 2106 of FIG. 21, respectively.

To transmit the channel allocation confirmation message or channel request confirmation message to the UTRAN using the PC_P, a channel number or signature number of the CA_ICH received from the UTRAN is repeatedly multiplied by the pilot field of the PC_P 2201 before transmission. Reference numeral 2209 of FIG. 22A indicates a CPCH confirmation message which includes the signature number used in the CA_ICH transmitted from the UTRAN to the UE or the CPCH channel number.

Here, the signature number is used for the CPCH confirmation message, when the signatures used for the CA_ICH correspond to the CPCHs on a one-to-one basis, and the CPCH channel number is used for the CPCH confirmation message, when a plurality of signatures correspond to one CPCH. The CPCH confirmation message 2209 is repeatedly multiplied by the pilot field of the PC_P by a multiplier 2208 before transmission.

FIG. 22B shows structures of the uplink scrambling codes used by a plurality of UEs in the UTRAN for the AP, CD_P, PC_P, and CPCH message part when transmitting the PC_P by using the method of FIG. 22A. Reference numeral 2221 indicates a scrambling code used for the AP, which is known to the UEs by the UTRAN over the broadcasting channel or which is equally used for the AP part in the whole system. The scrambling code 2223 used for the CD_P is a scrambling code which has the same initial value as the scrambling code 2221 for the AP but has a different start point. However, when the signature group used for the AP is different from the signature group used for the CP_P, the same scrambling code as the scrambling code 2221 for the AP is used for the scrambling code 2223.

Reference numeral 2225 indicates a scrambling code used for the PC_P, which is known to the UE by the UTRAN or which is equally used for the PC_P part in the whole system. The scrambling code used for the PC_P part can be either identical to or different from the scrambling code used for the AP and CP_P part. Reference numerals 2227, 2237 and 2247 indicate scrambling codes used when UE#1, UE#2 and UE#K, respectively, in the UTRAN transmit the CPCH message parts using CPCHs.

The scrambling codes 2227, 2237 and 2247 can be set according to the APs transmitted from the UEs or the CA_ICH messages transmitted from the UTRAN. Here, 'K' indicates the number of the UEs which can simultaneously use CPCHs, or the number of the CPCHs in the UTRAN.

With continued reference to FIG. 22B, when the uplink scrambling code used by the UTRAN for the CPCH is not allocated to every CPCH or every UE, the number of the scrambling codes used for the message part may be smaller, than the number of the UEs which can simultaneously use the CPCHs in the UTRAN or the number of the CPCHs in the UTRAN.

Figure 23:
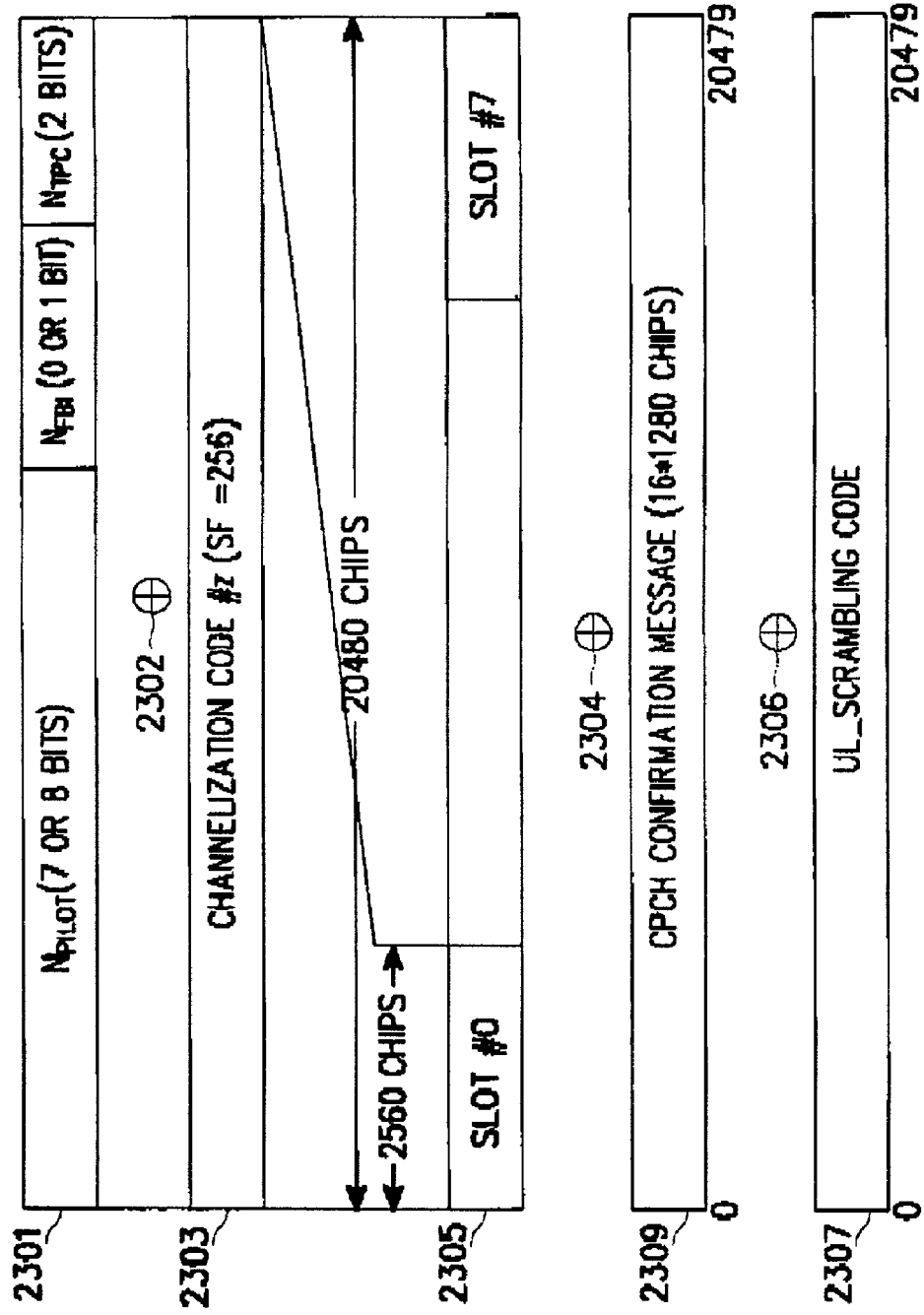
FIG. 23 is a diagram illustrating a method for transmitting a channel allocation confirmation message or a channel request confirmation message from the UE to the UTRAN using the PC_P according to another embodiment of the present invention.

FIG. 23 shows another method for transmitting the channel allocation confirmation message or channel request confirmation message transmitted from the UE to the UTRAN using the PC_P. In FIG. 23, PC_P 2301, channelization code 2303, PC_P frame 2305 and uplink scrambling code 2307 have the same structure and operation as the PC_P 2101, channelization code 2103, PC_P frame 2105 and uplink scrambling code 2107, respectively, of FIG. 21. Further, multipliers 2302 and 2306 also have the same operation as the multipliers 2102 and 2106 of FIG. 21, respectively.

To transmit the channel allocation confirmation message or channel request confirmation message to the UTRAN using the PC_P, the PC_P frame 2305 is multiplied by the CPCH confirmation message 2309 in a chip unit and then spread with a scrambling code 2307. Here, it is possible to obtain the same result, even though the sequence of multiplying the CPCH confirmation message and the scrambling code by the PC_P frame is reversed. The CPCH confirmation message includes the signature number used in the CA_ICH transmitted from the UTRAN to the UE or the CPCH channel number.

Here, the signature number is used for the CPCH confirmation message, when the signatures used for the CA_ICH correspond to the CPCHs on a one-to-one basis, and the CPCH channel number is used for the CPCH confirmation message, when a plurality of signatures correspond to one CPCH. The environments in which the UEs in the UTRAN use the scrambling codes in the method of FIG. 23 are equal to the environments given in the method of FIGS. 22A and 22B.

Figure 24A:
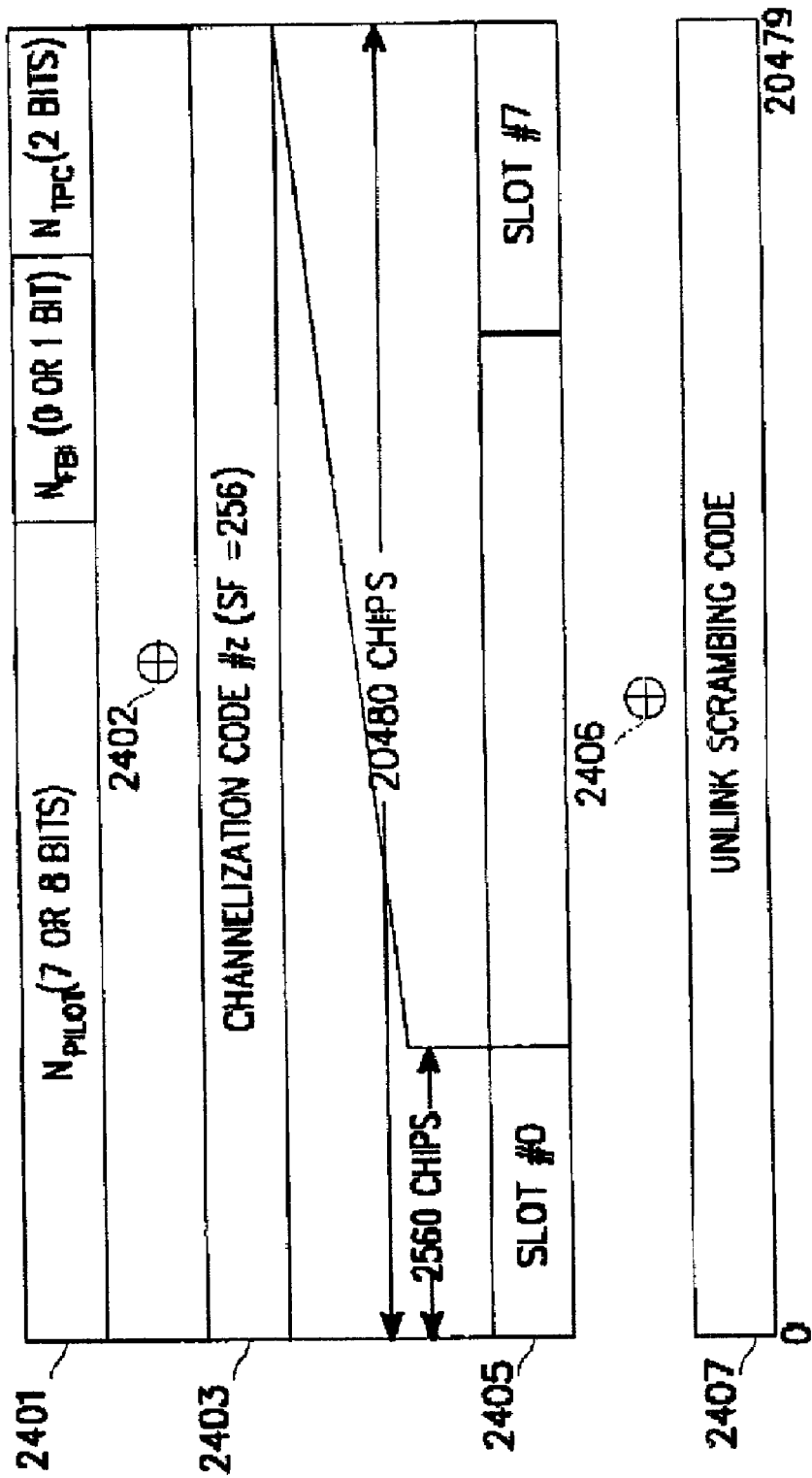
FIG. 24A is a diagram illustrating a method for transmitting a channel allocation confirmation message or a channel request confirmation message from the UE to the UTRAN using the PC_P according to an embodiment of the present invention.

FIG. 24A shows another method for transmitting the channel allocation confirmation message or channel request confirmation message from the UE to the UTRAN using the PC_P. In FIG. 24A, PC_P 2401, PC_P frame 2405 and uplink scrambling code 2407 have the same structure and operation as the PC_P 2101, PC_P frame 2105 and uplink scrambling code 2107, respectively, of FIG. 21. Further, multipliers 2402 and 2306 also have the same operation as the multipliers 2102 and 2106 of FIG. 21, respectively.

To transmit the channel allocation confirmation message or channel request confirmation message to the UTRAN using the PC_P, a channelization code 2403 is associated with the CA_ICH signature received at the UE from the UTRAN or the CPCH channel number on a one-to-one basis to channel spread the PC_P using the channelization code and transmit the channel-spread PC_P to the UTRAN. The environments in which the UEs in the UTRAN use the scrambling codes in the method of FIG. 24A are equal to the environments given in the method of FIG. 22B.

FIG. 24B shows an example of a PC_P channel code tree which corresponds to the CA_ICH signatures or the CPCH channel numbers on a one-to-one basis. This channel code tree is called an OVSF (Orthogonal Variable Spreading Factor) code tree in the W-CDMA standard, and the OVSF code tree defines orthogonal codes according to the spreading factors.

In the OVSF code tree 2431 of FIG. 24B, a channelization code 2433 used as a PC_P channelization code has a fixed spreading factor of 256, and there are several possible mapping rules for associating the PC_P channelization code with the CA_ICH signatures or the CPCH channel numbers on a one-to-one basis. As an example of the mapping rule, the lowest one of the channelization codes having the spreading factor 256 can be associated with the CA_ICH signature or CPCH channel number on a one-to-one basis; and the highest channelization code can also be associated with the CA_ICH signature or the CPCH channel number on a one-to-one basis, by changing the channelization code or skipping several channelization codes. In FIG. 24B, 'n' may be the number of the CA_ICH signatures or the number of the CPCH channels.

Figure 25A:
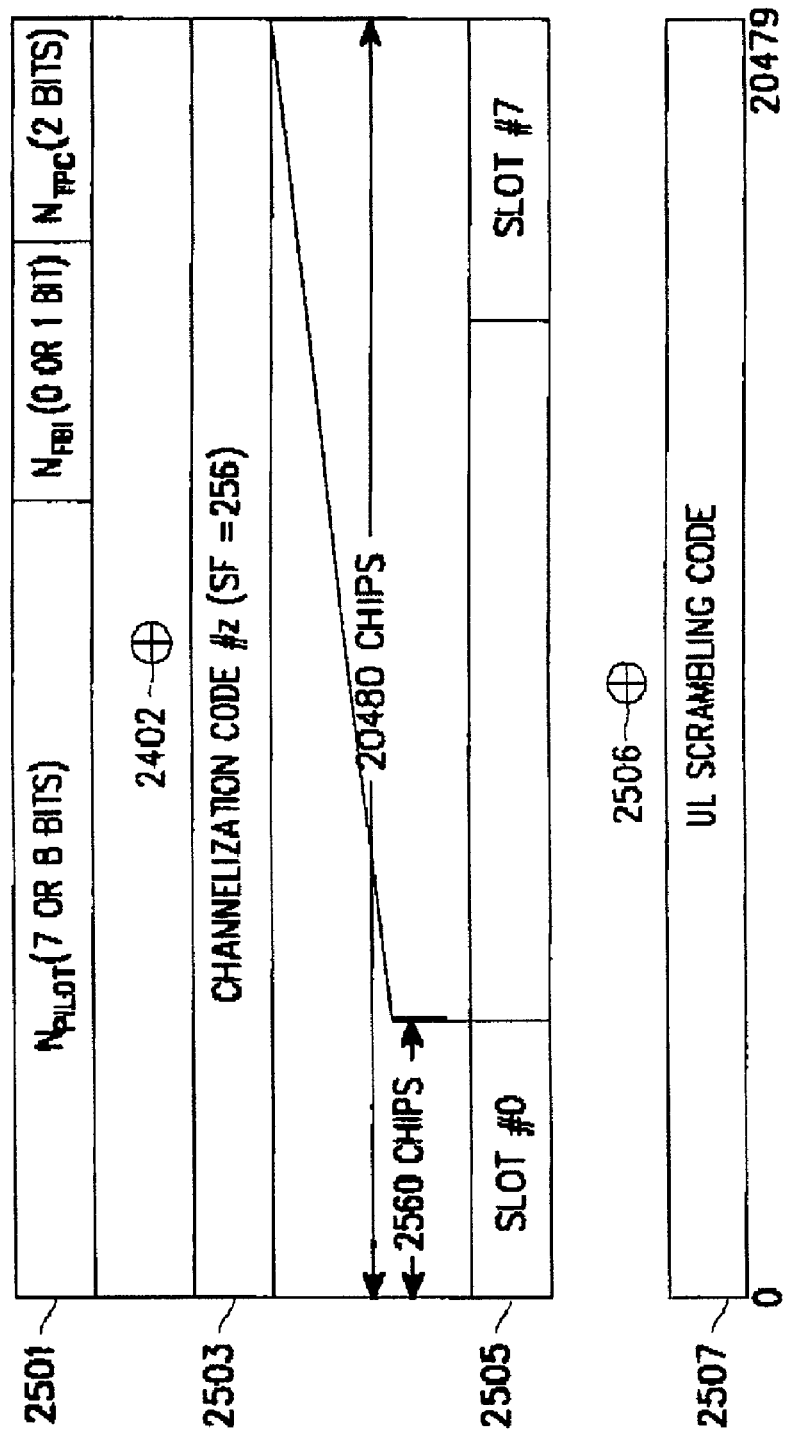
FIG. 25A is a diagram illustrating a method for transmitting a channel allocation confirmation message or a channel request confirmation message from the UE to the UTRAN using the PC_P according to another embodiment of the present invention.

FIG. 25A shows another method for transmitting a channel allocation confirmation message or a channel request confirmation message transmitted from the UE to the UTRAN using the PC_P. In FIG. 25A, PC_P 2501, channelization code 2503 and PC_P frame 2505 have the same structure and operation as the PC_P 2101, channelization code 2103 and PC_P frame 2105, respectively, of FIG. 21. Further, multipliers 2502 and 2506 also have the same operation as the multipliers 2102 and 2106 of FIG. 21, respectively.

To transmit the channel allocation confirmation message or channel request confirmation message to the UTRAN using the PC_P, an uplink scrambling code 2507 is associated with the channel number of signature number of the CA_ICH received from the UTRAN on a one-to-one basis to channel spread the PC_P frame 2505 with the uplink scrambling code before transmission. Receiving the PC_P frame transmitted from the UE, the UTRAN determines whether the scrambling code used for the PC_P frame corresponds to the signature or CPCH channel number transmitted over the CA_ICH on a one-to-one basis. If the scrambling code does not correspond to the signature or CPCH channel number, the UTRAN immediately transmits a power-down command for decreasing transmission power of the uplink to the power control command field of the downlink dedicated channel corresponding to the uplink CPCH on a one-to-one basis.

FIG. 25B shows the structures of uplink scrambling codes used for the AP, CD_P, PC_P and CPCH message part by a plurality of UEs in the UTRAN when transmitting the PC_P using the method of FIG. 25A. Reference numeral 2521 of FIG. 25B indicates a scrambling code used for the AP, which is known to the UEs by the UTRAN over the broadcasting channel or which is equally used for the AP part in the whole system. Scrambling code 2523 used for the CD_P has the same initial value as scrambling code 2521 for the AP but has a different starting point.

However, when the signature group used for the AP is different from the signature group used for the CP_P, the same scrambling code as the scrambling code 2521 for the PA is used for the scrambling code 2523. Reference numerals 2525, 2535 and 2545 indicate scrambling codes used when UE#1, UE#2 and UE#K, respectively, transmit the PC_P. These scrambling codes correspond to the signature or CPCH channel number of the CA_ICH received at the UE from the UTRAN on a one-to-one basis.

With regard to the scrambling codes, the UE can store the scrambling code used for the PC_P or the scrambling code can be known to the UE by the UTRAN. The PC_P scrambling codes 2525, 2535 and 2545 may be identical to the scrambling codes 2527, 2537 and 2547 used for the CPCH message part, or may be scrambling codes corresponding to them on a one-to-one basis. In FIG. 25B, 'k' indicates the number of CPCHs in the UTRAN.

Figure 26A:
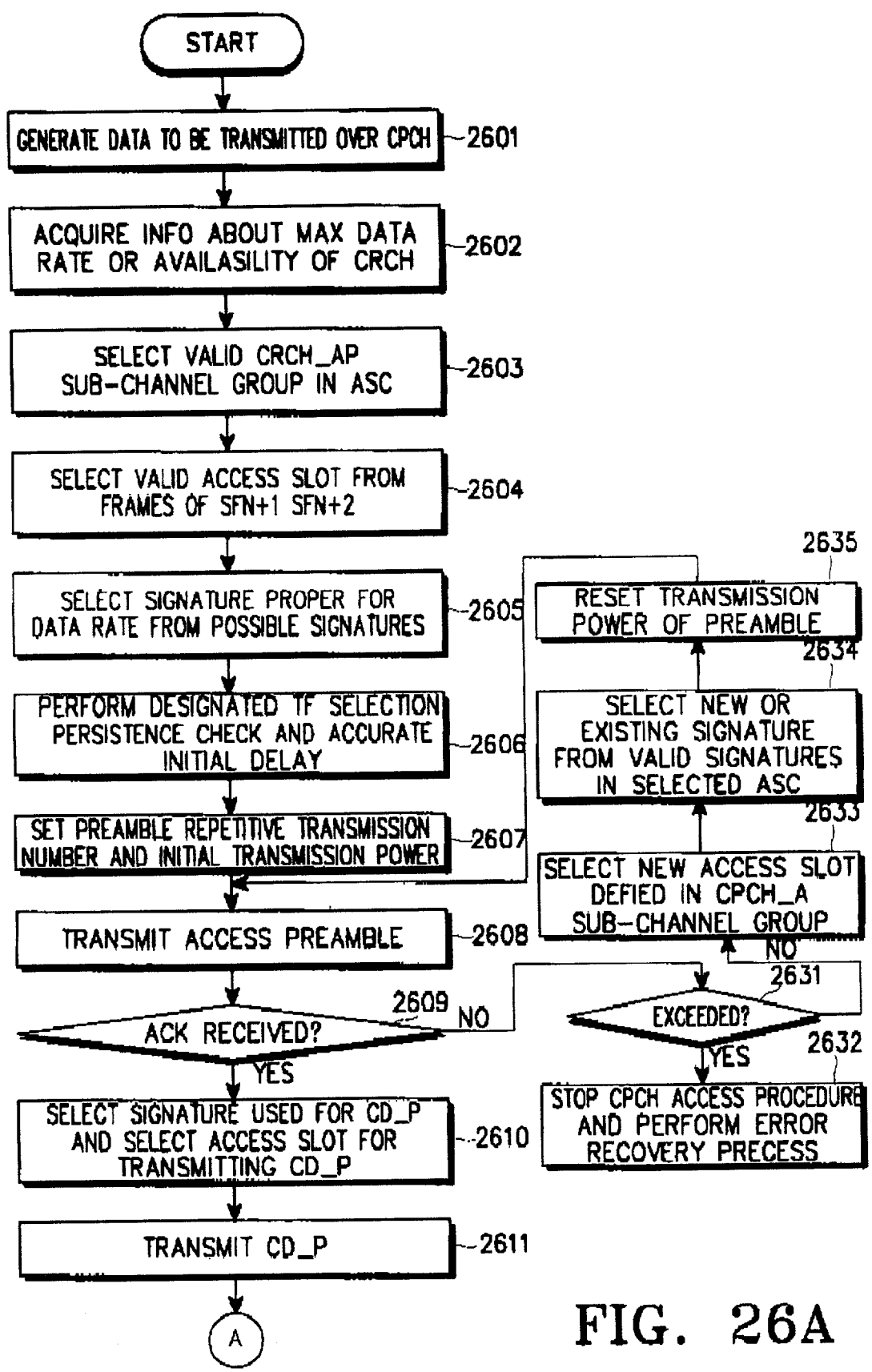
FIGS. 26A to 26C are flow charts illustrating a procedure for allocating a common packet channel in the UE according to an embodiment of the present invention.
Figure 26B:
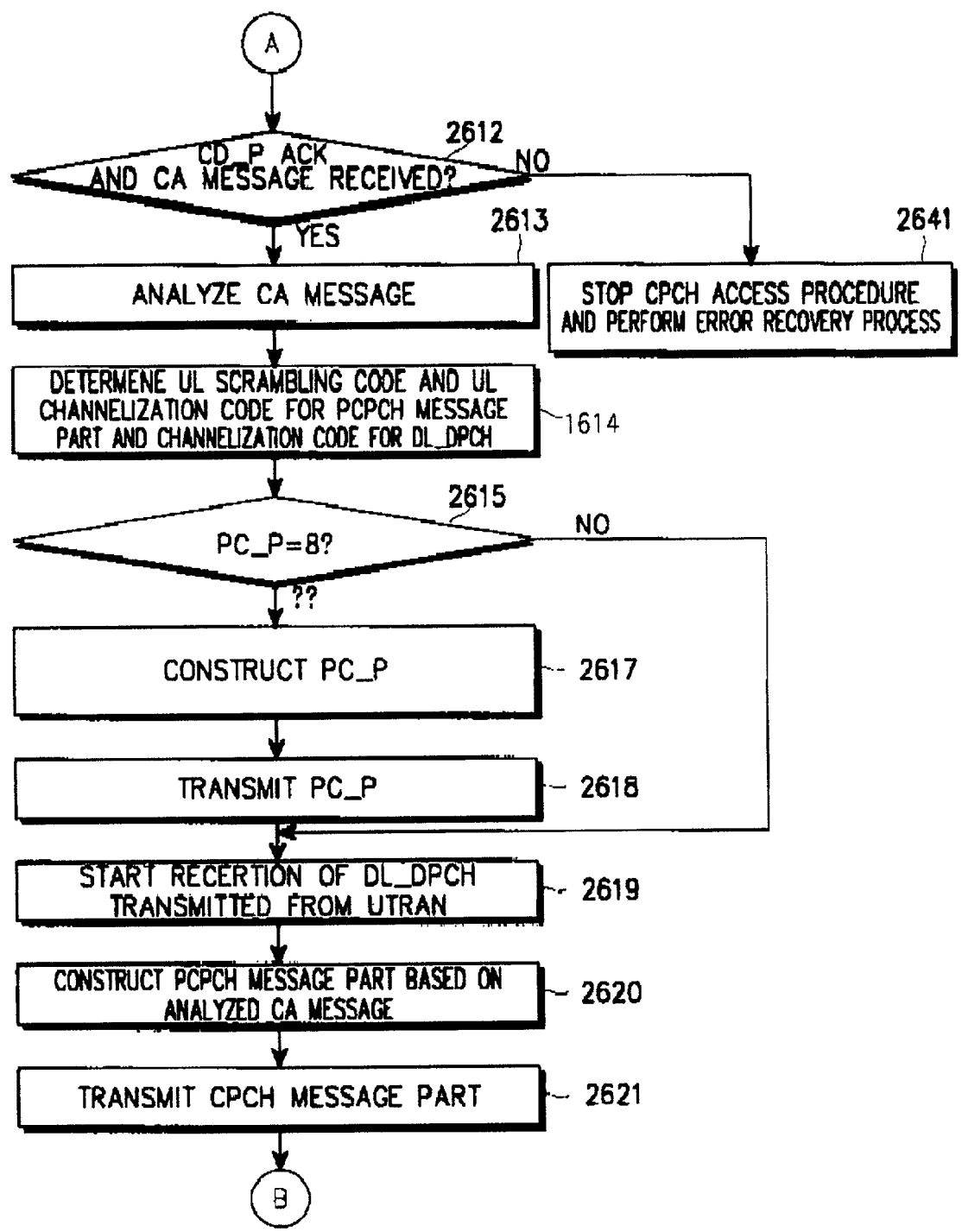
Figure 26C:
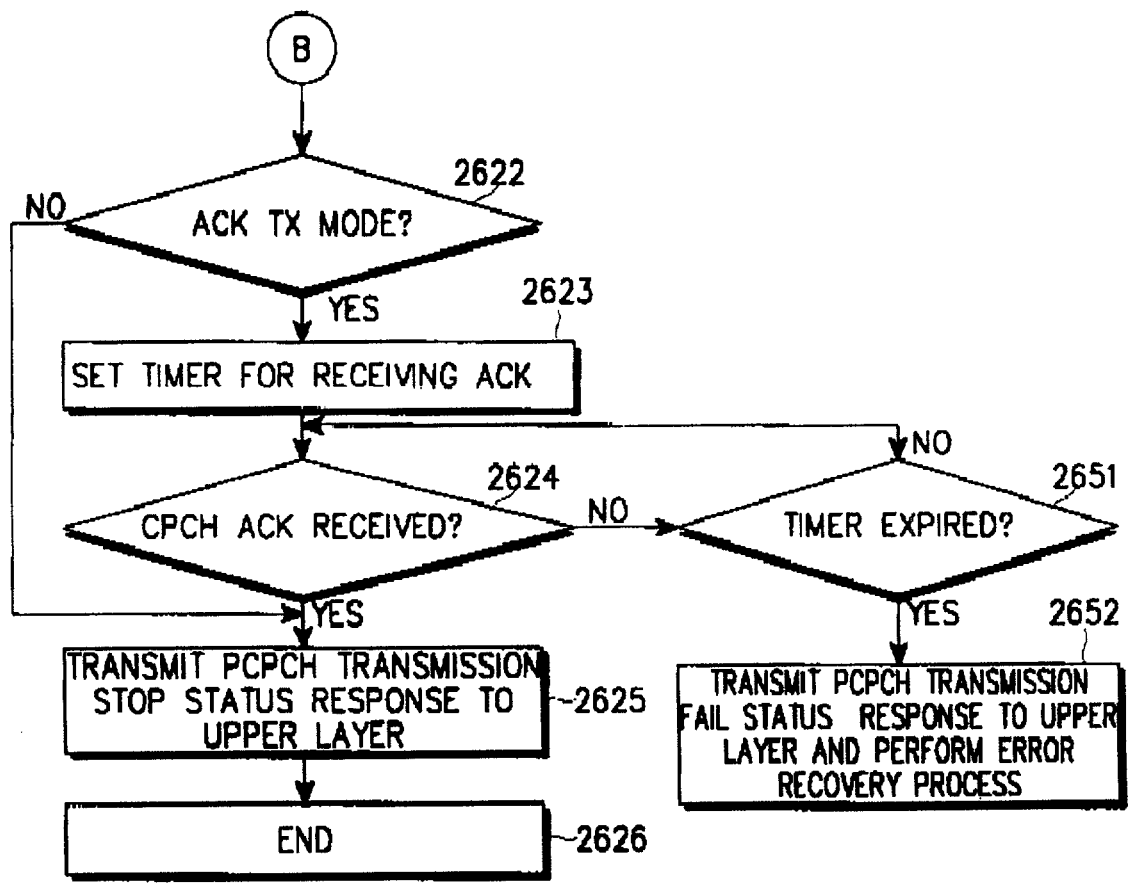
Figure 27A:
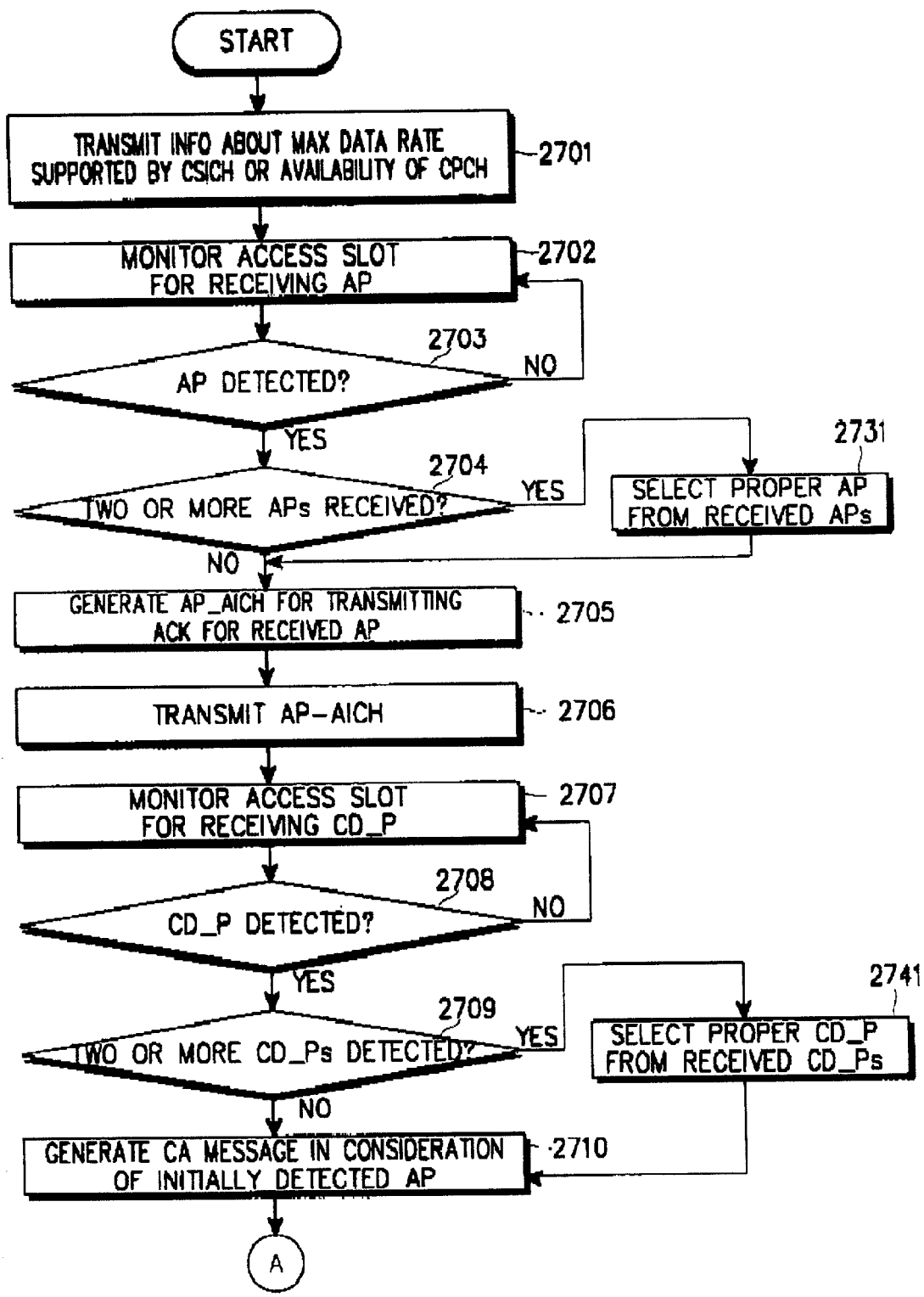
FIGS. 27A to 27C are flow charts illustrating a procedure for allocating a common packet channel in the UTRAN according to an embodiment of the present invention.
Figure 27B:
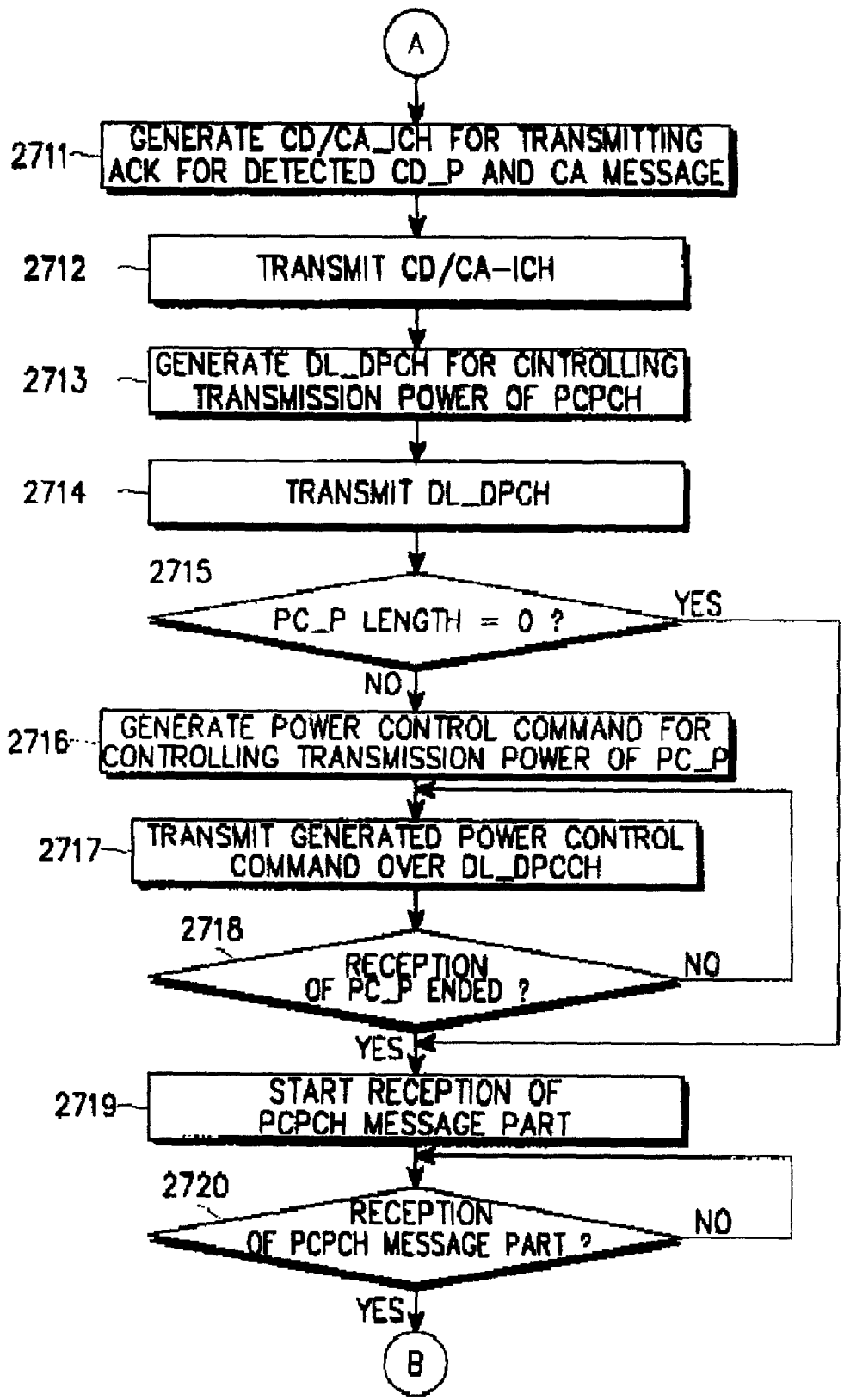
Figure 27C:
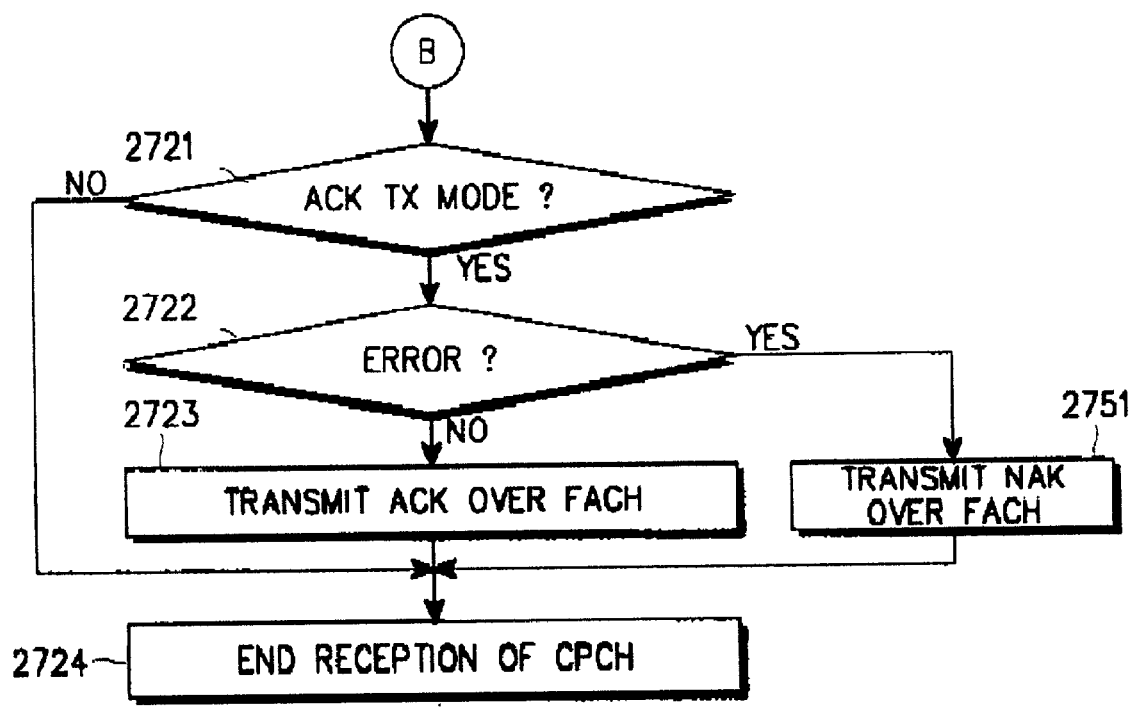

FIGS. 26A to 26C show a procedure for allocating the CPCH channel in the UE according to an embodiment of the present invention, and FIGS. 27A to 27C show a procedure for allocating the CPCH channel in the UTRAN according to an embodiment of the present invention.

Referring to FIG. 26A, the UE generates data to be transmitted over the CPCH in step 2601, and acquires information about a possible maximum data rate by monitoring the CSICH in step 2602. The information that can be transmitted over the CSICH in step 2602 may include information about whether the data rates supported by the CPCH can be used.

After acquiring the CPCH information of the UTRAN in step 2602, the UE selects a proper ASC based on the information acquired over the CSICH and the property of transmission data, and randomly selects a valid CPCH_AP sub-channel group in the selected ASC, in step 2603. Thereafter, in step 2604, the UE selects a valid access slot from the frames of SFN+1 and SFN+2 using the SFN of the downlink frame and the sub-channel group number of the CPCH. After selecting the access slot, the UE selects a signature appropriate for the data rate at which the UE will transmit the data, in step 2605.

Here, the UE selects the signature by selecting one of the signatures for transmitting the information. Thereafter, the UE performs desired transport format (TF) selection, persistence check and accurate initial delay for AP transmission in step 2606; sets repetitive transmission number and initial transmission power of the AP in step 2607; and transmits the AP in step 2608.

After transmitting the AP, the UE awaits ACK in response to the transmitted AP in step 2609. It is possible to determine whether ACK has been received or not, by analyzing the AP_AICH transmitted from the UTRAN. Upon failure to receive ACK in step 2609, the UE determines in step 2631 whether the AP repetitive transmission number set in step 2607 has been exceeded. If the set AP repetitive transmission number has been exceeded in step 2631, the UE transmits an error occurrence system response to the upper layer to stop the CPCH access process and to perform an error recovery process in step 2632. Whether the AP repetitive transmission number has been exceeded or not can be determined using a timer.

If the AP repetitive transmission number has not been exceeded in step 2631, the UE selects a new access slot defined in the CPCH_AP sub-channel group in step 2633, and selects a signature to be used for the AP in step 2634. In selecting the signature in step 2634, the UE selects a new signature out of the valid signatures in the ASC selected in step 2603 or selects the signature selected in step 2605. Thereafter, the UE resets transmission power of the AP in step 2635, and repeatedly performs the step 2608.

Upon receipt of ACK in step 2609, the UE selects a signature to be used for the CD_P from the signature group for the preamble and selects an access slot for transmitting the CD_P in step 2610. The access slot for transmitting the CD_P may indicate a given time point after the UE has received ACK, or a fixed time point. After selecting the signature and access slot for the CD_P, the UE transmits the CD_P which uses the selected signature at the selected access slot, in step 2611.

After transmitting the CD_P, the UE determines in step 2612 of FIG. 26B whether ACK for CD_P and a channel allocation message are received. The UE performs different operation according to whether an ACK has been received or not over the CD_ICH.

In step 2612, the UE can determine a received time of an ACK for the CD_P and the channel allocation message by using a timer. If an ACK is not received within a time set by the timer or a NAK for the transmitted CD_P is received in step 2612, the UE proceeds to step 2641 to stop the CPCH access procedure. In step 2641, the UE transmits an error occurrence system response to the upper layer to stop the CPCH access procedure and perform an error recovery process. If an ACK for the CD_P is received in step 2612, the UE analyzes the channel allocation message in step 2613. It is possible to simultaneously detect and analyze ACK for the CD_P and the channel allocation message by using the AICH receivers of FIGS. 16 and 17.

The UE determines in step 2614 an uplink scrambling code and an uplink channelization code for a message part of a physical common packet channel (PCPCH) according to the channel allocation message analyzed in step 2613, and determines a channelization code for a downlink dedicated channel established for power control of the CPCH. Thereafter, the UE determines in step 2615 whether the slot number of power control preamble PC_P is 8 or 0. If the number of the PC_P slots is 0 in step 2615, the UE performs step 2619 to start receiving the downlink dedicated channel transmitted from the UTRAN; otherwise, if the number of the PC_P slots is 8, the UE performs step 2617.

In step 2617, the UE formats the power control preamble PC_P according to the uplink scrambling code, the uplink channelization code and the slot type to be used for the PC_P. The PC_P has 2 slot types. After selecting the scrambling code for the PC_P and the channelization code, the UE transmits the PC_P in step 2618, and at the same time, receives the downlink dedicated channel to perform transmission power control of the uplink and reception power control of, the downlink. Thereafter, in step 2620, the UE formats the PCPCH message part according to the channel allocation message analyzed in step 2613, and starts transmission of the CPCH message part in step 2621.

Thereafter, the UE determines in step 2622 of FIG. 26C whether the PC_P is transmitted in an acknowledgement mode for acknowledging channel allocation. If the PC_P is not transmitted in the acknowledgement mode in step 2622, the UE performs step 2625 after transmission of the CPCH message part, to transmit a CPCH transmission stop status response to the upper layer, and ends the process of transmitting the data over the CPCH in step 2626.

However, if the PC_P is transmitted in the acknowledgement mode in step 2622, the UE sets a timer for receiving an ACK of the CPCH message part in step 2623, and monitors a forward access channel (FACH) during and after transmission of the CPCH message part in step 2624, to determine whether an ACK or NAK for the CPCH message part has been received from the UTRAN. It is possible to use a downlink dedicated channel as well as the FACH in receiving, an ACK or NAK from the UTRAN. Upon failure to receive an ACK for the CPCH message part over the FACH in step 2624, the UE determines in step 2651 whether the timer set in step 2623 has expired or not. If the timer has not expired, the UE returns to step 2624 to monitor for an ACK or NAK from the UTRAN.

If the timer has expired, the UE transmits a transmission fail status response to the upper layer and performs an error recovery process in step 2652. However, if an ACK has been received in step 2624, the UE performs steps 2625 and 2626, completing transmission of the CPCH.

A detailed description will now be made regarding how the UTRAN allocates the CPCH, with reference to FIGS. 27A to 27C.

The UTRAN transmits information about the maximum data rate supported by the CPCH or information as to whether the CPCH is available according to the data rates, using the CSICH, in step 2701 of FIG. 27A. The UTRAN monitors an access slot to receive an AP transmitted from the UEs in step 2702.

While monitoring the access slot, the UTRAN determines in step 2703 whether an AP has been detected. Upon failure to detect an AP in step 2703, the UTRAN returns to step 2702 and repeats the above process. Otherwise, upon detection of the AP in step 2703, the UTRAN determines in step 2704 whether two or more APs have been detected (or received). If two or more APs have been detected in step 2704, the UTRAN selects a proper one of the detected APs in step 2731 and then proceeds to step 2705. Otherwise, if one only AP has been received and it is determined that receiving power of the received AP or a requirement for the CPCH included in the signature for the received AP is appropriate, the UTRAN performs step 2705. Here, the "requirement" refers to a data rate that the UE desires to use for the CPCH or the number of data frames to be transmitted by the user, or a combination of the two requirements.

If one AP has been detected in step 2704 or after selecting a proper AP in step 2731, the UTRAN proceeds to step 2705 to generate an AP_AICH for transmitting an ACK for the detected or selected AP, and then transmits the generated AP_AICH in step 2706. After transmitting the AP_AICH, the UTRAN monitors an access slot to receive the CD_P transmitted from the UE that has transmitted the AP, in step 2707. It is possible to receive the AP, even in the process of receiving the CD_P and monitoring the access slot. That is, the UTRAN can detect the AP, CD_P and PC_P from the access slots, and generate the AICHs for the detected preambles. Therefore, the UTRAN can simultaneously receive the CD_P and the AP.

In this embodiment of the present invention, the description will be made focusing on the process in which the UTRAN detects the AP generated by a given UE and then allocates the CPCH as shown in FIG. 3. Therefore, the description of the operation performed by the UTRAN will be made in the sequence of a response, made by the UTRAN, to the AP transmitted from a given UE, a response to the CD_P transmitted from the UE that has transmitted the AP, and a response to the PC_P transmitted from the corresponding UE.

Upon detecting the CD_P in step 2708, the UTRAN performs step 2709; otherwise, upon failure to detect the CD_P, the UTRAN performs the step 2707 to monitor detection of the CD_P. The UTRAN has two monitoring methods: one method is to use a timer if the UE transmits the CD_P at a fixed time after the AP_AICH, another method is to use a searcher if the UE transmits the CD_P at a given time.

Upon detecting the CD_P in step 2708, the UTRAN determines in step 2709 whether two or more CD_Ps have been detected. If two or more CD_Ps have been detected in step 2709, the UTRAN selects a proper one of the received CD_Ps in step 2741, and generates the CD_ICH and the channel allocation message in step 2710. In step 2741, the UTRAN may select the proper CD_P depending on the receiving power of the received CD_Ps. If one CD_P has been received in step 2709, the UTRAN proceeds to step 2710 where the UTRAN generates a channel allocation message to be transmitted to the UE that has transmitted the CD_P selected in step 2741 or the CD_P received in step 2709.

Thereafter, in step 2711 of FIG. 27B, the UTRAN generates ACK for the CD_P detected in step 2708 and the CD/CA_ICH for transmitting the channel allocation message generated in step 2710. The UTRAN may generate the CD/CA_ICH in the method described with reference to FIGS. 13A and 13B. The UTRAN transmits the generated CA/CD_ICH in step 2712 in the method described with reference to FIGS. 14 and 15.

After transmitting the CD/CA_ICH, the UTRAN generates a downlink dedicated channel (DL_DPCH) for controlling transmission power of the uplink CPCH in step 2713. The generated downlink dedicated channel corresponds to the uplink CPCH transmitted from the UE on a one-to-one basis. The UTRAN transmits information for controlling transmission power of the PCPCH in step 2714, using the DL_DPCH generated in step 2713.

The UTRAN examines the slot or timing information by receiving the PC_P transmitted from the UE, in step 2715. If the slot number or timing information of the PC_P transmitted from the UE is '0' in step 2715, the UTRAN starts receiving a message part of the PCPCH transmitted from the UE in step 2719. Otherwise, if the slot number or timing information of the PC_P transmitted from the UE is '8' in step 2715, the UTRAN proceeds to step 2716 where the UTRAN receives the PC_P transmitted from the UE and creates a power control command for controlling transmission power of the PC_P.

One object of controlling transmission power of the PC_P is to properly control initial transmission power of the uplink PCPCH transmitted from the UE. The UTRAN transmits the power control command generated in step 2716 through a power control command field of a downlink dedicated physical control channel (DL_DPCCH) out of the downlink dedicated channels generated in step 2713. Thereafter, the UTRAN determines in step 2718 whether the PC_P has been completely received. If reception of the PC_P is not completed, the UTRAN returns to step 2717; otherwise, if reception of the PC_P is completed, the UTRAN performs step 2719.

Whether reception of the PC_P is completed or not can be determined by using a timer to examine whether 8 PC_P slots have arrived. If it is determined in step 2718 that reception of the PC_P is completed, the UTRAN starts receiving a message part of the uplink PCPCH in step 2719, and determines in step 2720 no whether reception of the PCPCH message part is completed. If reception of the PCPCH message part is determined not to be completed, the UTRAN continuously receives the PCPCH, and otherwise, if reception of the PCPCH is completed, the UTRAN proceeds to step 2721 of FIG. 27C.

The UTRAN determines in step 2721 whether the UE transmits the PCPCH in an acknowledgement transmission mode. If the UE transmits the PCPCH in an acknowledgement transmission mode, the UTRAN performs step 2722, and otherwise, performs step 2724 to end reception of the CPCH. If it is determined in step 2721 that the UE transmits the PCPCH in the acknowledgement transmission mode, the UTRAN determines in step 2722 whether the received PCPCH message part has an error.

If the received PCPCH message part has an error, the UTRAN transmits NAK through a forward access channel (FACH) in step 2751. If the received PCPCH message part does not have an error, the UTRAN transmits ACK through the FACH in step 2723 and then ends reception of the CPCH in step 2724.

Figure 28A:
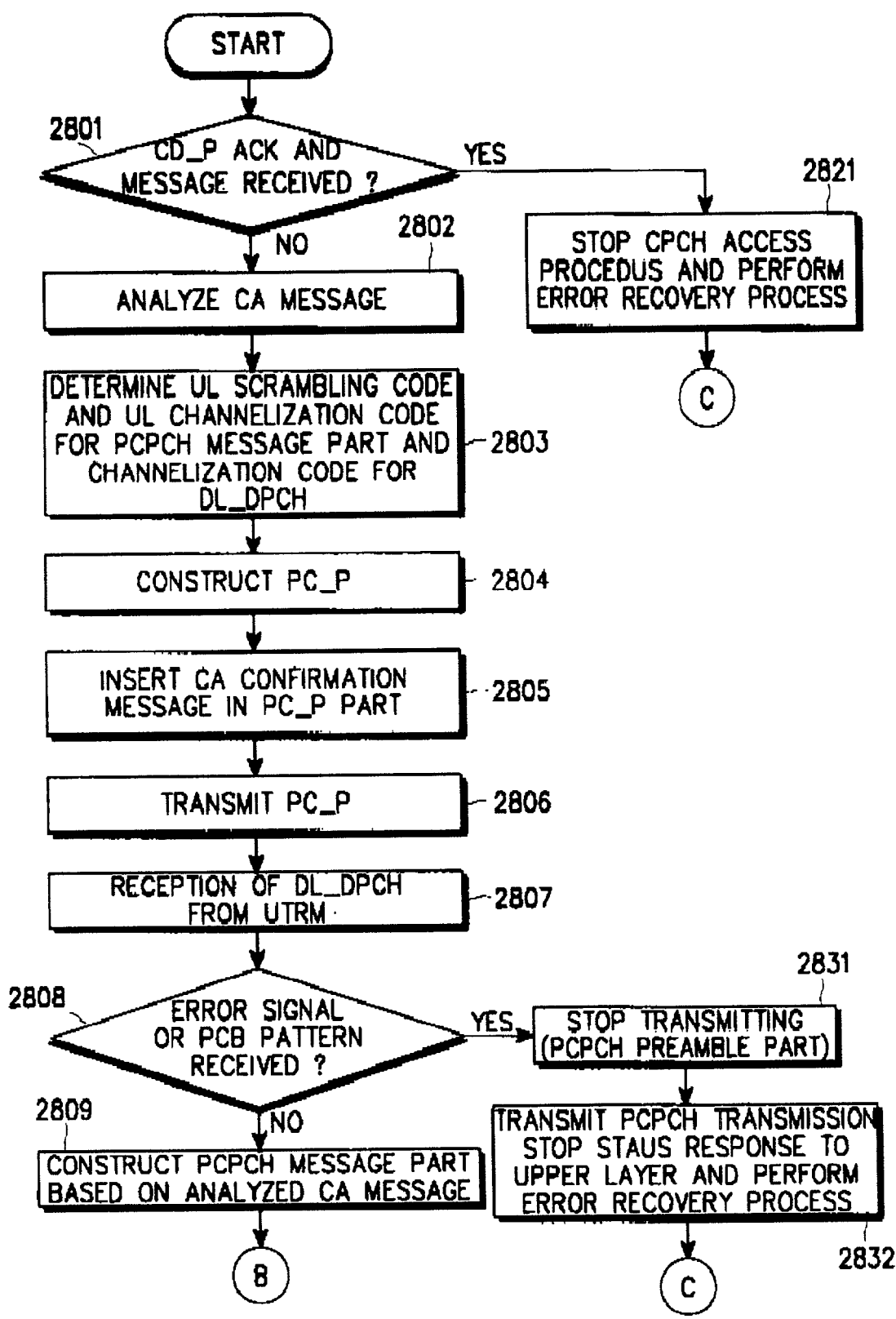
FIGS. 28A and 28B are flow charts illustrating a procedure for setting a stable CPCH using the PC_P, performed in the UE, according to an embodiment of the present invention.
Figure 28B:
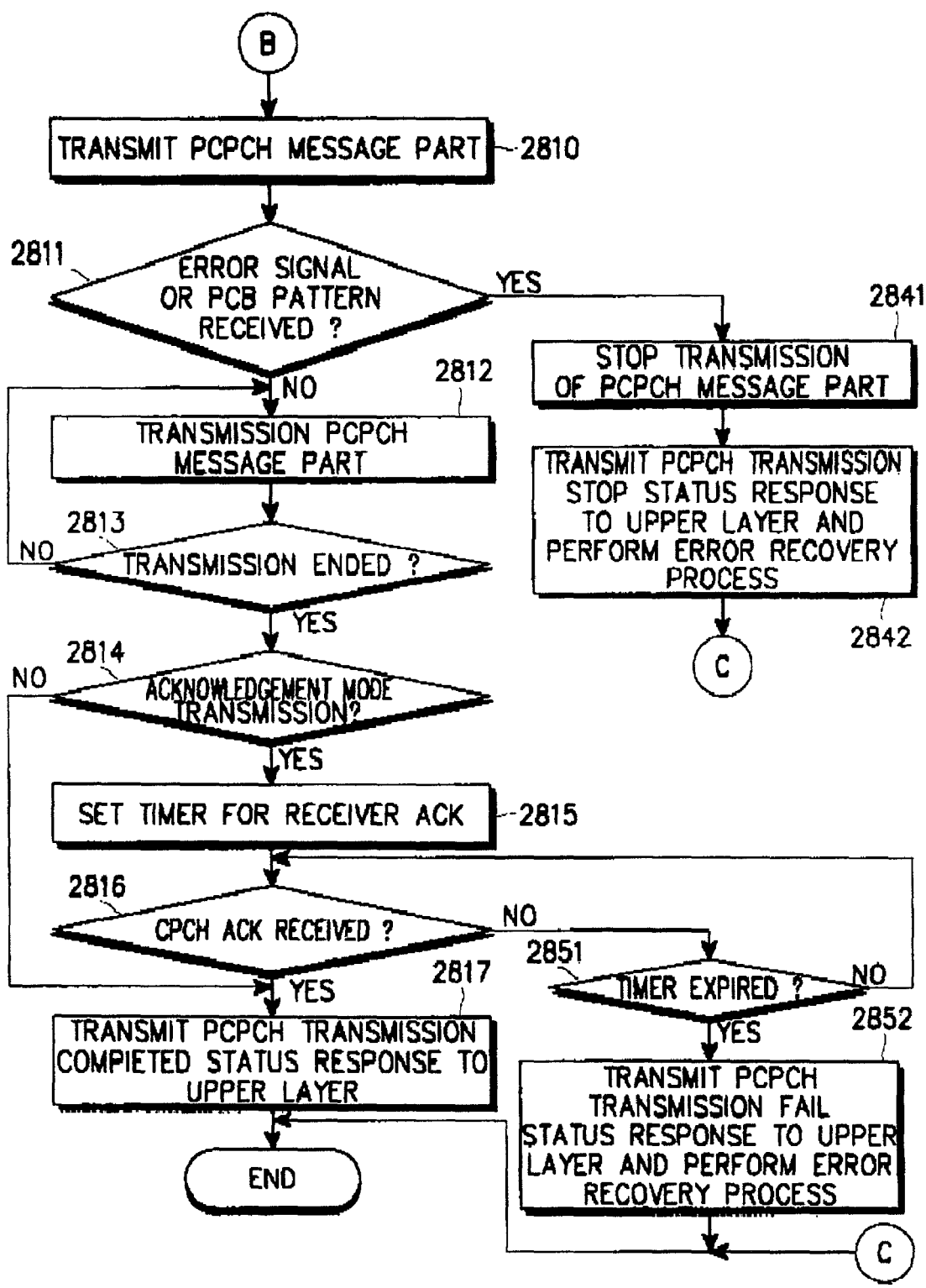
Figure 29A:
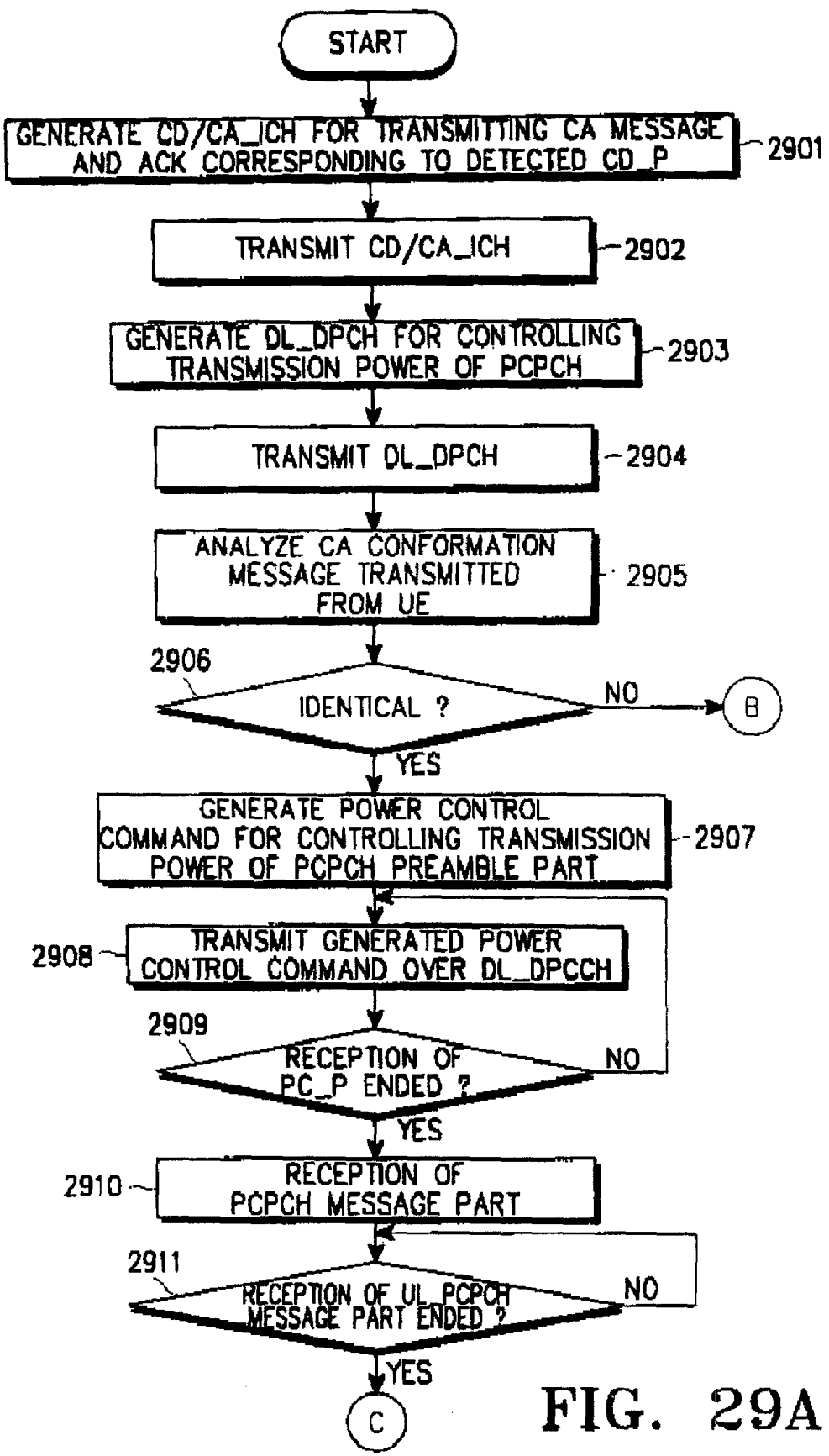
FIGS. 29A to 29C are flow charts illustrating a procedure for setting a stable CPCH using the PC_P, performed in the UTRAN, according to an embodiment of the present invention.
Figure 29B:
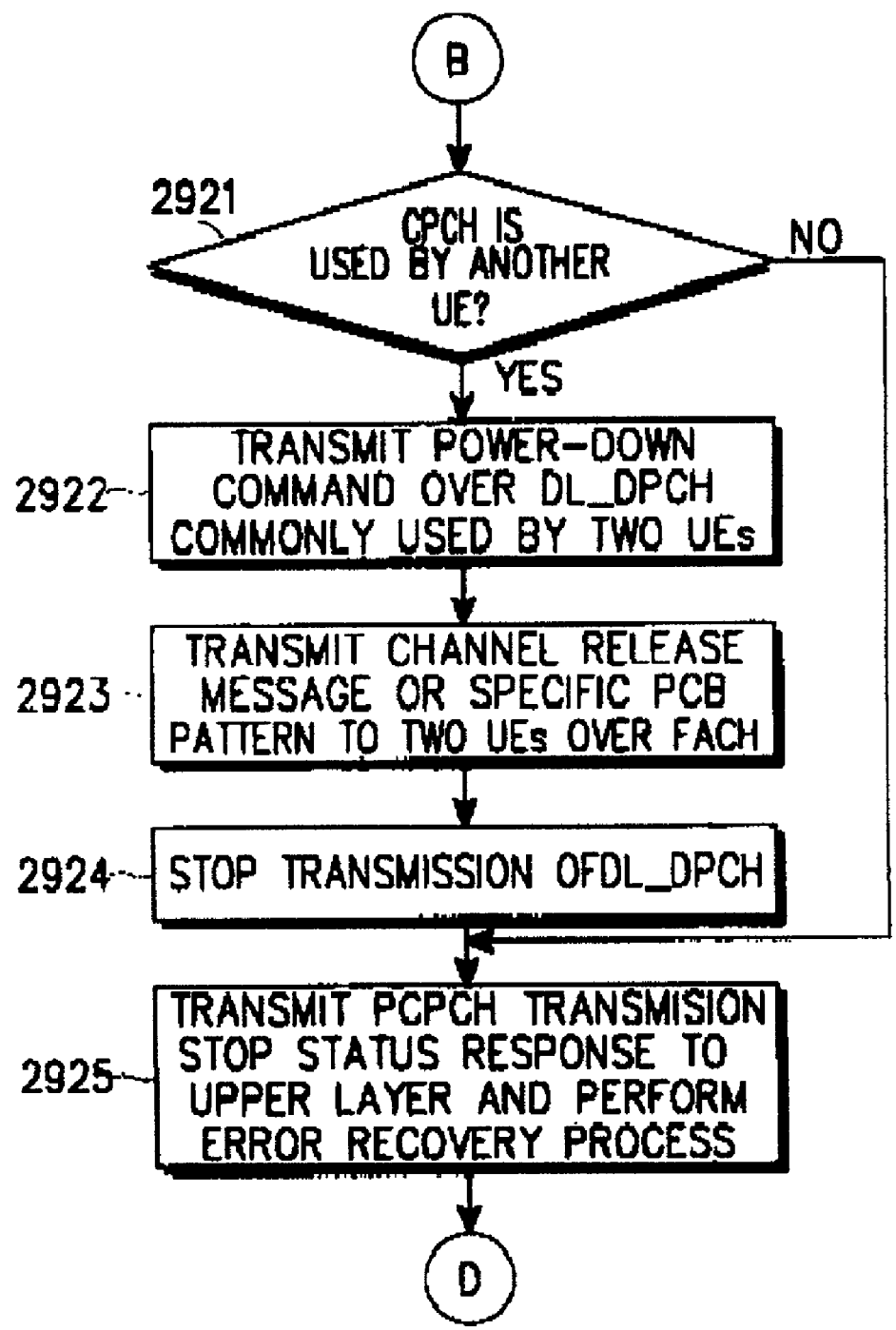
Figure 29C:
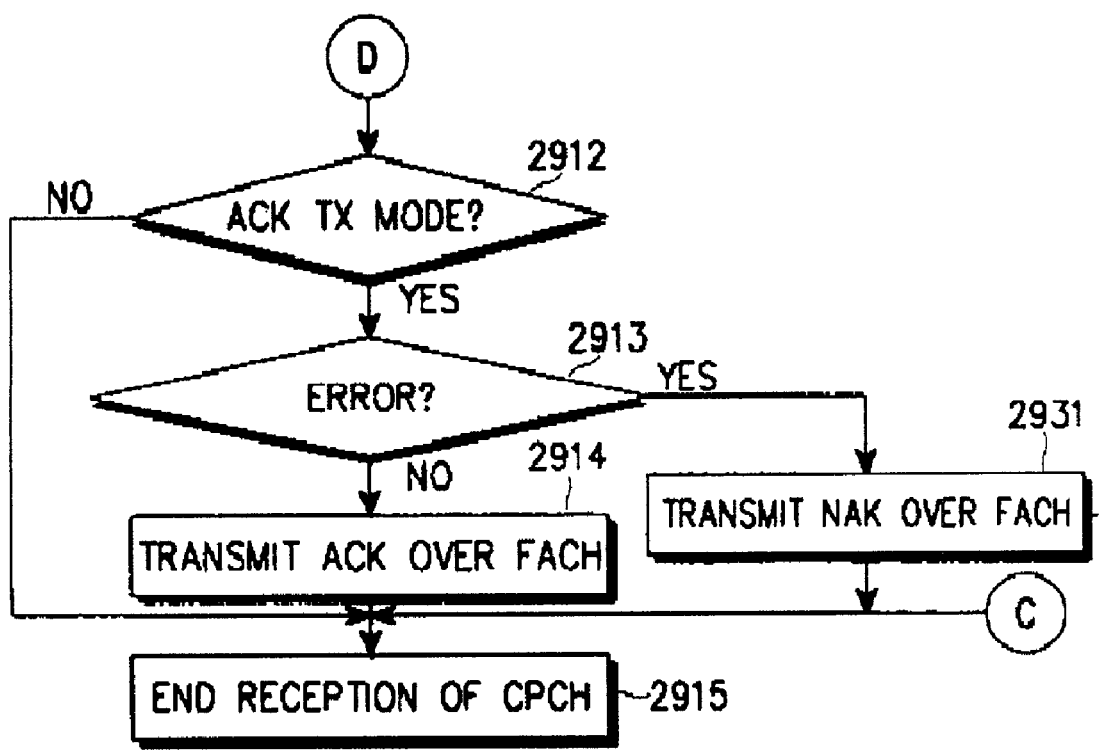

FIGS. 28A and 28B show the procedure for allocating the CPCH in the UE according to another embodiment of the present invention, wherein "START" of FIG. 28A is connected to "A" of FIG. 26A. FIGS. 29A to 29C show, the procedure for allocating the CPCH in the UTRAN according to another embodiment of the present invention, wherein "START" of FIG. 29A is connected to "A" of FIG. 27A. FIGS. 28A–28B and FIGS. 29A–29C show the methods for establishing the stable CPCH using the PC_P described with reference to FIGS. 22 to 26, performed by the UE and the UTRAN, respectively.

Referring to FIG. 28A, the UE determines in step 2801 whether CD_ICH and CA_ICH have been received from the UTRAN. Upon failure to receive the CD/CA_ICH in step 2801, the UE transmits an error occurrence system response to the upper layer to end the CPCH access procedure and the error recovery process in step 2821. "Failure to receive the CD/CA_ICH" includes one case where an ACK is not received although the CD/CA_ICH is received, and another case where the CD/CA_ICH is not received from the UTRAN within a predetermined time. The "predetermined time" refers to a time previously set when starting the CPCH access procedure, and a timer can be used in setting the time.

Otherwise, if it is determined in step 2801 that the CD/CA_ICH have been received and ACK is detected from the CD_ICH, the UE analyzes the channel allocation message transmitted from the UTRAN in step 2802. After analyzing the channel allocation message in step 2802, the UE proceeds to step 2803 where the UE determines an uplink scrambling code of the PCPCH message part, an uplink channelization code, and a channelization code for the downlink channel used for controlling the uplink CPCH according to the analyzed channel allocation message.

Thereafter, in step 2804, the UE constructs the PC_P according to the slot type using the uplink scrambling code and the uplink channelization code set in step 2803. This embodiment of the present invention increases stability and reliability of the CPCH using the PC_P. It is assumed that the length or timing information of the PC_P slot is always set to 8 slots.

In step 2805, the UE inserts a channel allocation confirmation message in the PC_P in order to verify the channel allocation message received from the UTRAN. The UE can insert the channel allocation confirmation message in the PC_P in the methods described with reference to FIGS. 22 to 25. In the method of FIG. 22, a pilot bit of the PC_P is multiplied by the channel allocation message or the signature number received at the UE before transmission. In the method of FIG. 23, the PC_P slot is multiplied by the channel allocation message or the signature number received at the UE by the chip level before transmission. In the method of FIG. 24, the PC_P is channelized with a channelization code corresponding to the channel allocation message or the signature number received at the UE before transmission. In the method of FIGS. 25A and 25B, the PC_P is spread with a scrambling code corresponding to the channel allocation message or the signature received at the UE and then transmitted to the UTRAN. When transmitting the channel allocation message using the multiple signatures, the UTRAN uses the channel allocation message for the CPCH allocated to the UE. When allocating the CPCH using one signature, the UTRAN uses the signature for the channel allocation message.

Thereafter, in step 2806, the UE transmits the PC_P generated in step 2805 to the UTRAN, and starts receiving the DL_DPCH transmitted from the UTRAN in step 2807. In addition, the UE measures receiving power of the downlink using the pilot field of the DL_DPCH and inserts a command for controlling transmission power of the downlink in a power control command part of the PC_P according to the measured receiving power.

While transmitting the PC_P to the UTRAN and receiving the DL_DPCH, the UE determines in step 2808 whether an error signal for the channel allocation message analyzed by the UE or a specific PCB (Power Control Bit) pattern requiring release of the CPCH has been received from the UTRAN. If it is determined in step 2808 that the analyzed channel allocation message has an error or the PCB pattern indicates a CPCH release, the UE ends transmission of the PC_P in step 2831 and transmits a PCPCH transmission stop status response, to the upper layer and performs the error recovery process, in step 2832.

However, if it is determined in step 2808 that the error signal for the channel allocation message or the specific PCB pattern is not received from the UTRAN, the UE constructs the PCPCH message part according to the analyzed channel allocation message in step 2809.

Continuing at step 2810 of FIG. 28B, the UE starts transmitting the PCPCH message part generated in step 2809. While transmitting the PCPCH message part, the UE performs step 2811 which is identical to step 2808 of FIG. 28A. Upon receipt of an error confirmation message for the channel assignment message or a channel release request message from the UTRAN in step 2811, the UE performs steps 2841 and 2842. The UE stops transmission of the PCPCH message part in step 2841, and transmits a PCPCH transmission stop status response to the upper layer and performs the error recovery process in step 2842.

The channel release request message has two different types. The first type of channel release request message is transmitted when the UTRAN knows, after starting transmission of the PCPCH, that the presently established CPCH has collided with a CPCH of another UE due to the delay in confirming the channel allocation message for the presently established CPCH, transmitted from the UTRAN. The second type of channel release request message is transmitted when the UTRAN transmits a collision message indicating a collision with another user to a first UE which correctly uses the CPCH and a second UE starts, transmission using the CPCH over which the first UE is presently communicating with the UTRAN, because the channel allocation message received at the second UE using the CPCH from the UTRAN has an error. At any rate, upon receipt of the channel release message, the UTRAN commands the first UE which correctly uses the CPCH and the second UE which has received the channel allocation message with an error to stop using the uplink CPCH.

However, if the error signal for the channel allocation message or the specific PCB pattern for requesting channel release from the UTRAN is not received from the UTRAN in step 2811, the UE continuously transmits the PCPCH message part in step 2812, and determines in step 2813 whether transmission of the PCPCH message part is completed. If transmission of the PCPCH message part is not completed, the UE returns to step 2812 to continue performing the above operation. Otherwise, if transmission of the PCPCH message part is completed, the UE performs the operation of step 2814.

The UE determines in step 2814 whether transmission is made in the acknowledgement mode. If transmission is not made in the acknowledgement mode, the UE ends transmission of the PCPCH message part and performs step 2817 where the UE transmits a PCPCH transmission stop status response to the upper layer and ends the CPCH data transmission process. However, if transmission is made in the acknowledgement mode, the UE sets a timer for receiving ACK of the CPCH message part in step 2815. Thereafter, in step 2816, the UE monitors the forward access channel (FACH) during and after, transmission of the CPCH message part, to determine whether an ACK or NAK for the CPCH message part has been received from the UTRAN.

The UTRAN can transmit an ACK or NAK through the downlink channel as well as the FACH. If an ACK for the CPCH message part is not received through the FACH in step 2816, the UE determines in step 2851 whether the timer set in step 2815 has expired or not. If the timer has not expired yet in step 2815, the UE returns to step 2816 and monitors for an ACK or NAK transmitted from the UTRAN. Otherwise, if the timer has expired in step 2815, the UE transmits a PCPCH transmission fail status response to the upper layer and performs the error recovery process, in step 2852. However, upon receipt of ACK in step 2816, the UE performs step 2817 and ends transmission of the CPCH.

A description of the UTRAN will now be made with reference to FIGS. 29A to 29C, wherein "START" of FIG. 29A is connected to "A" of FIG. 27A.

In step 2901 of FIG. 29A, the UTRAN generates the CD/CA_ICH for transmitting ACK for the CD_P detected in step 2708 of FIG. 27A and the channel allocation message generated in step 2710. The CD/CA_ICH can be generated in the method described with reference to FIGS. 13A and 13B. In step 2902, the UTRAN transmits the CA/CD_ICH generated in step 2901, in the methods described with reference to FIGS. 14 and 15. After transmitting the CD/CA_ICH, the UTRAN generates a downlink dedicated channel for controlling transmission power of the uplink CPCH. The generated downlink dedicated channel corresponds to the uplink CPCH transmitted from the UE on a one-to-one basis.

The UTRAN transmits the DL_DPCH generated in step 2903, in step 2904, and receives the PC_P transmitted from the UE and analyzes a confirmation message for the received channel allocation message in step 2905. The UTRAN determines in step 2906 whether the channel allocation conformation message transmitted from the UE is identical to the channel allocation message transmitted by the UTRAN, based on the results analyzed in the step 2905. If they are identical in step 2906, the UTRAN performs step 2907, and otherwise, proceeds to step 2921.

The UE can transmit the channel allocation message to the UTRAN using the PC_P in the methods described with reference to FIGS. 22 to 25. In the method of FIG. 22, a pilot bit of the PC_P is multiplied by the channel allocation message or the signature number received at the UE before transmission. In the method of FIG. 23, the PC_P slot is multiplied by the channel allocation message or the signature number received at the UE by the chip level before transmission. In the method of FIG. 24, the PC_P is channelized with a channelization code corresponding to the channel allocation message or the signature number received at the UE before transmission. In the method of FIG. 25, the PC_P is spread with a scrambling code corresponding to the channel allocation message or the signature received at the UE and then transmitted to the UTRAN. When transmitting the channel allocation message using the multi-signature, the UTRAN uses the channel allocation message for the CPCH allocated to the UE. When allocating the CPCH using one signature, the UTRAN uses the signature for the channel allocation message.

The UTRAN determines in step 2921 of FIG. 29B whether a CPCH corresponding to the channel allocation confirmation message received in step 2905 is used by another UE. If it is determined in step 2921 that the CPCH is not used by another UE, the UTRAN performs step 2925 where the UTRAN transmits a PCPCH transmission stop status response to the upper link and performs the error recovery process.

The "error recovery process" performed by the UTRAN refers to ordering the UE to stop transmission of the CPCH by transmitting a CPCH transmission stop message to the UE through the downlink dedicated channel in use, transmitting the CPCH transmission stop message to the UE through the FACH, or continuously transmitting a specific bit pattern previously appointed with the UE. In addition, the error recovery process may include a method in which the UTRAN continuously transmits a command for decreasing transmission power of the uplink through the DL_DPCH received at the UE.

If it is determined in step 2921 that the CPCH corresponding to the channel allocation confirmation message received in step 2905 is used by another UE, the UTRAN transmits a power-down command through the DL_DPCH which is commonly used by the two UEs, in step 2922. Thereafter, in step 2923, the UTRAN releases the channel by transmitting the channel release message or the specific PCB pattern to the two UEs through the FACH. The UTRAN may use the downlink dedicated channel as well as the FACH, when transmitting the channel release message or the specific PCB pattern. After step 2923, the UTRAN stops transmitting the DL_DPCH to the UE in step 2924, and ends reception of the CPCH in step 2925.

If the channel confirmation message received from the UE in step 2906 is consistent with the channel allocation message allocated by the UTRAN, the UTRAN performs step 2907 where the UTRAN receives the PC_P transmitted from the UE and generates a power control command for controlling transmission power of the PC_P. One object of controlling transmission power of the PC_P is to properly control initial transmission power of the uplink PCPCH transmitted from the UE. In step 2908, the UTRAN transmits the generated power control command through a power control command field of the downlink dedicated physical control channel (DL_DPCCH) out of the downlink dedicated channels generated in step 2903.

The UTRAN determines in step 2909 whether reception of the PC_P is completed. If reception of the PC_P is not completed, the UTRAN returns to step 2908; and otherwise, proceeds to step 2910. Whether reception of the PC_P is completed can be determined by using a timer to examine whether the 8 PC_P slots have all been received. If reception of the PC_P is completed in step 2909, the UTRAN starts receiving the message part of the uplink PCPCH in step 2910, and determines in step 2911 whether reception of the message part of the uplink PCPCH. If reception of the PCPCH message part is not completed, the UTRAN continuously receives the PCPCH. If reception of the PCPCH message part is completed, the UTRAN determines in step 2921 of FIG. 29C whether the UE has transmitted the PCPCH in the acknowledgement transmission mode. If the, UE has transmitted the PCPCH in the acknowledgement transmission mode, the UTRAN performs step 2931, and if the UE has transmitted the PCPCH not in the acknowledgement transmission mode, the UTRAN performs step 2915.

If the UE has transmitted the PCPCH in the acknowledgement transmission mode in step 2912, the UTRAN determines in step 2913 whether the message part of the received PCPCH has an error. If the received PCPCH message part has an error, the UTRAN transmits NAK through the FACH in step 2931. If the received PCPCH message part has no error, the UTRAN transmits an ACK through the FACH in step 2914 and ends reception of the CPCH in step 2915.

Figure 32:
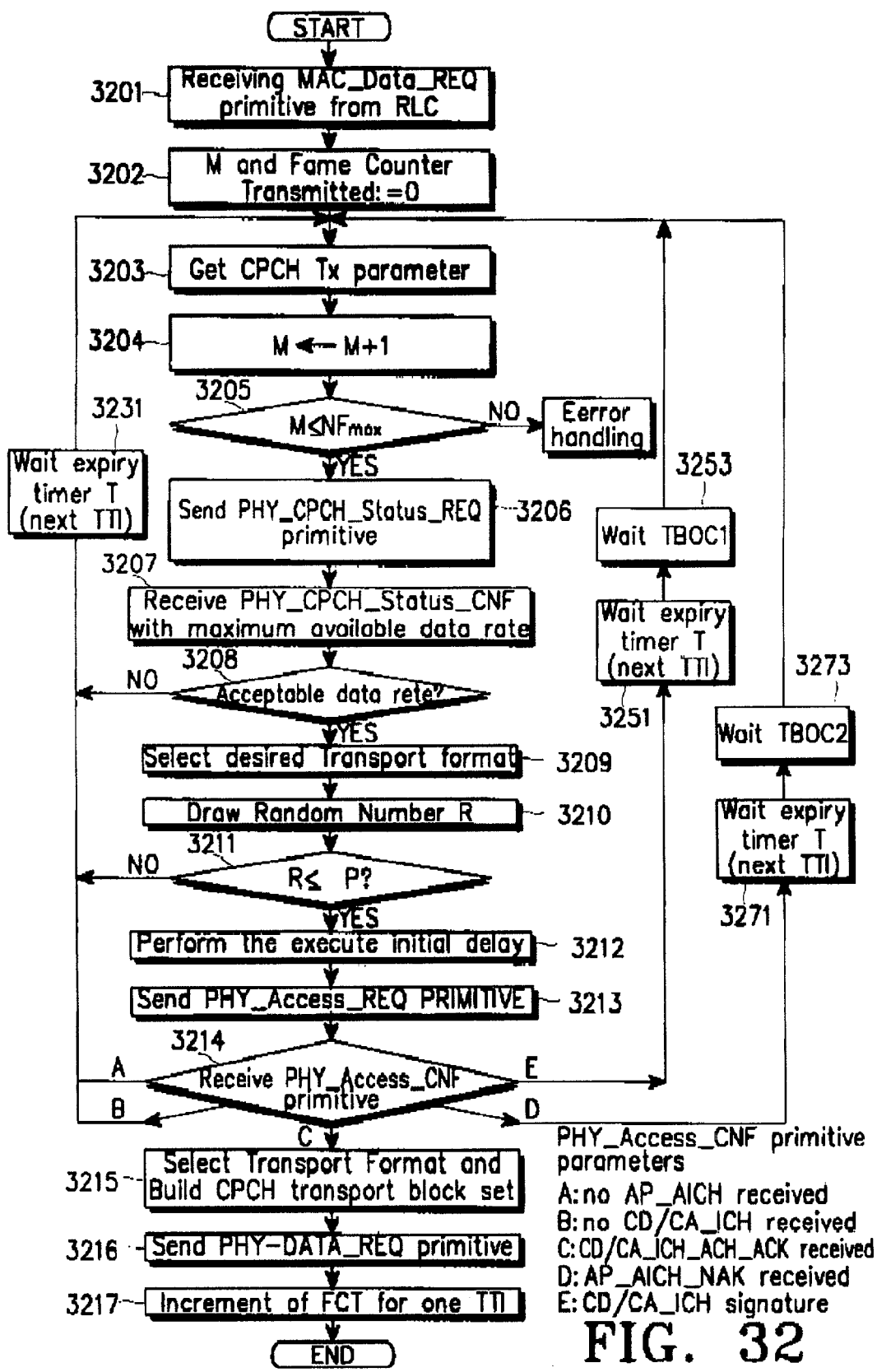
FIG. 32 is a flow chart illustrating a procedure for transmitting data over an uplink common packet channel, performed in an upper layer of the UE, according to an embodiment of the present invention.

FIG. 32 shows an operation performed by a MAC (Medium Access Control) layer of the UE according to an embodiment of the present invention. Upon receipt of MAC-Data-REQ primitive from RLC (Radio Link Control) in step 3201, the MAC layer sets to '0' a parameter M needed to count a preamble romping cycle and a parameter FCT (Frame Counter Transmitted) needed to, count the number of transmitted frames, in step 3203.

The "preamble romping cycle" refers to a time period in which how many times the access preamble can be transmitted. In step 3203, the MAC layer acquires a parameter needed to transmit the CPCH from RRC (Radio Resource Control). The parameter may include persistency value P, NFmax, and back-off (BO) time for the respective data rates.

The MAC layer increases the preamble romping cycle counter M in step 3204, and compares the value M with NFmax acquired from the RRC in step 3205. If M>NFmax, the MAC layer ends the CPCH acquiring process and performs an error correction process in step 3241. The error correcting process can be a process for transmitting a CPCH acquisition fail message to the upper layer of the MAC layer.

Otherwise, if M≦NFmax in step 3205, the MAC layer transmits a PHY-CPCH_Status-REQ primitive in step 3206, in order to acquire information about the PCPCH channels in the present UTRAN. The information about the PCPCH channels in the UTRAN, requested in step 3206 by the MAC layer, can be acquired in step 3207. The acquired PCPCH information in the UTRAN may include an availability of the respective channels, a data rate supported by the UTRAN for the respective PCPCHs, multi-code transmit information, and the maximum available data rate which can be presently allocated by the UTRAN.

In step 3208, the MAC layer compares the maximum available data rate of the PCPCH acquired in step 3207 with a requested data rate to determine whether the requested data rate is acceptable. If it is an acceptable data rate, the MAC layer proceeds to step 3209. Otherwise, if it is not an acceptable data rate, the MAC layer waits for an expiry time T until the next TTI in step 3231 and then repeats the step 3203 and its succeeding steps.

The step 3209 is performed when the data rate of the PCPCH desired by the MAC layer is coincident with the data rate of the PCPCHs in the present UTRAN, and in the step 3209, the MAC layer selects a desired transport format (TF) for transmitting the CPCH. In order to perform a persistency test to determine whether to attempt an access to the PCPCH supporting the TF selected in step 3209, the MAC layer draws a random number R in step 3210. Thereafter, in step 3211, the MAC layer compares the random number R drawn in step 3210 with the persistency value P acquired in step 3203 from RRC. If R≦P. the MAC layer proceeds to step 3212, and if R>P, the MAC layer returns to step 3231.

Alternatively, if R>P in step 3211, the MAC layer can also perform the following process. That is, the MAC layer includes a busy table for recording availability of the respective TFs, records the persistency test-failed TF in the busy table and then performs again the process from the step 3209. In this case, however, the MAC layer consults the busy table in step 3209, in order to select the TF that is not recoded as "busy".

The MAC layer accurately performs initial delay in step 3212, and transmits to the physical layer a PHY-Access-REQ primitive for commanding the physical layer to perform a procedure for transmitting the access preamble in step 3213. Reference 3214 indicates a process performed after receiving PHY-Access-CNF for the PHY-Access-REQ primitive transmitted by the MAC layer in step 3213. "A" of step 3214 indicates a case where the MAC layer has received no response over the AP_AICH, and in this case (i.e., upon failure to receive the AP_AICH), the MAC layer performs again the process from the step 3231. "B" of step 3214 indicates a case where the physical layer having received the AP_AICH has failed to receive a response over the CD/CA_ICH after transmitting the CD_P. At this point, the MAC layer performs the process from the step 3231, as in the case "A". "D" of step 3214 indicates a case where the physical layer of the UE has received a NAK from the UTRAN over the AP_AICH.

In this case, the MAC layer waits the expiry timer T until the next TTI in step 3271 and thereafter, waits a back-off time TBOC2 needed when the NAK is receive over the AP_AICH, in step 3273, and then performs the process again from the step 3203. "E" of step 3214 indicates a case where the physical layer of the UE has received the signature transmitted over the CD/CA_ICH by the UE itself and another signature. In this case, the MAC layer waits the expiry timer T until the next TTI in step 3251, and thereafter, waits a back-off time TBOC1 given when the signature transmitted over the CD/CA_ICH by the UE itself and another signature are receive, in step 3253, and then performs the process again from the step 3203.

"C" of step 3214 indicates a case where the physical layer of the UE informs the MAC that an ACK for the CD_ICH and the channel allocation message have been received over the CA_ICH. In this case, the MAC layer of the UE selects an appropriate TF and builds a transport block set appropriate for the selected TF in step 3215.

In step 3216, the MAC layer of the UE transmits the built transport block set using a PHY-DATA-REQ primitive. In step 3217, the MAC layer of the UE decreases FCT by the number of the frames corresponding to one TTI and then ends the process for transmitting data over the CPCH in step 3218.

Meanwhile, in order to effectively transmit the packet data using the common channel such as the CPCH, a method for measuring a confusion rate of the present CPCH and managing the CPCH depending on the measured confusion rate. The confusion rate represents a frequency of using the CPCHs in the system. When the confusion rate is high, assignment of the CPCH is restricted to more effectively use the system resources. Therefore, at the request of the CRNC, the Node B must perform common measurement and report a confusion rate determined through the common measurement to the CRNC.

A description will now be made regarding how to measure a confusion rate of the CPCH according to an embodiment of the present invention. The W-CDMA system (or UMTS system) uses the common measurement for the confusion rate of the CPCH requested or in use.

In order to measure the confusion rate, the CRNC sends a common measurement request to the Node B, and the Node B then reports a common measurement value determined through the common measurement to the CRNC. The common measurement is performed to measure the number of APs or CDs received per unit time, or to determine the number of channels CA assigned per unit time, the CPCH total capacity or the number of the presently occupied CPCHs. The CRNC sets the persistence value according to the common measurement value and then reports the set value to the Node B.

The relationship between the common measurement procedure and the persistence value and the relationship between the access procedure of the UE and the persistence value will now be described step by step.

First Step: Common Measurement Initiation Procedure

Figure 38:
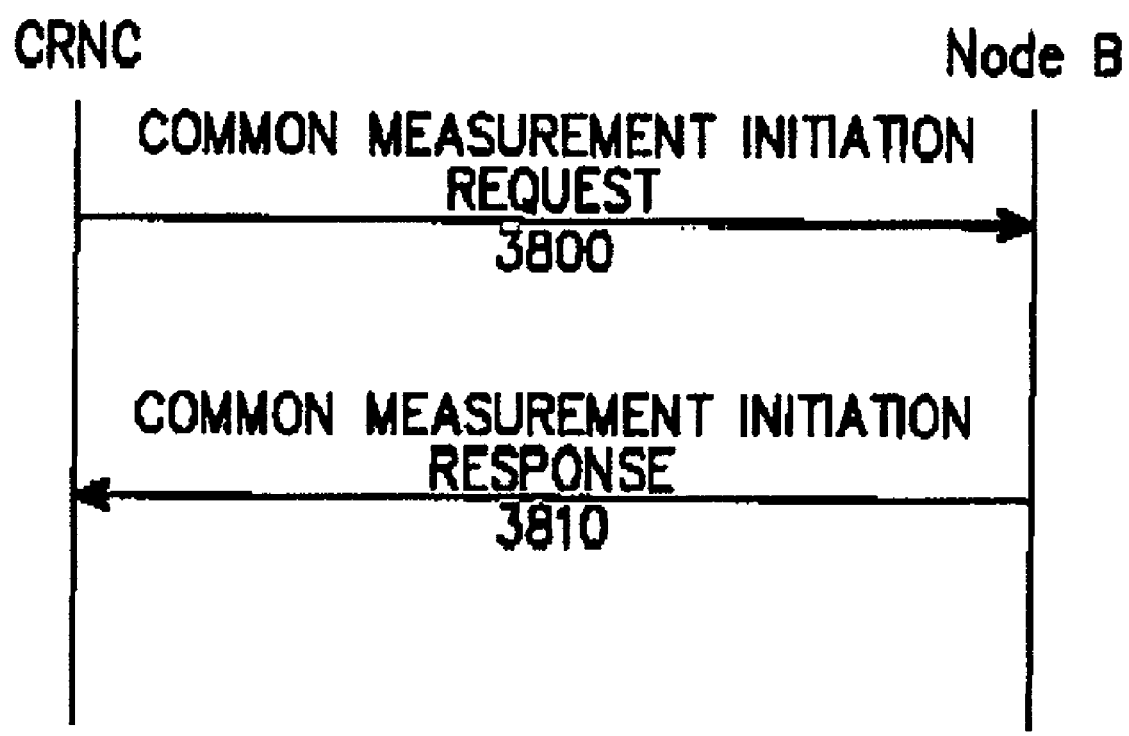
FIG. 38 is a flow diagram illustrating a common measurement initiation procedure according to an embodiment of the present invention.

FIG. 38 illustrates a common measurement initiation procedure according to an embodiment of the present invention. Referring to FIG. 38, the CRNC sends a common measurement initiation request message to the Node B in step 3800, to request initiation of the common measurement.

In response to the common measurement initiation request message, the Node B sends a common measurement initiation response message to the CRNC in step 3810.

The CRNC sends the common measurement initiation request message to the Node B to request measurement of a common measurement value for the CPCH. Several possible examples of the common measurement value are given below.

The examples of the common measurement value include CPCH access attempts, assigned PCPCH number, the number of currently occupied PCPCHs, and the CPCH total capacity.

The common measurement values are described below.

(1) The "CPCH access attempts" can be defined as:

(1.1) the number of AP preambles and CD preambles received per unit time by the Node B;

(1.2) the number of AP preambles received per unit time by the Node B; and (1.3) the number of CD preambles received per unit time by the Node B.

Here, the "unit time" can be defined as one access frame, TTI (Transmit Time Interval), 10 ms or 20 ms.

(2) The "assigned PCPCH number" can be defined as the total number of PCPCHs assigned per unit time by the Node B.

(3) The "number of currently occupied PCPCHs" can be defined as the number of PCPCHs currently assigned to the UEs by the Node B, and thus occupied by the UEs.

(4) The "CPCH total capacity" can be defined as the total capacity of uplink PCPCHs currently assigned to the UEs by the Node B and thus occupied by the UEs. This value can be calculated by summing up the maximum data rates of the PCPCHs currently assigned for the CPCHs. Alternatively, this value can also be determined using the minimum SF value.

The CPCH access attempts, the assigned PCPCH number and the number of currently occupied PCPCHs can be defined in a unit of one CPCH set, and can also be defined in a unit of data rate, transport format (TF), minimum available SF or PCPCH within one PCPCH set.

Therefore, the CRNC may previously provide the Node B with the TF, minimum available SF or PCPCH value to be used in measuring the common measurement value, when transmitting the common measurement initiation request message.

An example of an information element structure for constructing the common measurement initiation request message is shown in Table 9 below.

TABLE 9

| IE/Group Name | Presence | Range | IE Type and Reference | Semantics Description | Criticality | Assigned Criticality |
|---|---|---|---|---|---|---|
| Message Discriminator | M | | | | | |
| Message Type | M | | | | YES | Reject |
| Transaction ID | M | | | | | |
| Measurement ID | M | | | | YES | Reject |
| Common Measurement Object Type | M | | | | YES | Reject |
| Choice Common Measurement Object Type | | | | | YES | Ignore |
| "Cell" | | | | | YES | Reject |
| C-ID | M | | | | | |
| Time Slot | O | | | TDD only | | |

TABLE 9-continued

| IE/Group Name | Presence | Range | IE Type and Reference | Semantics Description | Criticality | Assigned Criticality |
|---|---|---|---|---|---|---|
| "RACH" | | | | | YES | Reject |
| C-ID | M | | | | | |
| Common Transport Channel ID | M | | | | | |
| CPCH | | | | | YES | Ignore |
| C-ID | M | | | | | |
| Common Transport Channel ID | M | | | | | |
| Transport Format | O | | | | | |
| Common Measurement Type | M | | | | YES | Reject |
| Measurement Filter Coefficient | O | | | | YES | Reject |
| Report Characteristics | M | | | | YES | Reject |

Table 9 shows an example of an information element structure containing the common measurement initiation request message and the common measurement initiation response message, transmitted from the CRNC to the Node B in the common measurement initiation procedure. It is assumed in Table 9 that the common measurement value is provided (or given) per TF.

In table 9, that the TF value is represented by 'O' means that the TF value has an optional value, and this implies that it is possible to either transmit or not transmit the TF value when transmitting the message. Therefore, the message is transmitted with the TF value, when the common measurement value is measured per (or in a unit of) TF. However, when the common measurement value is measured not per TF but per CPCH set, the message is transmitted without TF value.

Second Step: Common Measurement

The Node B measures the common measurement value for the common measurement value requested by the CRNC in the first step. As described in the first step, examples of the common measurement values are given as follows.

(1) The CPCH access attempts;
(2) The assigned PCPCH number;
(3) The number of currently occupied PCPCHs; and
(4) The CPCH total capacity.

Figure 39:
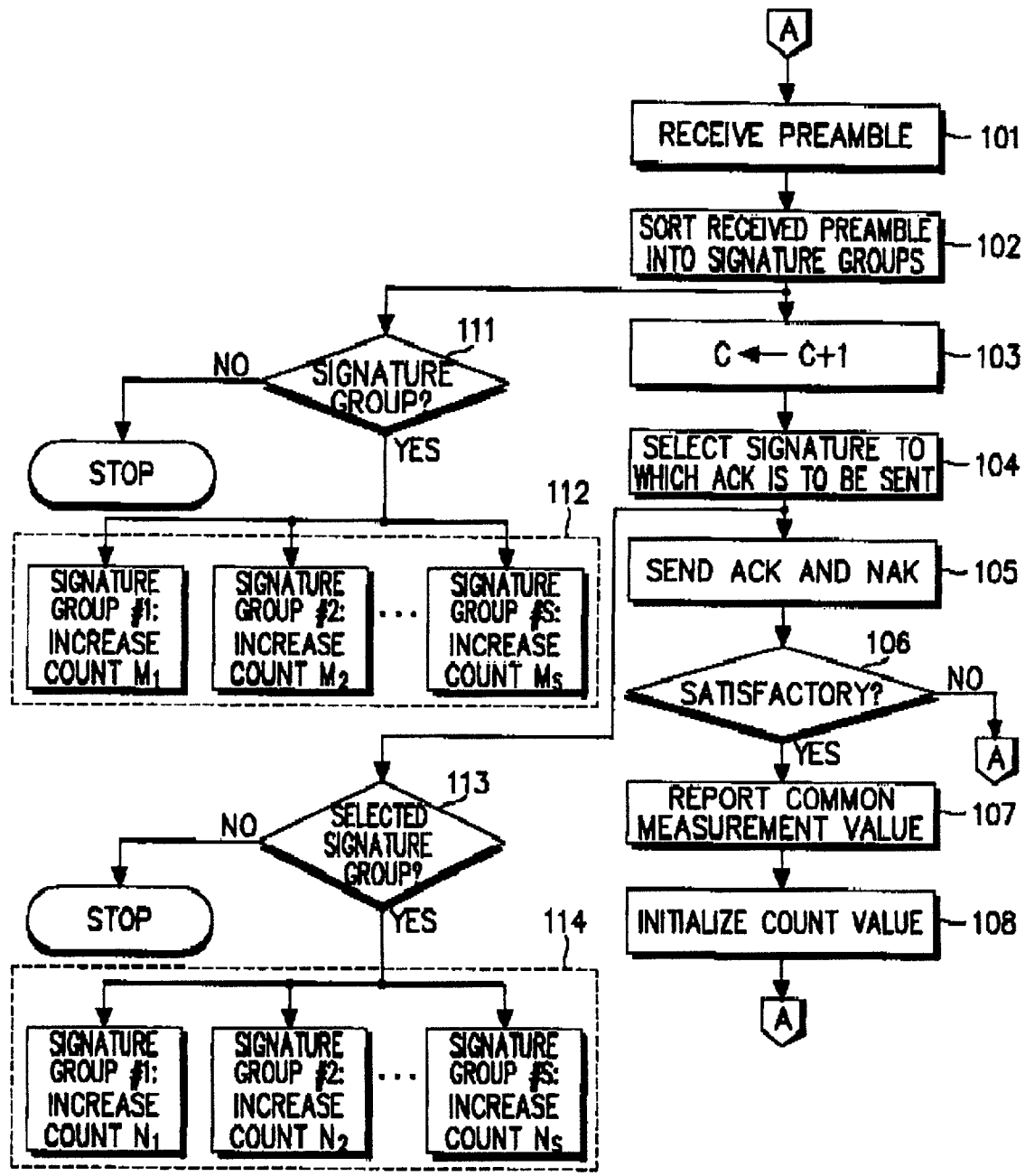
FIG. 39 is a flow chart illustrating a common measurement procedure according to an embodiment of the present invention.

FIG. 39 illustrates an example of a common measurement procedure performed in the Node B according to an embodiment of the present invention. In step 101, the Node B receives AP preambles or CD preambles per access slot. After receiving the AP preambles or CD preambles, the Node B sorts the received preambles into signature groups in step 102. The Node B determines a signature group of the sorted preamble in step 111, and then increases a count value of the corresponding group by as much as the number of the received signatures, in step 112.

Meanwhile, the Node B increases a count value C of the access slot by 1 in step 103, and then selects one of the received signatures, to which ACK is to be sent, in step 104. Thereafter, the Node B determines a group to which selected signature belongs, in step 113, and then increases a count value of the corresponding signature group by 1 in step 114. Further, in step 105, the Node B sends ACK to the selected signature and NAK to the other signatures.

The Node B determines in step 106 whether the measurement condition required by the CRNC is satisfied. If the condition is satisfactory, the Node B proceeds to step 107. Otherwise, if the condition is unsatisfactory, the Node B returns to step 101 and repeats the foregoing steps. In step 107, the Node B reports the common measurement value to the CRNC using a common measurement report procedure. In step 108, the Node B initializes the corresponding count value C, $M_i$ or $N_j$ and then returns to step 101.

As another embodiment, the Node B can directly go to step 108, when the unit time has elapsed before the measurement value is measured per predetermined measurement unit in step 106. For example, when the unit time is one access frame, the measurement is performed for 15 access slots. After a lapse of the 15 access slots, the measurement values C, $M_i$ and $N_j$ are initialized every unit time.

Figure 42:
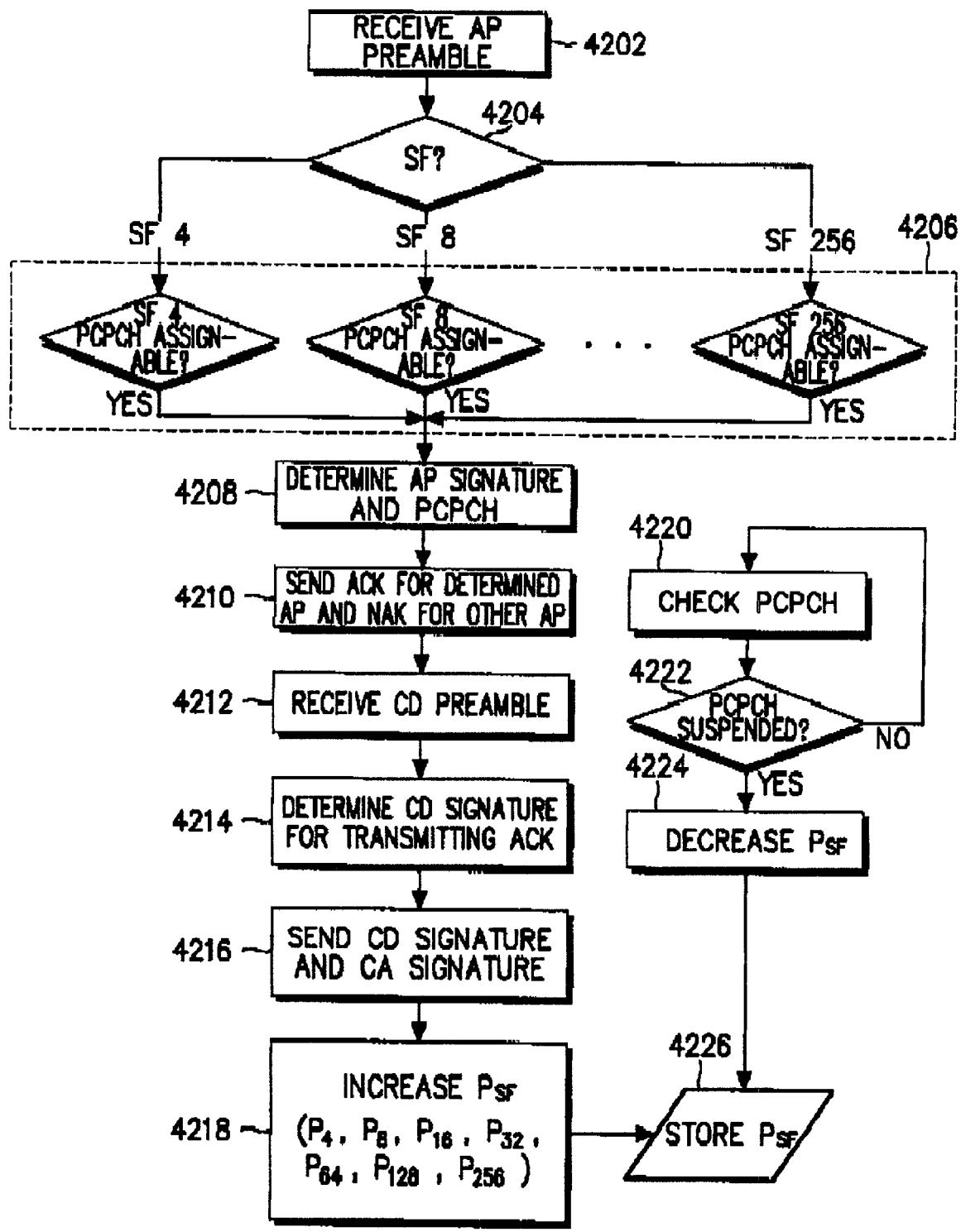
FIG. 42 is a flow chart illustrating a procedure for measuring the number of currently occupied PCPCHs according to an embodiment of the present invention.

FIG. 42 illustrates a procedure for measuring the number of currently occupied PCPCHs in the common measurement procedure performed in the Node B.

Referring to FIG. 42, the Node B receives AP preambles per access slot in step 4202. After receiving the AP preambles, the Node B determines an SF value indicated by the signatures of the received AP preambles in step 4204. Thereafter, in step 4206, the Node B determines whether it is possible to assign the PCPCH corresponding to the SF value determined in step 4204. As an example of determining whether it is possible to assign the PCPCH, the Node B determines that it is possible to assign the PCPCH, if there is an unoccupied PCPCH out of the PCPCHs transmittable to the determined SF.

Otherwise, the Node B determines that it is not possible to assign the PCPCH. As another example of determining whether it is possible to assign the PCPCH, the Node B compares the number $P_{SF}$ of the PCPCHs corresponding to the determined SF with the maximum number of the assignable PCPCHs given to the determined SF, and assigns the PCPCH only when the $P_{SF}$ value is smaller than the maximum number of the assignable PCPCHs.

In step 4208, the Node B determines an AP signature to which ACK is to be sent, out of the SFs determined in step 4206, and also determines a PCPCH to be assigned. The determination of the PCPCH to be assigned may also be performed in step 4214 or 4216. Since the determined AP signature is so mapped as to represent the SF, the Node B also determines the associated SF.

In step 4210, the Node B simultaneously transmits ACK for the AP signatures determined in step 4208 and NAK for the AP signatures not selected in step 4208, using the AP-AICH channel. Throughout the description, the term "AP" refers to a signature transmitted through an AP preamble, and is equivalent to the term "AP signature".

In step 4212, the Node B receives CD preambles at an access slot for the CD preamble, corresponding to an access slot for the AP preamble received in step 4202. For example, the access slot for the CD preamble includes 3 or 4 slots following the access slot for the AP preamble. In step 4214, the Node B determines CD-P (or CD signature) for transmitting ACK for the CD-P received in step 4212 based on a reception power level.

In step 4216, the Node B transmits the CD signature determined in step 4214 and the CA signature for the PCPCH determined in step 4208 using CD/CA-ICH channel. In step 4218, the Node B increases the count value $P_{SF}$ for the SF of the PCPCH determined and assigned through steps 4208 to 4216. That is, when the assigned PCPCH is so assigned as to use SF=4, the Node B increases $P_4$ by 1. Likewise, for SF=8, SF=16, SF=32, SF=64, SF=128 and SF=256, the Node B increases $P_8$, $P_{16}$, $P_{32}$, $P_{64}$, $P_{128}$ and $P_{256}$ by 1, respectively. In step 4226, the Node B stores the value increased in step 4218.

In steps 4220 to 4224, the Node B checks the PCPCH in use and determines whether the count value $P_{SF}$ is decreased. Specifically, in step 4220, the Node B starts checking the PCPCH corresponding to the stored SF, out of the previously assigned PCPCHs in use. In step 4222, the Node B uses TFCI in receiving the PCPCH use end message through the uplink PCPCH.

When use of the PCPCH is suspended in step 4222, the Node B proceeds to step 4224. Otherwise, when there is no use-suspended PCPCH, the Node B, returns to step 4220. In step 4224, the Node B decreases the count value $P_{SF}$ for the corresponding SF of the suspended PCPCH. In step 4226, the Node B stores the decrease count value $P_{SF}$. The Node B reports the stored count value at the request of the CRNC.

Third Step: Common Measurement Report Procedure

Figure 40:
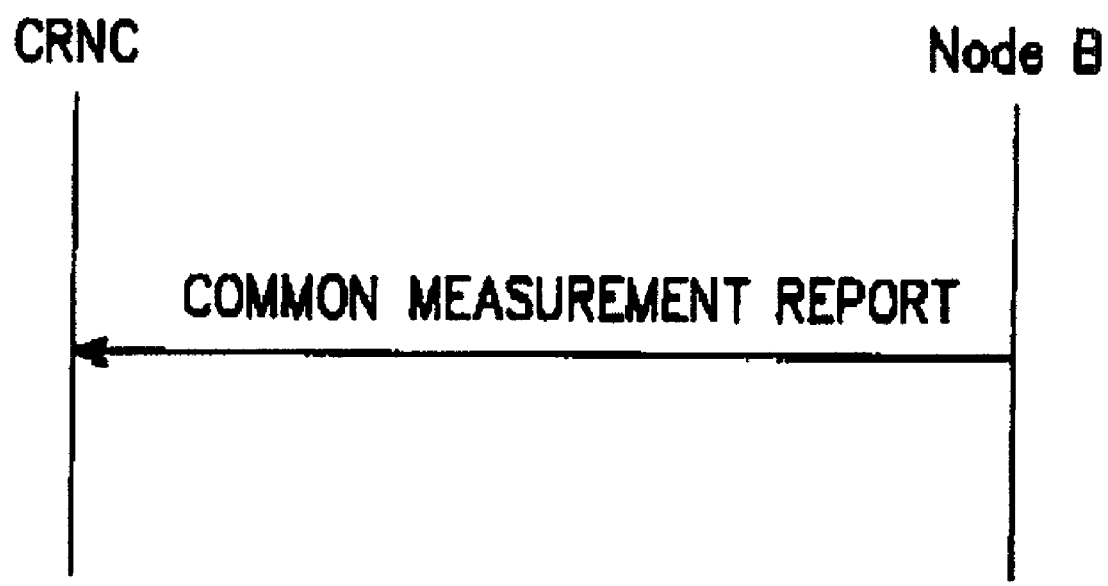
FIG. 40 is a flow diagram illustrating a common measurement report procedure according to an embodiment of the present invention.

FIG. 40 illustrates a common measurement report procedure, in which the Node B sends the common measurement value to the CRNC using a common measurement report message.

The Node B periodically measures the common measurement value and reports it to the CRNC, at the request of the CRNC. Alternatively, the Node B measures the common measurement value and reports it to the CRNC, when the value exceeds a predetermined value or decreases below a predetermined value, or whenever the CRNC requests the common measurement value. An example of an information element structure for constructing a message required in reporting the common measurement value to the CRNC is shown in Table 10 below.

Table 10 shows an example of an information element structure containing the common measurement value transmitted from the Node B to the CRNC in the common measurement report procedure. It is assumed in Table 10 that the common measurement value is provided per TF.

TABLE 10

| Information Element/Group Name | Presence | Range | IE Type and Reference | Semantics Description |
| --- | --- | --- | --- | --- |
| Transmitted Carrier Power Value | C MeasValue | | INTEGER(0 . . . 100) | According to mapping in 25.215/25.225 |
| RSSI Value | C MeasValue | | INTEGER(0 . . . 63) | According to mapping in 25.215/25.225 |
| Acknowledged RA tries Value | C MeasValue | | INTEGER(0 . . . 240) | The number of L1 acknowledged random access tries per every 20 ms period. |
| Time Slot ISCP (TDD only) | C MeasValue | | INTEGER(0 . . . 81) | According to mapping in 25.225 |
| CPCH Access Attempts | C MeasValue | 1 . . . <MaxnoofTF> | | |
| CPCH Access Attempts value | | | INTEGER(0 . . . 480) | According to mapping in 25.215 |
| CPCH Assigned number | C MeasValue | 1 . . . <MaxnoofTF> | | |
| CPCH Assigned number value | | | INTEGER(0 . . . 15) | According to mapping in 25.215 |

Node B determines whether use of the currently checked PCPCH is suspended. The use of the PCPCH is suspended in the following cases:

1) Use of the PCPCH is suspended after the PCPCH has been used for NF_Max;
2) The Node B personally stops use of the PCPCH using an emergency step message;
3) Use of the PCPCH is suspended when it is not possible to transmit an uplink PCPCH for a predetermined time; and
4) The Node B stops use of the PCPCH upon receipt of a PCPCH use end message through an uplink PCPCH. Here, Another example of an information element structure for constructing a message required in reporting the common measurement value to the CRNC is shown in Table 11 below.

Table 11 shows another example of an information element structure containing the common measurement value transmitted from the Node B to the CRNC in the common measurement report procedure. It is assumed in Table 11 that the common measurement value is provided per TF, SF or PCPCH, at the request of the CRNC.

TABLE 11

| Information Element/ Group Name | Presence | Range | IE Type and Reference | Semantics Description |
|---|---|---|---|---|
| Transmitted Carrier Power Value | C Meas Value | | INTEGER(0 ... 100) | According to mapping in 25.215/25.225 |
| RSSI Value | C MeasValue | | INTEGER(0 ... 63) | According to mapping in 25.215/25.225 |
| Acknowledged RA tries Value | C MeasValue | | INTEGER(0 ... 240) | The number of L1 acknowledged random access tries per every 20 ms period. |
| Time Slot ISCP (TDD only) | C Meas Value | | INTEGER(0 ... 81) | According to mapping in 25.225 |
| CPCH Access Attempts | C Meas Value | | | |
| CPCH Access Attempts value | | | INTEGER(0 ... 480) | According to mapping in 25.215 |
| CPCH Assigned number | C Meas Value | | | |
| CPCH Assigned number value | | | INTEGER(0 ... 15) | According to mapping in 25.215 |

Fourth Step: Persistence Value Assign Procedure

The CRNC determines a persistence value using the common measurement values and reports the determined persistence value to the Node B. The persistence value can be differently determined depending on the method of providing the common measurement value. The common measurement value providing method includes (1) a case where the common measurement value is provided per TF, (2) a case where the common measurement value is provided per PCPCH, and (3) a case where the common measurement value is provided per entire CPCH set.

(1) Common Measurement Value Provided per TF (1.1) CPCH Access Attempts

The CRNC can measure the number of AP preambles or CD preambles transmitted from the UEs depending on the CPCH access attempts. The large number of the CPCH access attempts means that there is an excessive number of UEs requiring the corresponding TF. When there is a large number of UEs requiring the same TF, the number of AP preamble or CD preamble attempts is larger, whereas the collision occurs more frequently, thus increasing a probability that the UEs will repeatedly transmit the preamble. Therefore, the CRNC adjusts the persistence value given to the corresponding TF to a smaller value, in order to control transmission of the preamble from the excessive number of the UEs. On the other hand, when the number of the AP preambles or CD preambles requiring the corresponding TF is smaller, the CRNC can adjust the persistence value to a larger value.

(1.2) Assigned CPCH Number

The assigned CPCH number enables the CRNC to determine the number of currently assigned channels out of the channels given to the corresponding TF (or SF). When channels are excessively assigned to a specific TF, the CRNC can adjust the persistence value given to the corresponding TF to a smaller value, in order to control the channel assignment. In contrast, when a utilization degree of the channels given to a specific TF is lower, that is, when the assigned CPCH number is smaller, the CRNC can adjust the persistence value given to the corresponding TF to a larger value, in order to increase the utilization degree of the channels given to the corresponding TF.

(1.3) Number of Currently Occupied PCPCHs

The number of currently occupied PCPCHs enables the CRNC to determine the number of currently occupied channels out of the channels given to the corresponding TF (or SF). When channels are excessively assigned to a specific TF, the CRNC can adjust the persistence value given to the corresponding TF to a smaller value, in order to control the channel assignment. In contrast, when a utilization degree of the channels given to a specific TF is lower, that is, when the assigned CPCH number is smaller, the CRNC can adjust the persistence value given to the corresponding TF to a larger value, in order to increase the utilization degree of the channels given to the corresponding TF.

The case where the common measurement value is provided per data rate or SF is equivalent to the case where the common measurement value is provided per TF, provided that which the TF is replaced with the data rate or SF.

(2) Common Measurement Value Provided per PCPCH (2.1) CPCH Access Attempts

The CRNC can measure the number of AP preambles or CD preambles transmitted from the UEs depending on the CPCH access attempts. The large number of the CPCH access attempts means that there is an excessive number of UEs requiring the corresponding PCPCH. When there is a large number of UEs requiring the same PCPCH, the number of AP preamble or CD preamble attempts is larger, whereas the collision occurs more frequently, thus increasing a probability that the UEs will repeatedly transmit the preamble. Therefore, the CRNC adjusts the persistence value given to the corresponding PCPCH to a smaller value, in order to control transmission of the preambles from the excessive number of the UEs. On the other hand, when the number of the AP preambles or CD preambles requiring the corresponding PCPCH is smaller, the CRNC can adjust the persistence value to a larger value.

(3) Common Measurement Value Given per Entire CPCH Set (3.1) CPCH Access Attempts The CRNC can measure the number of AP preambles or CD preambles transmitted from the UEs depending on the CPCH access attempts. The large number of the CPCH access attempts means that there is an excessive number of UEs requiring the corresponding CPCH. When there is a large number of UEs requiring the same PCPCH, the number of AP preamble or CD preamble attempts is larger, whereas the collision occurs more frequently, thus increasing a probability that the UEs will repeatedly transmit the preamble. Therefore, the CRNC adjusts the persistence value given to the corresponding TF to a smaller value, in order to control transmission of the preamble from the excessive number of the UEs. On the other hand, when the number of the AP preambles or CD preambles requiring the corresponding PCPCH is smaller, the CRNC can adjust the persistence value to a larger value.

(3.2) Assigned CPCH Number

The assigned CPCH number enables the CRNC to determine the number of currently assigned channels out of the channels given to the corresponding CPCH. When the whole CPCH channels are excessively assigned, the CRNC can adjust the persistence value given to each TF to a smaller value, in order to control the channel assignment. In contrast, when a utilization degree of a given channel is lower, that is, when the assigned CPCH number is smaller, the CRNC can adjust the persistence value given to each TF to a larger value, in order to increase the utilization degree of the channels given to each TF.

(3.3) CPCH Total Capacity

The CPCH total capacity enables the CRNC to determine the channel capacity currently used by the UEs through the CPCH channel. When the whole CPCH channels are excessively assigned, the CRNC can adjust the persistence value given to each TF to a smaller value, in order to control the channel assignment. In contrast, when a utilization degree of the CPCH channel is lower, that is, when the channel capacity of the CPCH in use is lower, the CRNC can adjust the persistence value given to each TF to a higher value, in order to increase the utilization degree of the channels given to each TF.

(3.4) Number of Currently Occupied PCPCHs

The number of currently occupied PCPCHs enables the CRNC to determine the number of currently occupied channels out of given channels. When channels are excessively assigned, the CRNC can adjust the persistence value given to the corresponding TF to a smaller value, in order to control the channel assignment. In contrast, when a utilization degree of the channels is, lower, that is, when the assigned CPCH number is smaller, the CRNC can adjust the persistence value given to each TF to a larger value, in order to increase the utilization degree of the channels given to the corresponding TF.

Fifth Step: Persistence Value Broadcast Procedure

Figure 41:
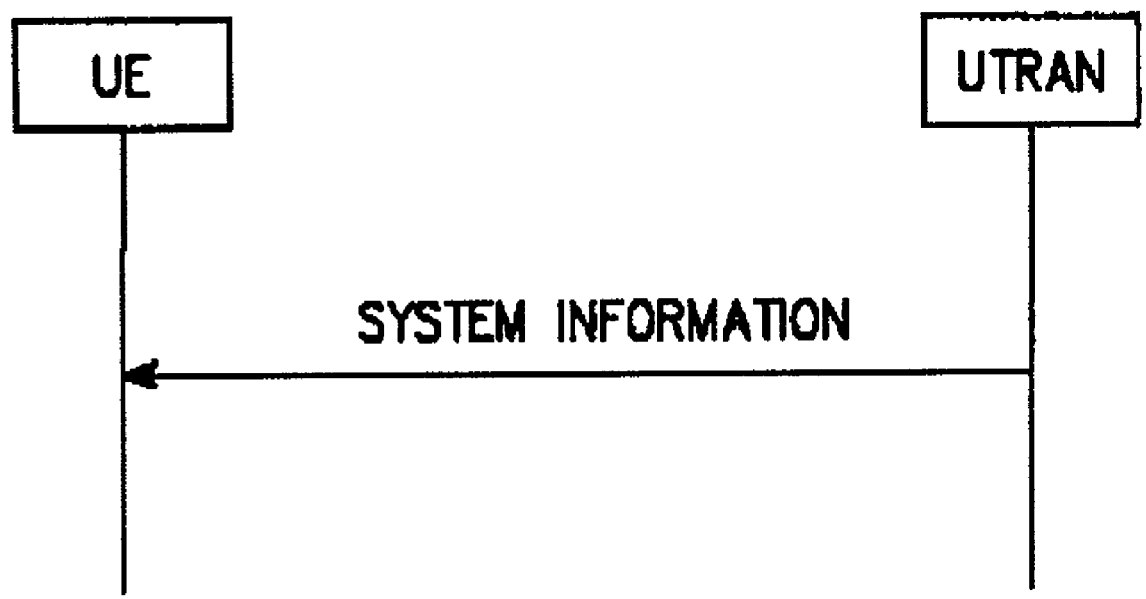
FIG. 41 is a flow diagram illustrating a system information broadcast procedure according to an embodiment of the present invention.

FIG. 41 illustrates a procedure for sending the persistence values determined in the fourth step to the UEs using a broadcast channel.

Sixth Step: Persistence Value Access Procedure

The UE performs the access procedure according to the provided to persistence values.

As described above, the UTRAN actively allocates the CPCH requested by the UE and can reduce the time required for setting up the CPCH. In addition, it is possible to decrease a probability of a collision which may be caused when a plurality of UEs requests the CPCH, and to prevent a waste of radio resources. Furthermore, it is possible to secure stable allocation of the common packet channel through the PC_P between the UE and the UTRAN, and to provide stability in using the common packet channel.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for determining by a UMTS Terrestrial Radio Access Network a persistence value for adjusting a number of access preambles from a plurality of User Equipments (UEs) requiring assignment of a common packet channel (CPCH), the method comprising the steps of:

counting the number of the access preambles detected in an access preamble period having a predetermined period for each transport format of a plurality of different transport formats, each transport format contains information related to an amount of transmission data and a data rate of each transport format;

determining the persistence value based on the number of counted access preambles for each transport format; and transmitting the determined persistence value to the UEs in a cell controlled by a Node B, wherein the persistence value is determined based on the amount of transmission data and the data rate of each transport format.

2. The method as claimed in claim 1, wherein the persistence value is determined in a unit of physical common packet channel (PCPCH).

3. The method as claimed in claim 1, wherein the persistence value is determined in a unit of CPCH set.

4. A method for determining by a UMTS Terrestrial Radio Access Network a persistence value for adjusting a number of CD (Collision Detection) preambles from a plurality of User Equipments (UEs) requiring a Common Packet Channel, the method comprising the steps of:

counting the number of CD access preambles detected in an access preamble period having a predetermined period for each transport format of a plurality of different transport formats, each transport format contains information related to an amount of transmission data and a data rate of each transport format;

determining the persistence value based on the number of counted CD access preambles for each transport format; and transmitting the determined persistence value to the UEs in a cell controlled by a Node B, wherein the persistence value is determined based on the amount of transmission data and the data rate of each transport format.

5. The method as claimed in claim 4, wherein the persistence value is determined in a unit of Physical Common Packet Channel.

6. The method as claimed in claim 4, wherein the persistence value is determined in a unit of CPCH set.

7. A method for adjusting common packet channel (CPCH) access preambles from user equipments(UEs) requiring assignment of CPCH, comprising the steps of:

requesting measurement of the CPCH access attempts;

upon receipt of a measurement request, counting the number of the CPCH access preambles transmitted from the UEs during a time unit;

reporting the counted number of the CPCH access preambles to a controlling radio network controller (CRNC);

determining, in the CRNC, persistence values of each transport format based on the number of the CPCH access preambles reported; and providing the persistence values to the UEs;

performing in a UE, a persistence test by using the provided persistence values before transmitting a common packet channel access preamble;

transmitting the common packet channel access preamble to a Node B when the persistence test allows the transmission of the common packet channel access preamble;

upon receiving an acknowledge message from the Node B, transmitting a collision detection preamble from the UE to the Node B; and transmitting a common packet channel message from the UE to the Node B if the UE received the acknowledge message for the collision detection preamble from the Node B.

8. The method as claimed in claim 7, wherein the step of counting the number of CPCH access attempts is performed in a unit of Physical Common Packet Channel.

9. The method as claimed in claim 7, wherein the step of counting the number of CPCH access attempts is performed in a unit of CPCH set.

10. The method as claimed in claim 7, wherein the acknowledge message for the collision detection preamble is a collision detection indicator channel message.

11. The method as claimed in claim 7, wherein the acknowledge message for the collision detection preamble is a collision detection/channel assignment-indicator channel message.

* * * * *